US012539383B2

(12) United States Patent
Dantanarayana

(10) Patent No.: US 12,539,383 B2
(45) Date of Patent: Feb. 3, 2026

(54) NATURAL BREATHING FULL FACE MASK

(71) Applicant: ResMed Pty Ltd, Bella Vista (AU)

(72) Inventor: Muditha Pradeep Dantanarayana, Sydney (AU)

(73) Assignee: ResMed Pty Ltd, Bella Vista (AU)

(\*) Notice: Subject to any disclaimer, the term of this patent is extended or adjusted under 35 U.S.C. 154(b) by 629 days.

(21) Appl. No.: 17/929,783

(22) Filed: Sep. 6, 2022

(65) Prior Publication Data

US 2023/0088472 A1 Mar. 23, 2023

(30) Foreign Application Priority Data

Sep. 23, 2021 (AU) ................ 2021903059

(51) Int. Cl.
*A61M 16/06* (2006.01)
*A61M 16/20* (2006.01)

(52) U.S. Cl.
CPC ........ *A61M 16/0616* (2014.02); *A61M 16/06* (2013.01); *A61M 16/201* (2014.02); *A61M 16/0666* (2013.01); *A61M 16/0683* (2013.01); *A61M 16/20* (2013.01); *A61M 2202/0225* (2013.01)

(58) Field of Classification Search
CPC .............. A61M 16/06; A61M 16/0605; A61M 16/0616; A61M 16/0622; A61M 16/0666; A61M 16/0683; A61M 16/20; A61M 16/201
See application file for complete search history.

(56) References Cited

U.S. PATENT DOCUMENTS

| 4,782,832 A | 11/1988 | Trimble et al. |
| 4,944,310 A | 7/1990 | Sullivan |

(Continued)

FOREIGN PATENT DOCUMENTS

| CN | 207666957 U | 7/2018 |
| CN | 207694052 U | 8/2018 |

(Continued)

OTHER PUBLICATIONS

"*Respiratory Physiology*", by John B. West, Lippincott Williams & Wilkins, 9th edition published 2012 (8 pages).

(Continued)

*Primary Examiner* — Joseph D. Boecker
(74) *Attorney, Agent, or Firm* — Nixon & Vanderhye P.C.

(57) ABSTRACT

A patient interface comprising a cushion having a nasal plenum chamber, an oral plenum chamber, and a passage formed between the nasal and oral plenum chambers. The passage is configured to allow airflow to pass between the nasal and oral plenum chambers. The cushion also includes a valve including valve body and an adjustment structure that is positioned between the nasal chamber and the oral chamber and is movable relative to the valve body. The adjustment structure is movable between an open position that is configured to allow airflow between the nasal plenum chamber and the oral plenum chamber, and a closed position configured to limit airflow between the nasal plenum chamber and the oral plenum chamber. The adjustment structure is configured to allow airflow through a nasal vent in the closed position and is configured to limit airflow through the nasal vent in the open position.

30 Claims, 42 Drawing Sheets

(56) References Cited

U.S. PATENT DOCUMENTS

| | | | |
|---|---|---|---|
| 5,560,034 | A | 9/1996 | Goldstein |
| 5,687,715 | A | 11/1997 | Landis |
| 6,123,071 | A * | 9/2000 | Berthon-Jones ...... A61M 16/06 128/205.25 |
| 6,532,959 | B1 | 3/2003 | Berthon-Jones |
| 6,581,594 | B1 | 6/2003 | Drew et al. |
| 7,866,944 | B2 | 1/2011 | Kenyon et al. |
| 8,636,479 | B2 | 1/2014 | Kenyon et al. |
| 8,638,014 | B2 | 1/2014 | Sears et al. |
| 8,733,349 | B2 | 5/2014 | Bath et al. |
| 10,744,290 | B2 | 8/2020 | Formica et al. |
| 2006/0237017 | A1* | 10/2006 | Davidson .......... A61M 16/0683 128/205.25 |
| 2007/0006879 | A1* | 1/2007 | Thornton ............... A61M 16/06 128/203.29 |
| 2009/0044808 | A1 | 2/2009 | Guney et al. |
| 2009/0050156 | A1 | 2/2009 | Ng et al. |
| 2009/0133696 | A1* | 5/2009 | Remmers .......... A61M 16/0493 128/204.26 |
| 2009/0159084 | A1 | 6/2009 | Sher et al. |
| 2010/0000534 | A1 | 1/2010 | Kooij et al. |
| 2013/0199537 | A1* | 8/2013 | Formica ................ A61M 16/06 128/205.25 |
| 2015/0059759 | A1* | 3/2015 | Frater ................ A61M 16/0638 128/205.25 |
| 2017/0035979 | A1 | 2/2017 | Pedro et al. |
| 2018/0193582 | A1 | 7/2018 | Pedro et al. |
| 2019/0224435 | A1* | 7/2019 | Pedro ..................... A61B 5/097 |
| 2020/0206446 | A1* | 7/2020 | Blaxland .......... A61M 16/0683 |
| 2022/0257890 | A1* | 8/2022 | Zoellner .......... A61M 16/0666 |
| 2022/0409839 | A1* | 12/2022 | Dantanarayana ..... A61M 16/20 |

FOREIGN PATENT DOCUMENTS

| | | | | |
|---|---|---|---|---|
| CN | 109529164 | A * | 3/2019 | ............ A61M 16/06 |
| EP | 0 634 186 | B1 | 8/2000 | |
| WO | WO 98/004310 | A1 | 2/1998 | |
| WO | WO 98/034665 | A1 | 8/1998 | |
| WO | WO 2000/078381 | A1 | 12/2000 | |
| WO | WO 2004/073778 | A1 | 9/2004 | |
| WO | WO 2005/063328 | A1 | 7/2005 | |
| WO | WO 2006/074513 | A1 | 7/2006 | |
| WO | WO 2006/130903 | A1 | 12/2006 | |
| WO | WO 2009/052560 | A1 | 4/2009 | |
| WO | WO 2010/111749 | A1 | 10/2010 | |
| WO | WO 2010/135785 | A1 | 12/2010 | |
| WO | WO 2012/171072 | A1 | 12/2012 | |
| WO | WO 2013/020167 | A1 | 2/2013 | |
| WO | 2019/119058 | A1 | 6/2019 | |
| WO | 2021/046599 | A1 | 3/2021 | |
| WO | WO-2021035306 | A1 * | 3/2021 | ........ A61M 16/0003 |

OTHER PUBLICATIONS

Becker, Heinrich F. et al., "Effect of Nasal Continuous Positive Airway Pressure Treatment on Blood Pressure in Patients with Obstructive Sleep Apnea", Circulation, Jan. 7, 2003; 107(1) DOI: 10.1161/01.CIR.0000042706.47017.7A pp. 68-73.

Maschauer, Emily L., et al. "Does Personality Play a Role in Continuous Positive Airway Pressure Compliance?", Breathe 2017, 13: 32-43; DOI: 10.1183/20734735.014916, https://breathe.ersjournals.com/content/13/1/32#:~:text=Continuous%20positive%20airway%20pressure%20(CPAP)%20is%20highly%20efficacious%20in%20treating,treatment%20within%20the%20first%20year.

Lundberg, Jon O., "Nitric oxide and the paranasal sinuses", Anat Rec (Hoboken), Nov. 2008; 291(11):1479-84. DOI: 10.1002/ar20782, https://pubmed.ncbi.nlm.nih.gov/18951492/.

Dr. Dawn Ann Molina, "Mouth Breathing and Forward Head Posture: Can it Affect Respiratory Biomechanics & Exercise Capacity?" Oct. 27, 2019, http://www.tampabayholisticwellness.com/blog/2019/10/27/mouth-breathing-and-forward-head-posture-can-it-affect-respiratory-biomechanics-amp-exercise-capacity.

McKeown, P., et al., "Mouth Breathing: Physical, Mental and Emotional Consequences", Mar. 9, 2017, https://www.oralhealthgroup.com/features/mouth-breathing-physical-mental-emotional-consequences/.

GlaxoSmith Kline Consumer Healthcare, "New Survey Takes a Peek Into Americans' Bedrooms to Reveal What's Keeping People Awake: Mouth Breathing", Mar. 4, 2015, https://www.prnewswire.com/news-releases/new-survey-takes-a-peek-into-americans-bedrooms-to-reveal-whats-keeping-people-awake-mouth-breathing-300044836.html.

Healthline, "Should You be Concerned If Your Baby Sleeps With Their Mouth Open?", last medically reviewed Apr. 28, 2020, https://www.healthline.com/health/baby/baby-sleeps-with-mouth-open#takeaway.

Swift, A.C., et al., "Oronasal Obstruction, Lung Volumes, and Arterial Oxygenation", The Lancet: Saturday Jan. 16, 1988, pp. 73-75.

Extended European Search Report dated Oct. 5, 2022 issued in European Application No. 20859415.0 (6 pages).

Extended European Search Report dated Feb. 16, 2023 issued in European Application No. 22197470.2 (6 pages).

Andrade et al, "Nasal versus oronasal CPAP for obstructive sleep apnea treatment: a meta-analysis", Chest (2018), doi: 10.1016/j.chest.2017.10.044 (34 pages).

Ng et al, "Choosing an Oronasal Mask to Deliver Continuous Positive Airway Pressure May Cause More Upper Airway Obstruction or Lead to Higher Continuous Positive Airway Pressure Requirements than a Nasal Mask in Some Patients" A Case Series, Journal of Clinical Sleep Medicine, vol. 12, No. 9, 2016 pp. 1227-1232 (6 pages).

International Search Report mailed Nov. 25, 2020 in corresponding PCT application PCT/AU2020/050903 (5 pages).

Written Opinion mailed Nov. 25, 2020 in corresponding PCT application PCT/AU2020/050903 (9 pages).

Second Written Opinion mailed Jul. 27, 2021 in corresponding PCT application PCT/AU2020/050903 (7 pages).

International Preliminary Report on Patentability mailed Dec. 17, 2021 in corresponding PCT application PCT/AU2020/050903 (30 pages).

* cited by examiner

Copyright 2012 ResMed Limited

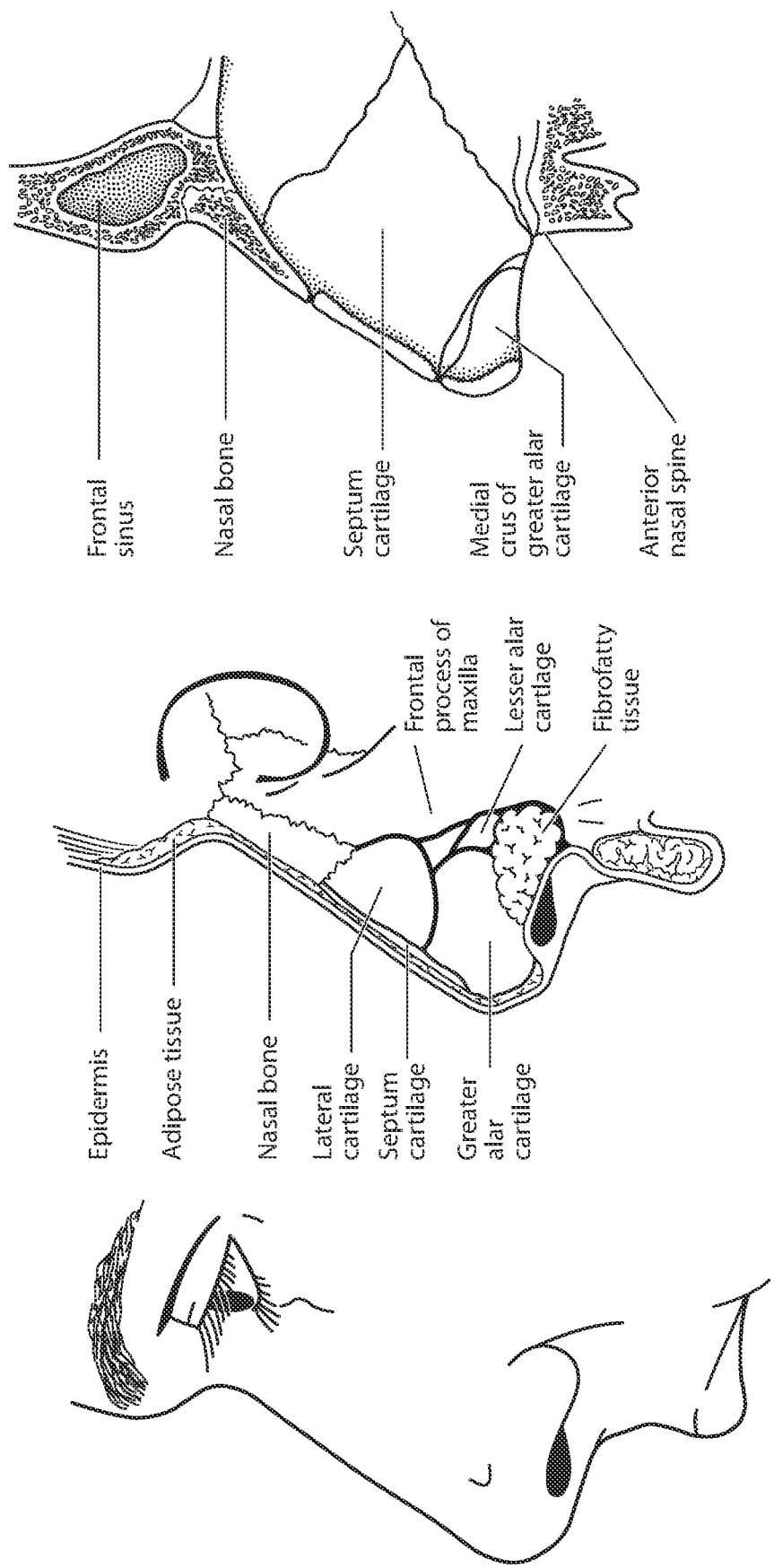

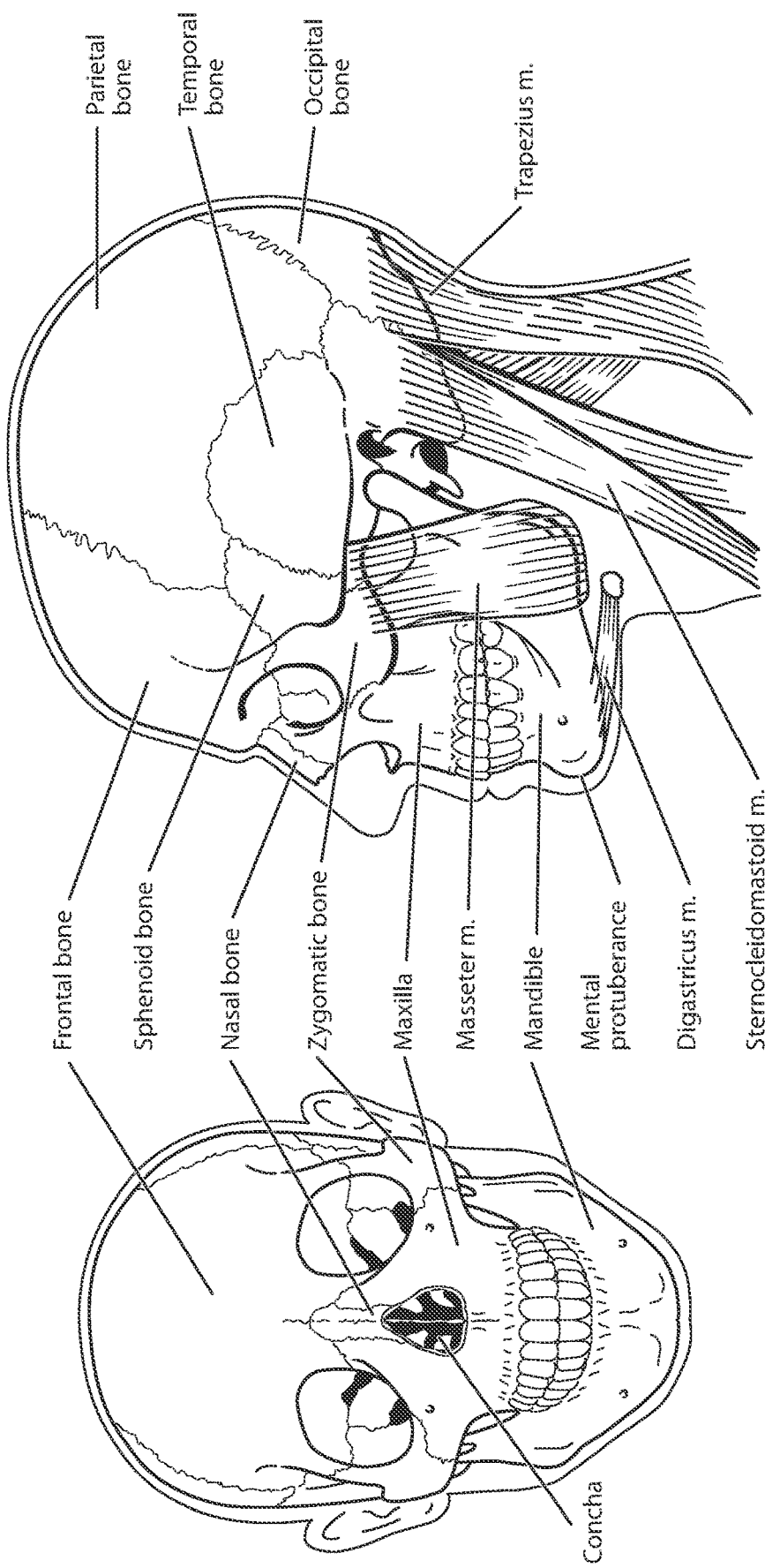

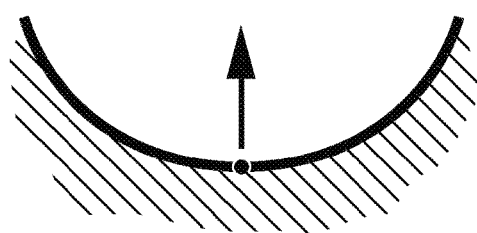
FIG. 3B — Relatively Large Positive Curvature
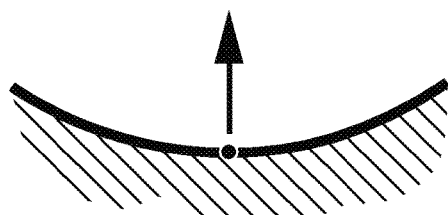
FIG. 3C — Relatively Small Positive Curvature
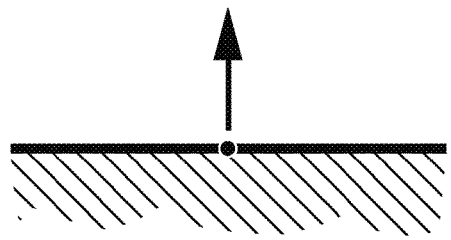
FIG. 3D — Zero Curvature
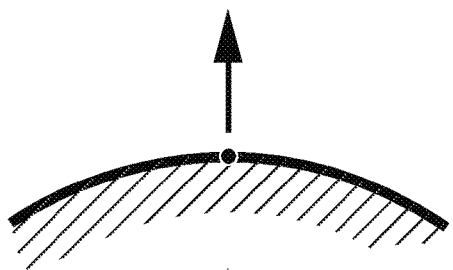
FIG. 3E — Relatively Small Negative Curvature
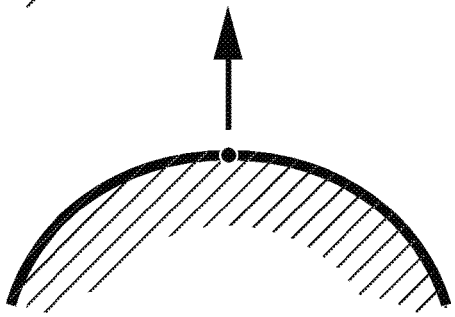
FIG. 3F — Relatively Large Negative Curvature
Copyright 2015 ResMed Limited

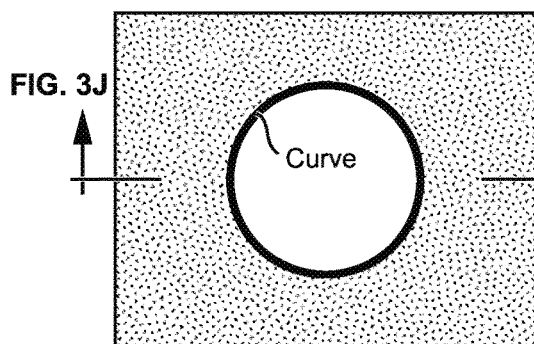
FIG. 3I
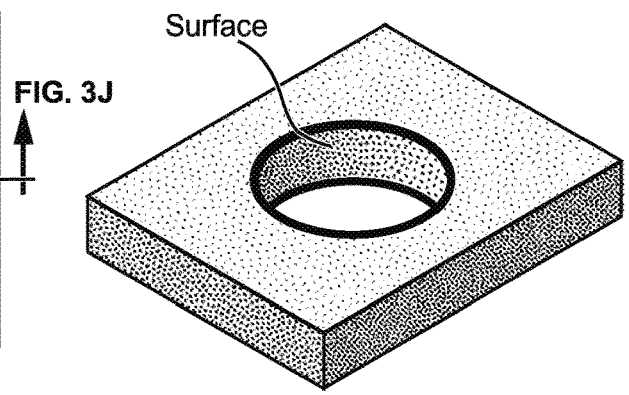
FIG. 3K
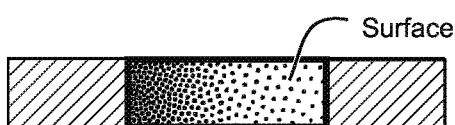
FIG. 3J
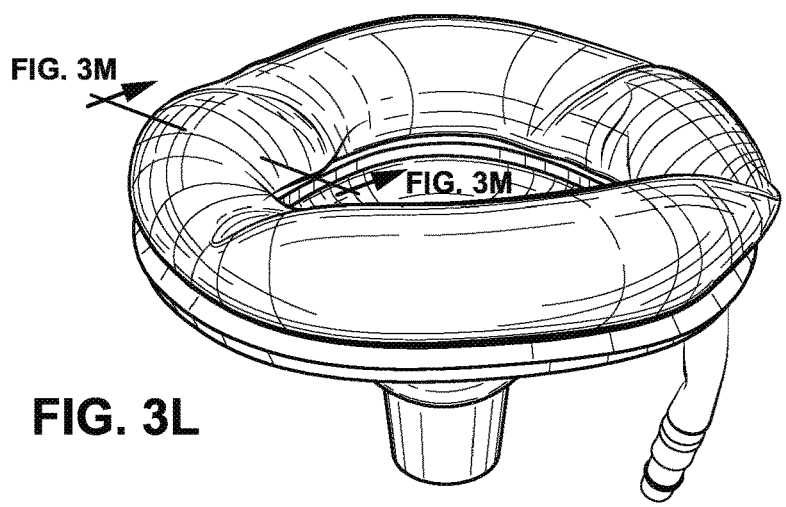
FIG. 3L
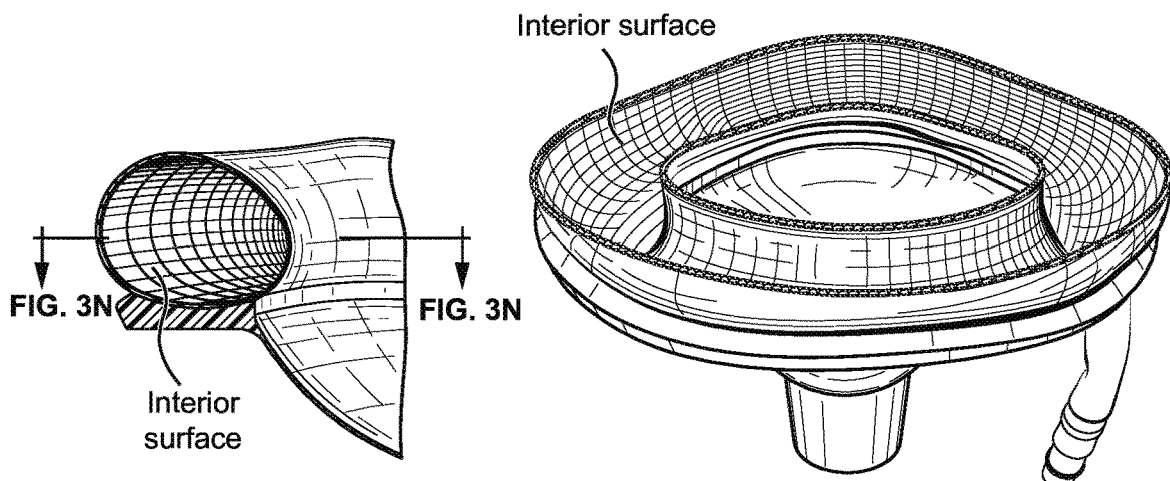
FIG. 3M   FIG. 3N

Left-hand rule
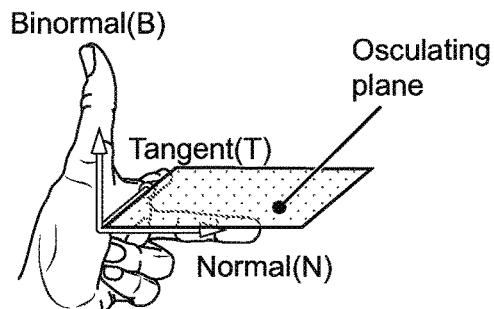
FIG. 3O
Right-hand rule
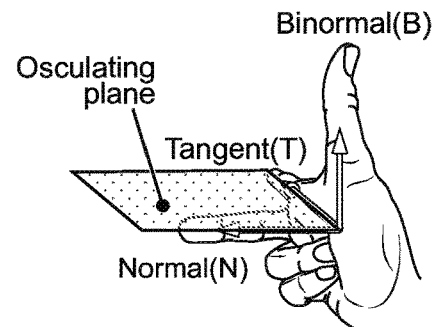
FIG. 3P
Left ear helix
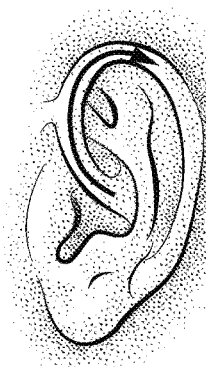
FIG. 3Q
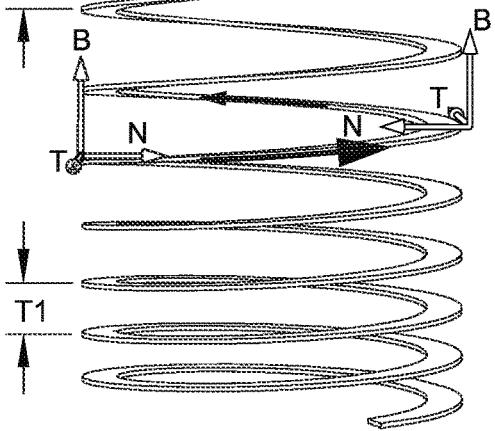
Right-hand helix
Right-hand positive
FIG. 3S
Right ear helix
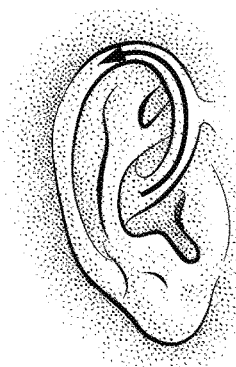
FIG. 3R
FIG. 3T
Copyright 2015 ResMed Limited

NATURAL BREATHING FULL FACE MASK

1. CROSS-REFERENCE TO RELATED APPLICATIONS

This application claims the benefit of Australian Provisional Patent Application No. 2021903059, filed Sep. 23, 2021, which is incorporated herein by reference in its entirety.

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

2 BACKGROUND OF THE TECHNOLOGY

2.1 Field of the Technology

The present technology relates to one or more of the screening, diagnosis, monitoring, treatment, prevention and amelioration of respiratory-related disorders. The present technology also relates to medical devices or apparatus, and their use.

2.2 Description of the Related Art

2.2.1 Human Respiratory System and its Disorders

The respiratory system of the body facilitates gas exchange. The nose and mouth form the entrance to the airways of a patient.

The airways include a series of branching tubes, which become narrower, shorter and more numerous as they penetrate deeper into the lung. The prime function of the lung is gas exchange, allowing oxygen to move from the inhaled air into the venous blood and carbon dioxide to move in the opposite direction. The trachea divides into right and left main bronchi, which further divide eventually into terminal bronchioles. The bronchi make up the conducting airways, and do not take part in gas exchange. Further divisions of the airways lead to the respiratory bronchioles, and eventually to the alveoli. The alveolated region of the lung is where the gas exchange takes place, and is referred to as the respiratory zone. See "*Respiratory Physiology*", by John B. West, Lippincott Williams & Wilkins, 9th edition published 2012.

A range of respiratory disorders exist. Certain disorders may be characterised by particular events, e.g. apneas, hypopneas, and hyperpneas.

Examples of respiratory disorders include Obstructive Sleep Apnea (OSA), Cheyne-Stokes Respiration (CSR), respiratory insufficiency, Obesity Hyperventilation Syndrome (OHS), Chronic Obstructive Pulmonary Disease (COPD), Neuromuscular Disease (NMD) and Chest wall disorders.

Obstructive Sleep Apnea (OSA), a form of Sleep Disordered Breathing (SDB), is characterised by events including occlusion or obstruction of the upper air passage during sleep. It results from a combination of an abnormally small upper airway and the normal loss of muscle tone in the region of the tongue, soft palate and posterior oropharyngeal wall during sleep. The condition causes the affected patient to stop breathing for periods typically of 30 to 120 seconds in duration, sometimes 200 to 300 times per night. It often causes excessive daytime somnolence, and it may cause cardiovascular disease and brain damage. The syndrome is a common disorder, particularly in middle aged overweight males, although a person affected may have no awareness of the problem. See U.S. Pat. No. 4,944,310 (Sullivan).

Cheyne-Stokes Respiration (CSR) is another form of sleep disordered breathing. CSR is a disorder of a patient's respiratory controller in which there are rhythmic alternating periods of waxing and waning ventilation known as CSR cycles. CSR is characterised by repetitive de-oxygenation and re-oxygenation of the arterial blood. It is possible that CSR is harmful because of the repetitive hypoxia. In some patients CSR is associated with repetitive arousal from sleep, which causes severe sleep disruption, increased sympathetic activity, and increased afterload. See U.S. Pat. No. 6,532,959 (Berthon-Jones).

Respiratory failure is an umbrella term for respiratory disorders in which the lungs are unable to inspire sufficient oxygen or exhale sufficient $CO_2$ to meet the patient's needs. Respiratory failure may encompass some or all of the following disorders.

A patient with respiratory insufficiency (a form of respiratory failure) may experience abnormal shortness of breath on exercise.

Obesity Hyperventilation Syndrome (OHS) is defined as the combination of severe obesity and awake chronic hypercapnia, in the absence of other known causes for hypoventilation. Symptoms include dyspnea, morning headache and excessive daytime sleepiness.

Chronic Obstructive Pulmonary Disease (COPD) encompasses any of a group of lower airway diseases that have certain characteristics in common. These include increased resistance to air movement, extended expiratory phase of respiration, and loss of the normal elasticity of the lung. Examples of COPD are emphysema and chronic bronchitis. COPD is caused by chronic tobacco smoking (primary risk factor), occupational exposures, air pollution and genetic factors. Symptoms include: dyspnea on exertion, chronic cough and sputum production.

Neuromuscular Disease (NMD) is a broad term that encompasses many diseases and ailments that impair the functioning of the muscles either directly via intrinsic muscle pathology, or indirectly via nerve pathology. Some NMD patients are characterised by progressive muscular impairment leading to loss of ambulation, being wheelchair-bound, swallowing difficulties, respiratory muscle weakness and, eventually, death from respiratory failure. Neuromuscular disorders can be divided into rapidly progressive and slowly progressive: (i) Rapidly progressive disorders: Characterised by muscle impairment that worsens over months and results in death within a few years (e.g. Amyotrophic lateral sclerosis (ALS) and Duchenne muscular dystrophy (DMD) in teenagers); (ii) Variable or slowly progressive disorders: Characterised by muscle impairment that worsens over years and only mildly reduces life expectancy (e.g. Limb girdle, Facioscapulohumeral and Myotonic muscular dystrophy). Symptoms of respiratory failure in NMD include: increasing generalised weakness, dysphagia, dyspnea on exertion and at rest, fatigue, sleepiness, morning headache, and difficulties with concentration and mood changes.

Chest wall disorders are a group of thoracic deformities that result in inefficient coupling between the respiratory muscles and the thoracic cage. The disorders are usually characterised by a restrictive defect and share the potential of long term hypercapnic respiratory failure. Scoliosis and/or kyphoscoliosis may cause severe respiratory failure. Symptoms of respiratory failure include: dyspnea on exertion, peripheral oedema, orthopnea, repeated chest infections, morning headaches, fatigue, poor sleep quality and loss of appetite.

A range of therapies have been used to treat or ameliorate such conditions. Furthermore, otherwise healthy individuals may take advantage of such therapies to prevent respiratory disorders from arising. However, these have a number of shortcomings.

2.2.2 Therapies

Various respiratory therapies, such as Continuous Positive Airway Pressure (CPAP) therapy, Non-invasive ventilation (NIV), Invasive ventilation (IV), and High Flow Therapy (HFT) have been used to treat one or more of the above respiratory disorders.

2.2.2.1 Respiratory Pressure Therapies

Respiratory pressure therapy is the application of a supply of air to an entrance to the airways at a controlled target pressure that is nominally positive with respect to atmosphere throughout the patient's breathing cycle (in contrast to negative pressure therapies such as the tank ventilator or cuirass).

Continuous Positive Airway Pressure (CPAP) therapy has been used to treat Obstructive Sleep Apnea (OSA). The mechanism of action is that continuous positive airway pressure acts as a pneumatic splint and may prevent upper airway occlusion, such as by pushing the soft palate and tongue forward and away from the posterior oropharyngeal wall. Treatment of OSA by CPAP therapy may be voluntary, and hence patients may elect not to comply with therapy if they find devices used to provide such therapy one or more of: uncomfortable, difficult to use, expensive and aesthetically unappealing.

Non-invasive ventilation (NIV) provides ventilatory support to a patient through the upper airways to assist the patient breathing and/or maintain adequate oxygen levels in the body by doing some or all of the work of breathing. The ventilatory support is provided via a non-invasive patient interface. NIV has been used to treat CSR and respiratory failure, in forms such as OHS, COPD, NMD and Chest Wall disorders. In some forms, the comfort and effectiveness of these therapies may be improved.

Invasive ventilation (IV) provides ventilatory support to patients that are no longer able to effectively breathe themselves and may be provided using a tracheostomy tube or endotracheal tube. In some forms, the comfort and effectiveness of these therapies may be improved.

2.2.2.2 Flow Therapies

Not all respiratory therapies aim to deliver a prescribed therapeutic pressure. Some respiratory therapies aim to deliver a prescribed respiratory volume, by delivering an inspiratory flow rate profile over a targeted duration, possibly superimposed on a positive baseline pressure. In other cases, the interface to the patient's airways is 'open' (unsealed) and the respiratory therapy may only supplement the patient's own spontaneous breathing with a flow of conditioned or enriched gas. In one example, High Flow therapy (HFT) is the provision of a continuous, heated, humidified flow of air to an entrance to the airway through an unsealed or open patient interface at a "treatment flow rate" that may be held approximately constant throughout the respiratory cycle. The treatment flow rate is nominally set to exceed the patient's peak inspiratory flow rate. HFT has been used to treat OSA, CSR, respiratory failure, COPD, and other respiratory disorders. One mechanism of action is that the high flow rate of air at the airway entrance improves ventilation efficiency by flushing, or washing out, expired CO2 from the patient's anatomical deadspace. Hence, HFT is thus sometimes referred to as a deadspace therapy (DST). Other benefits may include the elevated warmth and humidification (possibly of benefit in secretion management) and the potential for modest elevation of airway pressures. As an alternative to constant flow rate, the treatment flow rate may follow a profile that varies over the respiratory cycle.

Another form of flow therapy is long-term oxygen therapy (LTOT) or supplemental oxygen therapy. Doctors may prescribe a continuous flow of oxygen enriched air at a specified oxygen concentration (from 21%, the oxygen fraction in ambient air, to 100%) at a specified flow rate (e.g., 1 litre per minute (LPM), 2 LPM, 3 LPM, etc.) to be delivered to the patient's airway.

2.2.3 Respiratory Therapy Systems

These respiratory therapies may be provided by a respiratory therapy system or device. Such systems and devices may also be used to screen, diagnose, or monitor a condition without treating it.

A respiratory therapy system may comprise a Respiratory Pressure Therapy Device (RPT device), an air circuit, a humidifier, a patient interface, an oxygen source, and data management.

2.2.3.1 Patient Interface

A patient interface may be used to interface respiratory equipment to its wearer, for example by providing a flow of air to an entrance to the airways. The flow of air may be provided via a mask to the nose and/or mouth, a tube to the mouth or a tracheostomy tube to the trachea of a patient. Depending upon the therapy to be applied, the patient interface may form a seal, e.g., with a region of the patient's face, to facilitate the delivery of gas at a pressure at sufficient variance with ambient pressure to effect therapy, e.g., at a positive pressure of about 10 $cmH_2O$ relative to ambient pressure. For other forms of therapy, such as the delivery of oxygen, the patient interface may not include a seal sufficient to facilitate delivery to the airways of a supply of gas at a positive pressure of about 10 $cmH_2O$. For flow therapies such as nasal HFT, the patient interface is configured to insufflate the nares but specifically to avoid a complete seal. One example of such a patient interface is a nasal cannula.

Certain other mask systems may be functionally unsuitable for the present field. For example, purely ornamental masks may be unable to maintain a suitable pressure. Mask systems used for underwater swimming or diving may be configured to guard against ingress of water from an external higher pressure, but not to maintain air internally at a higher pressure than ambient.

Certain masks may be clinically unfavourable for the present technology e.g. if they block airflow via the nose and only allow it via the mouth.

Certain masks may be uncomfortable or impractical for the present technology if they require a patient to insert a portion of a mask structure in their mouth to create and maintain a seal via their lips.

Certain masks may be impractical for use while sleeping, e.g. for sleeping while lying on one's side in bed with a head on a pillow.

The design of a patient interface presents a number of challenges. The face has a complex three-dimensional shape. The size and shape of noses and heads varies considerably between individuals. Since the head includes bone, cartilage and soft tissue, different regions of the face respond differently to mechanical forces. The jaw or mandible may move relative to other bones of the skull. The whole head may move during the course of a period of respiratory therapy.

As a consequence of these challenges, some masks suffer from being one or more of obtrusive, aesthetically undesirable, costly, poorly fitting, difficult to use, and uncomfortable especially when worn for long periods of time or when a patient is unfamiliar with a system. Wrongly sized masks can give rise to reduced compliance, reduced comfort and poorer patient outcomes. Masks designed solely for aviators, masks designed as part of personal protection equipment (e.g. filter masks), SCUBA masks, or for the administration of anaesthetics may be tolerable for their original application, but nevertheless such masks may be undesirably uncomfortable to be worn for extended periods of time, e.g., several hours. This discomfort may lead to a reduction in patient compliance with therapy. This is even more so if the mask is to be worn during sleep.

CPAP therapy is highly effective to treat certain respiratory disorders, provided patients comply with therapy. If a mask is uncomfortable, or difficult to use a patient may not comply with therapy. Since it is often recommended that a patient regularly wash their mask, if a mask is difficult to clean (e.g., difficult to assemble or disassemble), patients may not clean their mask and this may impact on patient compliance.

While a mask for other applications (e.g. aviators) may not be suitable for use in treating sleep disordered breathing, a mask designed for use in treating sleep disordered breathing may be suitable for other applications.

For these reasons, patient interfaces for delivery of CPAP during sleep form a distinct field.

2.2.3.1.1 Seal-Forming Structure

Patient interfaces may include a seal-forming structure. Since it is in direct contact with the patient's face, the shape and configuration of the seal-forming structure can have a direct impact the effectiveness and comfort of the patient interface.

A patient interface may be partly characterised according to the design intent of where the seal-forming structure is to engage with the face in use. In one form of patient interface, a seal-forming structure may comprise a first sub-portion to form a seal around the left naris and a second sub-portion to form a seal around the right naris. In one form of patient interface, a seal-forming structure may comprise a single element that surrounds both nares in use. Such single element may be designed to for example overlay an upper lip region and a nasal bridge region of a face. In one form of patient interface a seal-forming structure may comprise an element that surrounds a mouth region in use, e.g. by forming a seal on a lower lip region of a face. In one form of patient interface, a seal-forming structure may comprise a single element that surrounds both nares and a mouth region in use. These different types of patient interfaces may be known by a variety of names by their manufacturer including nasal masks, full-face masks, nasal pillows, nasal puffs and oro-nasal masks.

A seal-forming structure that may be effective in one region of a patient's face may be inappropriate in another region, e.g. because of the different shape, structure, variability and sensitivity regions of the patient's face. For example, a seal on swimming goggles that overlays a patient's forehead may not be appropriate to use on a patient's nose.

Certain seal-forming structures may be designed for mass manufacture such that one design fit and be comfortable and effective for a wide range of different face shapes and sizes. To the extent to which there is a mismatch between the shape of the patient's face, and the seal-forming structure of the mass-manufactured patient interface, one or both must adapt in order for a seal to form.

One type of seal-forming structure extends around the periphery of the patient interface, and is intended to seal against the patient's face when force is applied to the patient interface with the seal-forming structure in confronting engagement with the patient's face. The seal-forming structure may include an air or fluid filled cushion, or a moulded or formed surface of a resilient seal element made of an elastomer such as a rubber. With this type of seal-forming structure, if the fit is not adequate, there will be gaps between the seal-forming structure and the face, and additional force will be required to force the patient interface against the face in order to achieve a seal.

Another type of seal-forming structure incorporates a flap seal of thin material positioned about the periphery of the mask so as to provide a self-sealing action against the face of the patient when positive pressure is applied within the mask. Like the previous style of seal forming portion, if the match between the face and the mask is not good, additional force may be required to achieve a seal, or the mask may leak. Furthermore, if the shape of the seal-forming structure does not match that of the patient, it may crease or buckle in use, giving rise to leaks.

Another type of seal-forming structure may comprise a friction-fit element, e.g. for insertion into a naris, however some patients find these uncomfortable.

Another form of seal-forming structure may use adhesive to achieve a seal. Some patients may find it inconvenient to constantly apply and remove an adhesive to their face.

A range of patient interface seal-forming structure technologies are disclosed in the following patent applications, assigned to ResMed Limited: WO 1998/004310; WO 2006/074513; WO 2010/135785.

One form of nasal pillow is found in the Adam Circuit manufactured by Puritan Bennett. Another nasal pillow, or nasal puff is the subject of U.S. Pat. No. 4,782,832 (Trimble et al.), assigned to Puritan-Bennett Corporation.

ResMed Limited has manufactured the following products that incorporate nasal pillows: SWIFT™ nasal pillows mask, SWIFT™ II nasal pillows mask, SWIFT™ LT nasal pillows mask, SWIFT™ FX nasal pillows mask and MIRAGE LIBERTY™ full-face mask. The following patent applications, assigned to ResMed Limited, describe examples of nasal pillows masks: International Patent Application WO2004/073,778 (describing amongst other things aspects of the ResMed Limited SWIFT™ nasal pillows), US Patent Application 2009/0044808 (describing amongst other things aspects of the ResMed Limited SWIFT™ LT nasal pillows); International Patent Applications WO 2005/063328 and WO 2006/130903 (describing amongst other things aspects of the ResMed Limited MIRAGE LIBERTY™ full-face mask); International Patent Application WO 2009/052560 (describing amongst other things aspects of the ResMed Limited SWIFT™ FX nasal pillows).

2.2.3.1.2 Positioning and Stabilising

A seal-forming structure of a patient interface used for positive air pressure therapy is subject to the corresponding force of the air pressure to disrupt a seal. Thus a variety of techniques have been used to position the seal-forming structure, and to maintain it in sealing relation with the appropriate portion of the face.

One technique is the use of adhesives. See for example US Patent Application Publication No. US 2010/0000534. However, the use of adhesives may be uncomfortable for some.

Another technique is the use of one or more straps and/or stabilising harnesses. Many such harnesses suffer from being one or more of ill-fitting, bulky, uncomfortable and awkward to use.

2.2.3.2 Respiratory Pressure Therapy (RPT) Device

A respiratory pressure therapy (RPT) device may be used individually or as part of a system to deliver one or more of a number of therapies described above, such as by operating the device to generate a flow of air for delivery to an interface to the airways. The flow of air may be pressure-controlled (for respiratory pressure therapies) or flow-controlled (for flow therapies such as HFT). Thus RPT devices may also act as flow therapy devices. Examples of RPT devices include a CPAP device and a ventilator.

The designer of a device may be presented with an infinite number of choices to make. Design criteria often conflict, meaning that certain design choices are far from routine or inevitable. Furthermore, the comfort and efficacy of certain aspects may be highly sensitive to small, subtle changes in one or more parameters.

2.2.3.3 Air Circuit

An air circuit is a conduit or a tube constructed and arranged to allow, in use, a flow of air to travel between two components of a respiratory therapy system such as the RPT device and the patient interface. In some cases, there may be separate limbs of the air circuit for inhalation and exhalation. In other cases, a single limb air circuit is used for both inhalation and exhalation.

2.2.3.4 Humidifier

Delivery of a flow of air without humidification may cause drying of airways. The use of a humidifier with an RPT device and the patient interface produces humidified gas that minimizes drying of the nasal mucosa and increases patient airway comfort. In addition, in cooler climates, warm air applied generally to the face area in and about the patient interface is more comfortable than cold air.

2.2.3.5 Data Management

There may be clinical reasons to obtain data to determine whether the patient prescribed with respiratory therapy has been "compliant", e.g. that the patient has used their RPT device according to one or more "compliance rules". One example of a compliance rule for CPAP therapy is that a patient, in order to be deemed compliant, is required to use the RPT device for at least four hours a night for at least 21 of 30 consecutive days. In order to determine a patient's compliance, a provider of the RPT device, such as a health care provider, may manually obtain data describing the patient's therapy using the RPT device, calculate the usage over a predetermined time period, and compare with the compliance rule. Once the health care provider has determined that the patient has used their RPT device according to the compliance rule, the health care provider may notify a third party that the patient is compliant.

There may be other aspects of a patient's therapy that would benefit from communication of therapy data to a third party or external system.

Existing processes to communicate and manage such data can be one or more of costly, time-consuming, and error-prone.

2.2.3.6 Vent Technologies

Some forms of treatment systems may include a vent to allow the washout of exhaled carbon dioxide. The vent may allow a flow of gas from an interior space of a patient interface, e.g., the plenum chamber, to an exterior of the patient interface, e.g., to ambient.

The vent may comprise an orifice and gas may flow through the orifice in use of the mask. Many such vents are noisy. Others may become blocked in use and thus provide insufficient washout. Some vents may be disruptive of the sleep of a bed partner 1100 of the patient 1000, e.g. through noise or focused airflow.

ResMed Limited has developed a number of improved mask vent technologies. See International Patent Application Publication No. WO 1998/034665; International Patent Application Publication No. WO 2000/078381; U.S. Pat. No. 6,581,594; US Patent Application Publication No. US 2009/0050156; US Patent Application Publication No. 2009/0044808.

| Table of noise of prior masks (ISO 17510-2:2007, 10 cmH2O pressure at 1 m) | | | | |
|---|---|---|---|---|
| Mask name | Mask type | A-weighted sound power level dB(A) (uncertainty) | A-weighted sound pressure dB(A) (uncertainty) | Year (approx.) |
| Glue-on (*) | nasal | 50.9 | 42.9 | 1981 |
| ResCare standard (*) | nasal | 31.5 | 23.5 | 1993 |
| ResMed MirageTM (*) | nasal | 29.5 | 21.5 | 1998 |
| ResMed UltraMirageTM | nasal | 36 (3) | 28 (3) | 2000 |
| ResMed Mirage ActivaTM | nasal | 32 (3) | 24 (3) | 2002 |
| ResMed Mirage MicroTM | nasal | 30 (3) | 22 (3) | 2008 |
| ResMed MirageTM SoftGel | nasal | 29 (3) | 22 (3) | 2008 |
| ResMed MirageTM FX | nasal | 26 (3) | 18 (3) | 2010 |
| ResMed Mirage SwiftTM (*) | nasal pillows | 37 | 29 | 2004 |
| ResMed Mirage SwiftTM II | nasal pillows | 28 (3) | 20 (3) | 2005 |
| ResMed Mirage SwiftTM LT | nasal pillows | 25 (3) | 17 (3) | 2008 |
| ResMed AirFit P10 | nasal pillows | 21 (3) | 13 (3) | 2014 |

(* one specimen only, measured using test method specified in ISO 3744 in CPAP mode at 10 cmH2O)

Sound pressure values of a variety of objects are listed below

| Object | A-weighted sound pressure dB(A) | Notes |
|---|---|---|
| Vacuum cleaner: Nilfisk Walter Broadly Litter Hog: B+ Grade | 68 | ISO 3744 at 1 m distance |
| Conversational speech | 60 | 1 m distance |
| Average home | 50 | |
| Quiet library | 40 | |
| Quiet bedroom at night | 30 | |
| Background in TV studio | 20 | |

2.2.4 Screening, Diagnosis, and Monitoring Systems

Polysomnography (PSG) is a conventional system for diagnosis and monitoring of cardio-pulmonary disorders, and typically involves expert clinical staff to apply the system. PSG typically involves the placement of 15 to 20 contact sensors on a patient in order to record various bodily signals such as electroencephalography (EEG), electrocardiography (ECG), electrooculography (EOG), electromyography (EMG), etc. PSG for sleep disordered breathing has involved two nights of observation of a patient in a clinic, one night of pure diagnosis and a second night of titration of treatment parameters by a clinician. PSG is therefore expensive and inconvenient. In particular, it is unsuitable for home screening/diagnosis/monitoring of sleep disordered breathing.

Screening and diagnosis generally describe the identification of a condition from its signs and symptoms. Screening typically gives a true/false result indicating whether or not a patient's SDB is severe enough to warrant further investigation, while diagnosis may result in clinically actionable information. Screening and diagnosis tend to be one-off processes, whereas monitoring the progress of a condition can continue indefinitely. Some screening/diagnosis systems are suitable only for screening/diagnosis, whereas some may also be used for monitoring.

Clinical experts may be able to screen, diagnose, or monitor patients adequately based on visual observation of PSG signals. However, there are circumstances where a clinical expert may not be available, or a clinical expert may not be affordable. Different clinical experts may disagree on a patient's condition. In addition, a given clinical expert may apply a different standard at different times.

3 BRIEF SUMMARY OF THE TECHNOLOGY

The present technology is directed towards providing medical devices used in the screening, diagnosis, monitoring, amelioration, treatment, or prevention of respiratory disorders having one or more of improved comfort, cost, efficacy, ease of use and manufacturability.

A first aspect of the present technology relates to apparatus used in the screening, diagnosis, monitoring, amelioration, treatment or prevention of a respiratory disorder.

Another aspect of the present technology relates to methods used in the screening, diagnosis, monitoring, amelioration, treatment or prevention of a respiratory disorder.

An aspect of certain forms of the present technology is to provide methods and/or apparatus that improve the compliance of patients with respiratory therapy.

One form of the present technology comprises a patient interface comprising:
a plenum chamber pressurisable to a therapeutic pressure of at least 4 cmH2O above ambient air pressure; and
a seal-forming structure constructed and arranged to form a seal with a region of the patient's face surrounding an entrance to the patient's airways.

One form of the present technology comprises a patient interface comprising:
a plenum chamber pressurisable to a therapeutic pressure of at least 4 cmH2O above ambient air pressure, the plenum chamber including at least one plenum chamber inlet port configured to convey the flow of air into the plenum chamber;
a seal-forming structure constructed and arranged to form a seal with a region of the patient's face surrounding an entrance to the patient's nares, said seal-forming structure having a hole therein such that the flow of air at said therapeutic pressure is delivered to at least an entrance to the patient's nares, the seal-forming structure constructed and arranged to maintain said therapeutic pressure in the plenum chamber throughout the patient's respiratory cycle in use; and
a positioning and stabilising structure to provide a force to hold the seal-forming structure in a therapeutically effective position on the patient's head.

One form of the present technology comprises a valve structure movable between an open position and a closed position in order to selectively direct airflow.

Another aspect of one form of the present technology is a valve structure positioned between an oral plenum chamber and a nasal plenum chamber and configured to selectively control airflow there between.

Another aspect of one form of the present technology is a valve body having a first opening and a second opening, and an adjustment structure pivotably connected to the valve body, wherein the adjustment structure is movable to selectively open and allow airflow through the first opening and selectively close and limit airflow through the second opening.

Another aspect of one form of the present technology is a cushion configured to promote natural breathing through a patient's nares, the cushion including a valve assembly in order to selectively direct airflow to the patient's nares and/or away from the patient's mouth.

Another aspect of one form of the present technology is a valve including valve body and an adjustment structure being positioned between the nasal chamber and the oral chamber and being movable relative to the valve body, the adjustment structure movable between an open position configured to allow airflow between the nasal plenum chamber and the oral plenum chamber, and a closed position configured to limit airflow between the nasal plenum chamber and the oral plenum chamber.

In one form, the adjustment structure is configured to allow airflow through the nasal vent in the closed position and is configured to limit airflow through the nasal vent in the open position.

Another form of the present technology comprises a valve for use in a patient interface, the valve comprising:
valve body configured to be positioned between a nasal chamber and an oral chamber of the patient interface, the valve body including a first body opening and a second body opening; and
an adjustment structure connected to the valve body and being movable relative to the valve body, the adjustment structure movable between an open position configured to allow airflow through the first body opening, and a closed position configured to limit airflow through the first body opening; and wherein the adjustment structure is configured to allow airflow through the second body opening in the closed position and is configured to limit airflow through the second body opening in the open position.

Another form of the present technology comprises a patient interface for sealed delivery of a flow of air at a continuously positive pressure with respect to ambient air pressure to an entrance to a patient's airways including at least an entrance of a patient's nares, wherein the patient interface is configured to maintain a therapy pressure in a range of about 4 cmH2O to about 30 cmH2O above ambient air pressure in use, throughout a patient's respiratory cycle, while the patient is sleeping, to ameliorate sleep disordered breathing; said patient interface comprising:

a cushion comprising,
a nasal portion comprising:
 a nasal plenum chamber at least partially forming a nasal cavity pressurisable to a therapeutic pressure of at least 4 cmH2O above ambient air pressure, the nasal plenum chamber including at least one plenum chamber inlet port configured to convey the flow of air into the nasal plenum chamber;
 a nasal seal-forming structure constructed and arranged to form a seal with a region of the patient's face surrounding an entrance to the patient's nares, said nasal seal-forming structure having a hole therein such that the flow of air at said therapeutic pressure is delivered to at least an entrance to the patient's nares, the nasal seal-forming structure constructed and arranged to maintain said therapeutic pressure in the nasal plenum chamber throughout the patient's respiratory cycle in use; and
 a nasal vent structure connected to the nasal plenum chamber and configured to allow gases to flow from an interior of the nasal plenum chamber to ambient, said nasal vent structure being sized and shaped to maintain the therapeutic pressure in the nasal plenum chamber in use;
an oral portion comprising:
 an oral plenum chamber at least partially forming an oral cavity pressurisable above ambient air pressure; and
 an oral seal-forming structure constructed and arranged to form a seal with a region of the patient's face surrounding an entrance to the patient's mouth, said oral seal-forming structure having a hole therein such that air in the oral cavity is delivered to at least an entrance to the patient's mouth, the oral seal-forming structure constructed and arranged to maintain said therapeutic pressure in the oral plenum chamber throughout the patient's respiratory cycle in use;
a passage formed between the nasal plenum chamber and the oral plenum chamber, wherein the passage is configured to allow airflow to pass between the nasal plenum chamber and the oral plenum chamber;
a valve including valve body and an adjustment structure being positioned between the nasal chamber and the oral chamber and being movable relative to the valve body, the adjustment structure movable between an open position configured to allow airflow between the nasal plenum chamber and the oral plenum chamber, and a closed position configured to limit airflow between the nasal plenum chamber and the oral plenum chamber; and a positioning and stabilising structure to provide a force to hold the nasal seal-forming structure and the oral seal-forming structure in a therapeutically effective position on the patient's head; and wherein the adjustment structure is configured to allow airflow through the nasal vent in the closed position and is configured to limit airflow through the nasal vent in the open position.

In some forms: a) the adjustment structure is rotatable between the open position and the closed position; b) the adjustment structure is movable between about 1° and about 179° between the open position and the closed position; c) the adjustment structure is movable between about 30° and about 70°; and/or d) the adjustment structure is movable between about 50°.

In some forms: a) the valve body is removably positioned within the passageway; and/or b) the valve body is connected to the cushion is a snap-fit, press fit, or friction fit.

In some forms: a) the valve body is integrally formed with the cushion; and/or b) the valve body is overmolded to the cushion.

In some forms: a) the valve body is formed form a rigid material; and/or b) the valve body is formed from a flexible material.

In some forms: a) the nasal vent structure is formed on the valve body; b) the valve body includes a first body opening configured to communicate with the passage; c) the valve body includes a second body opening configured to communicate with nasal vent structure; d) the first body opening is oriented in a first direction and the second body opening is oriented in a second direction substantially perpendicular to the first direction; e) the second body opening is formed within an inner housing; f) the inner housing includes a cylindrical shape; g) the adjustment structure is rotatably connected to the inner housing; h) the adjustment structure includes a first adjustment opening and a second adjustment opening; i) the first adjustment opening is aligned with the first body opening in the open position, and wherein the second adjustment opening is aligned with the second body opening in the closed position; j) the first adjustment opening is at least partially aligned with the first body opening in the closed position; k) the adjustment structure completely covers the first adjustment opening in the closed position so that the first adjustment opening is not aligned with the first body opening; l) the first adjustment opening is larger than the first body opening; and/or m) wherein the second adjustment opening is larger than the second body opening.

In some forms: a) the adjustment structure includes a generally circular body having an interfacing structure; b) the patient configured to engage the interfacing structure to move the adjustment structure between the open position and the closed position; c) the interfacing structure is formed as a notch; d) the interfacing structure is formed as a cylindrical body projecting from a surface of the adjustment structure; e) the adjustment structure is constructed from hard plastic; and/or f) the valve body includes a stop structure configured to retain the adjustment structure in the desired position.

In some forms: a) an oral vent structure connected to the oral plenum chamber and configured to allow gases to flow between an interior of the oral plenum chamber and the ambient; b) the oral vent structure being sized and shaped to maintain the therapeutic pressure in the oral plenum chamber in use; c) the oral vent is formed from a series of holes that are configured to exhaust gas from the oral plenum chamber to the ambient; and/or d) the oral vent is an anti-asphyxia valve (AAV) and is biased to a normally open position and is configured to close as a result of the flow of pressurized air in the oral plenum chamber, the AAV configured to return to the open position when a pressure within the cushion falls below the therapy pressure.

Another form of the present technology comprises a method for influencing a patient to use nasal breathing, the method comprising:
  receiving a human input through a display on a device;
  receiving a signal associated with the human input;
  outputting a control signal to a valve assembly of a patient interface configured to maintain a therapy pressure in a range of about 4 cmH2O to about 30 cmH2O above ambient air pressure in use, throughout a patient's respiratory cycle to ameliorate sleep disordered breathing;
  actuating a motor actuates as a result of the control signal, the motor connected to an adjustment structure formed as part of the valve assembly, the adjustment structure configured to selectively divide an interior of the patient interface;
  measuring at least one patient parameter using a sensor positioned in the patient interface after the actuating is complete;
  communicating at least one measured value of the at least one patient parameter to the device;
  comparing the at least one measured value to a threshold value; and
  outputting a recommendation for a positional change for the adjustment structure through the display.

In some forms: a) outputting the recommendation occurs during a therapy session; and/or b) outputting the recommendation occurs after a therapy session.

In some forms: a) the device is remote from the patient interface; and/or b) the device is wirelessly connected to the patient interface.

In some forms: a) the display is a screen configured to receive human input; b) the at least one parameter includes frequency of nasal inhalation to oral inhalation; c) the patient interface includes an oral plenum chamber and a nasal plenum chamber; d) actuating the motor is configured to selectively control airflow between the oral plenum chamber and the nasal plenum chamber; and/or e) actuating the motor is configured to selectively control airflow through a nasal vent simultaneously to controlling airflow between the oral plenum chamber and the nasal plenum chamber.

In some forms: a) the valve assembly includes a first opening and a second opening; and/or b) actuating the motor to move the adjustment structure is configured to expose one of the first opening and the second opening, and cover the other of the first opening and the second opening.

Another form of the present technology comprises a method for influencing a patient to use nasal breathing, the method comprising:
  outputting a control signal to a valve assembly of a patient interface configured to maintain a therapy pressure in a range of about 4 cmH2O to about 30 cmH2O above ambient air pressure in use, throughout a patient's respiratory cycle to ameliorate sleep disordered breathing;
  actuating a motor actuates as a result of the control signal, the motor connected to an adjustment structure formed as part of the valve assembly, the adjustment structure configured to selectively divide an interior of the patient interface;
  measuring at least one patient parameter using a sensor positioned in the patient interface after the actuating is complete;
  communicating at least one measured value of the at least one patient parameter to the device;
  comparing the at least one measured value to a threshold value; and
  storing a new value in the controller in response to the comparing.

In some forms, a human input is not required prior to outputting the control signal.

In some forms, the method further comprises manually directing the actuation of the motor. For example, the human may manually rotate the adjustment structure and/or the human may input a value in order to direct the adjustment of the motor. The method may continue to operate automatically after the conclusion of the human intervention.

In some forms: a) the new value is stored by the controller between sleep cycles; b) the new value is stored by the controller between patient breathes; and/or c) the controller analyses signals from an entire cycle to determine a starting signal for a subsequent cycle.

Another form of the present technology comprises an apparatus for monitoring patient breathing during a therapy session intended to ameliorate sleep disorder breathing, said system comprising:
  a patient interface configured to maintain a therapy pressure in a range of about 4 cmH2O to about 30 cmH2O above ambient air pressure in use throughout a patient's respiratory cycle, the patient interface comprising:
    a nasal cavity;
    an oral cavity;
    a passage formed between the nasal cavity and the oral cavity, wherein the passage is configured to allow airflow to pass between the nasal cavity and the oral cavity;
    at least one inlet port configured to convey the flow of air into the nasal cavity;
    a nasal vent structure is configured to allow gases to flow from an interior of the nasal cavity to ambient, said nasal vent structure being sized and shaped to maintain the therapeutic pressure in the nasal cavity in use;
    an adjustment structure positioned within the passage and movable between an open position configured to allow airflow between the nasal plenum chamber and the oral plenum chamber, and a closed position configured to limit airflow between the nasal plenum chamber and the oral plenum chamber;
  a sensor system comprising:
    a sensor positioned in the patient interface and configured to measure at least one patient parameter;
    a controller configured to output a signal based on the at least one patient parameter, the signal configured to indicate the patient's tolerance of the adjustment structure in the closed position and/or the open position; and
  wherein the adjustment structure is configured to allow airflow through the nasal vent in the closed position and is configured to limit airflow through the nasal vent in the open position.

In some forms: a) the at least one patient parameter includes frequency of nasal inhalation to oral inhalation; b) the adjustment structure is rotatable between the open position and the closed position; c) the adjustment structure includes a first adjustment opening and a second adjustment opening; d) the first adjustment opening is aligned with the passageway in the open position; and/or e) the second adjustment opening is aligned with the nasal vent structure in the closed position.

In some forms: a) an oral vent structure is configured to allow gases to flow between an interior of the oral cavity the ambient; b) oral vent structure being sized and shaped to maintain the therapeutic pressure in the oral plenum chamber in use; c) the oral vent structure is formed from a series of holes that are configured to exhaust gas from the oral cavity to the ambient; and/or d) the oral vent structure is an anti-asphyxia valve (AAV) and is biased to a normally unsealed position and is configured to close to a sealed position when a pressure within the cushion is greater than or equal to the therapy pressure.

In some forms: a) the controller is configured to output the signal to a display; b) the controller is configured to output the signal wirelessly; c) the controller is configured to output the signal via a wired connection; d) the controller is configured to output the signal after a therapy session; and/or e) the controller is configured to output the signal during the therapy session.

In some forms: a) a motor is connected to the adjustment structure and configured to drive movement of the adjustment structure between the open position and the closed position; b) the controller is configured to output the signal to the motor, the signal configured to drive the movement of the adjustment structure; c) the controller is in direct communication with the motor; d) the controller is in indirect communication with the motor; and/or e) the controller is configured to receive an input prior to communicating with the motor Another form of the present technology is a sensor system comprising:

a sensor positioned in the patient interface and configured to measure at least one patient parameter;

a controller configured to output a signal based on the at least one patient parameter, the signal configured to indicate the patient's tolerance of the adjustment structure in the closed position and/or the open position.

Another aspect of one form of the present technology is a patient interface that is moulded or otherwise constructed with a perimeter shape which is complementary to that of an intended wearer.

An aspect of one form of the present technology is a method of manufacturing apparatus.

An aspect of certain forms of the present technology is a medical device that is easy to use, e.g. by a person who does not have medical training, by a person who has limited dexterity, vision or by a person with limited experience in using this type of medical device.

An aspect of one form of the present technology is a portable RPT device that may be carried by a person, e.g., around the home of the person.

An aspect of one form of the present technology is a patient interface that may be washed in a home of a patient, e.g., in soapy water, without requiring specialised cleaning equipment. An aspect of one form of the present technology is a humidifier tank that may be washed in a home of a patient, e.g., in soapy water, without requiring specialised cleaning equipment.

The methods, systems, devices and apparatus described may be implemented so as to improve the functionality of a processor, such as a processor of a specific purpose computer, respiratory monitor and/or a respiratory therapy apparatus. Moreover, the described methods, systems, devices and apparatus can provide improvements in the technological field of automated management, monitoring and/or treatment of respiratory conditions, including, for example, sleep disordered breathing.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the FIGURES of the accompanying drawings, in which like reference numerals refer to similar elements including:

4.1 RESPIRATORY THERAPY SYSTEMS

FIG. 1A shows a system including a patient 1000 wearing a patient interface 3000, in the form of nasal pillows, receiving a supply of air at positive pressure from an RPT device 4000. Air from the RPT device 4000 is humidified in a humidifier 5000, and passes along an air circuit 4170 to the patient 1000. A bed partner 1100 is also shown. The patient is sleeping in a supine sleeping position.

FIG. 1B shows a system including a patient 1000 wearing a patient interface 3000, in the form of a nasal mask, receiving a supply of air at positive pressure from an RPT device 4000. Air from the RPT device is humidified in a humidifier 5000, and passes along an air circuit 4170 to the patient 1000.

FIG. 1C shows a system including a patient 1000 wearing a patient interface 3000, in the form of a full-face mask, receiving a supply of air at positive pressure from an RPT device 4000. Air from the RPT device 4000 is humidified in a humidifier 5000, and passes along an air circuit 4170 to the patient 1000. The patient is sleeping in a side sleeping position.

4.2 Respiratory System and Facial Anatomy

Figure 1A:
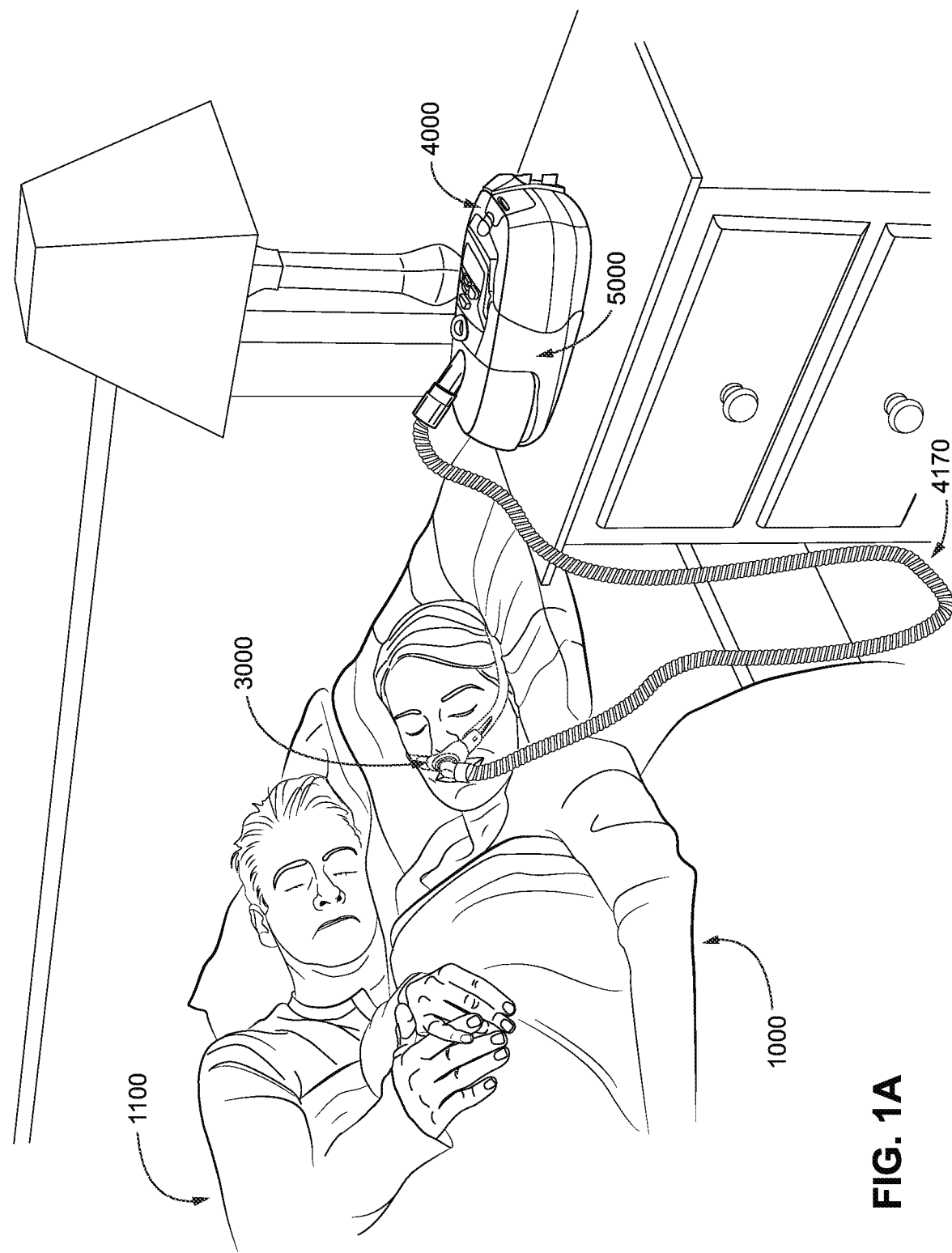
Figure 1B:
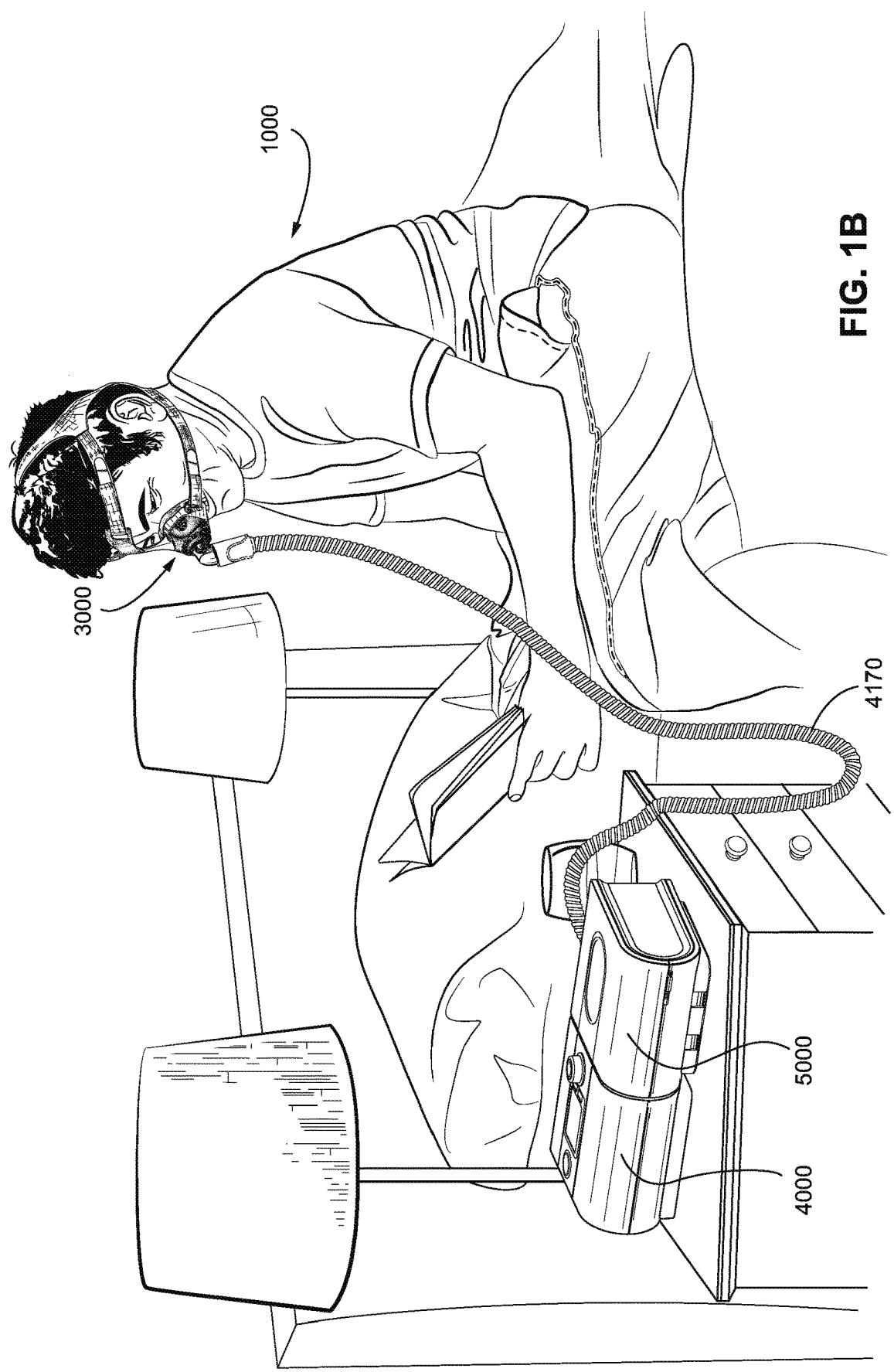
Figure 1C:
Figure 2A:
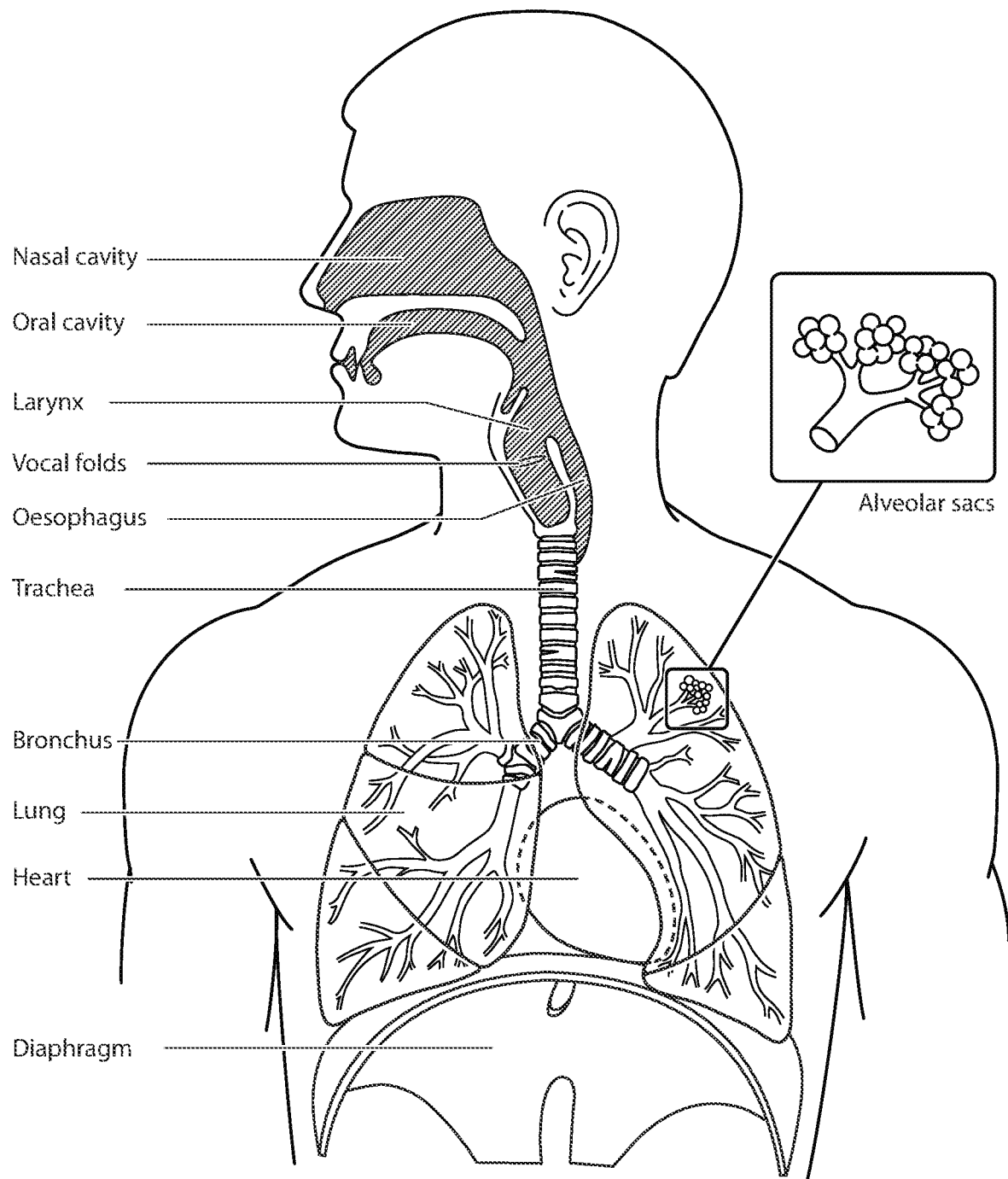
FIG. 2A shows an overview of a human respiratory system including the nasal and oral cavities, the larynx, vocal folds, oesophagus, trachea, bronchus, lung, alveolar sacs, heart and diaphragm.
Figure 2B:
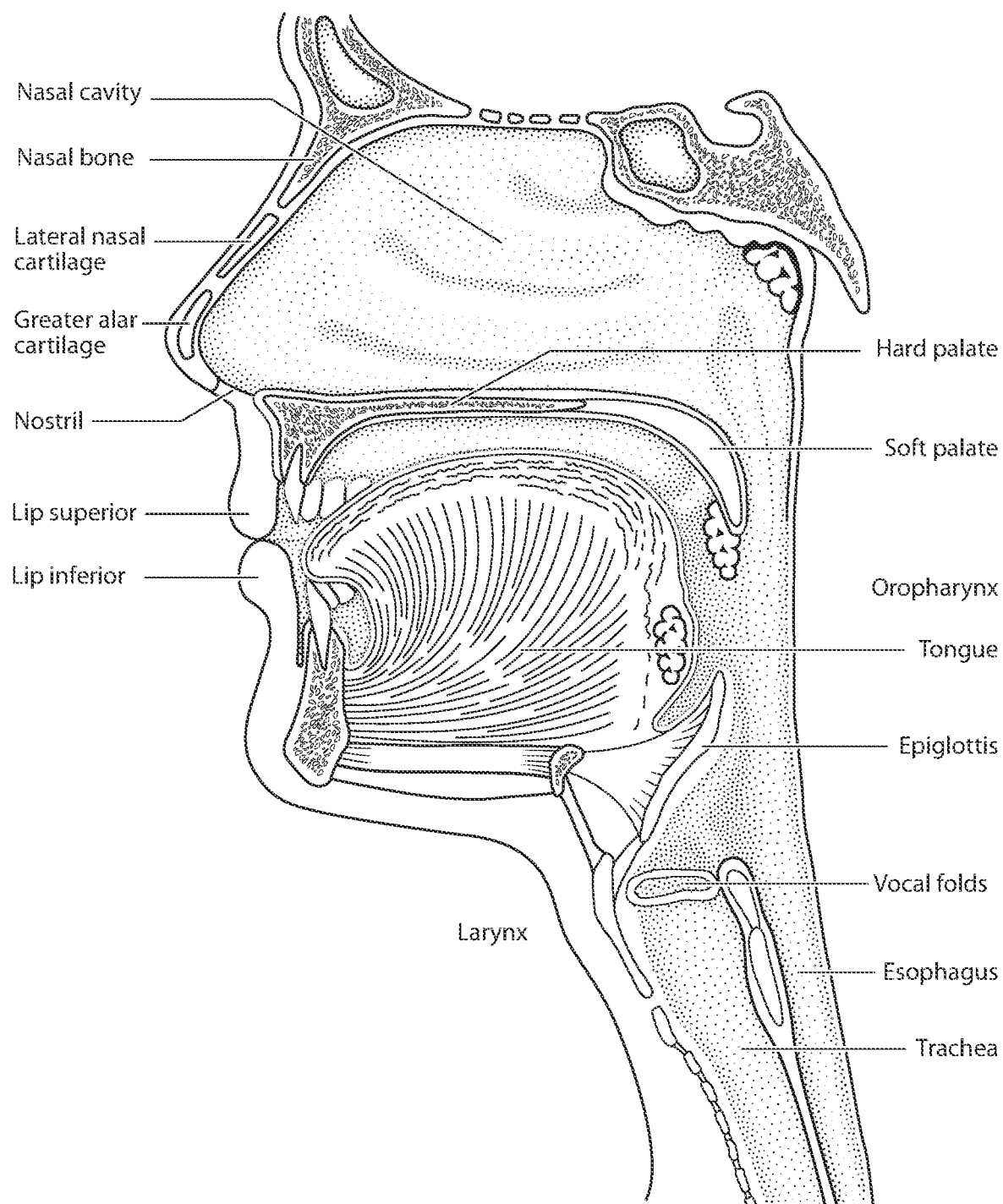
FIG. 2B shows a view of a human upper airway including the nasal cavity, nasal bone, lateral nasal cartilage, greater alar cartilage, nostril, lip superior, lip inferior, larynx, hard palate, soft palate, oropharynx, tongue, epiglottis, vocal folds, oesophagus and trachea.
Figure 2C:
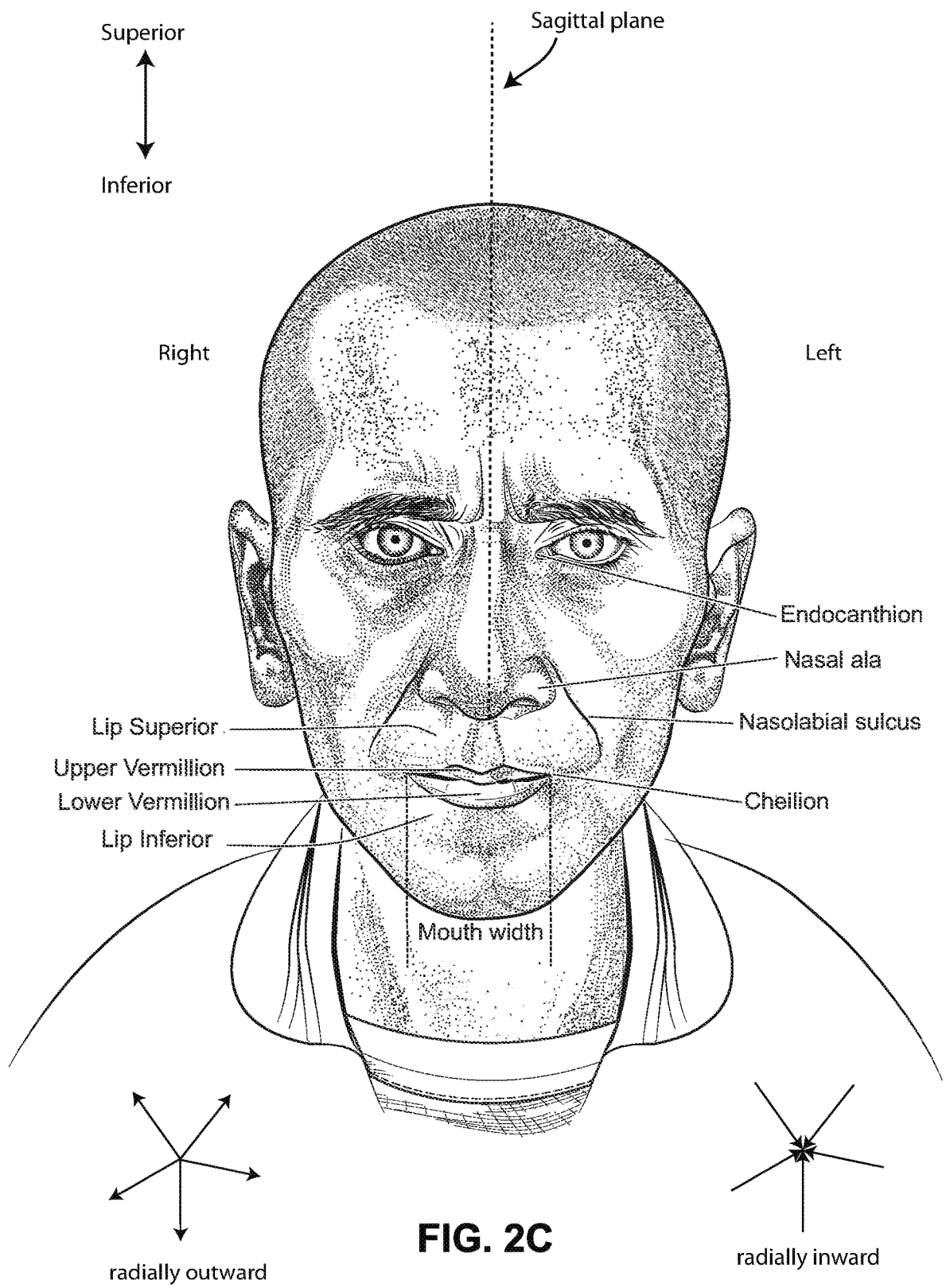
FIG. 2C is a front view of a face with several features of surface anatomy identified including the lip superior, upper vermilion, lower vermilion, lip inferior, mouth width, endocanthion, a nasal ala, nasolabial sulcus and cheilion. Also indicated are the directions superior, inferior, radially inward and radially outward.
Figure 2D:
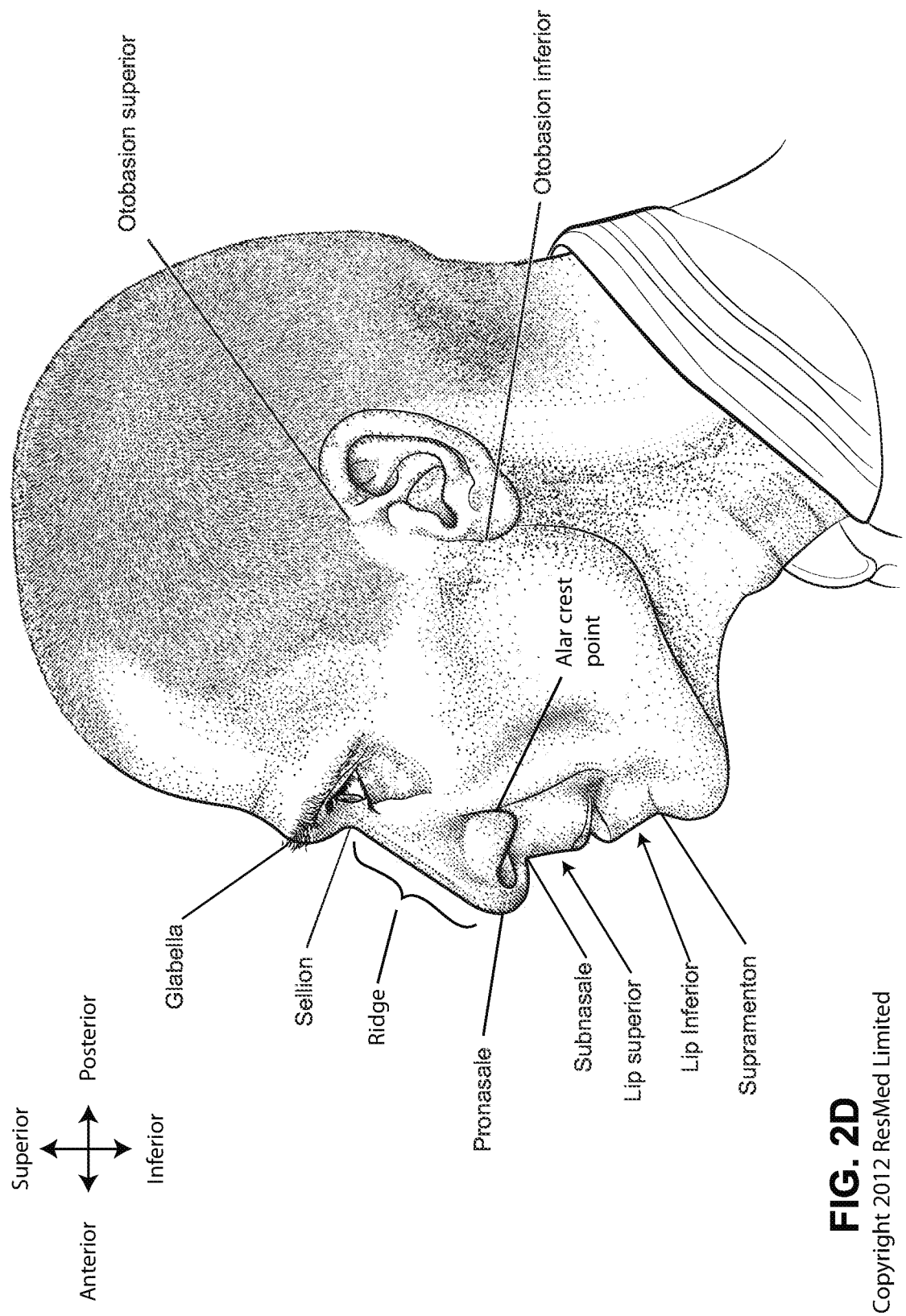
FIG. 2D is a side view of a head with several features of surface anatomy identified including *glabella*, sellion, pronasale, subnasale, lip superior, lip inferior, supramenton, nasal ridge, alar crest point, otobasion superior and otobasion inferior. Also indicated are the directions superior & inferior, and anterior & posterior.
Figure 2E:
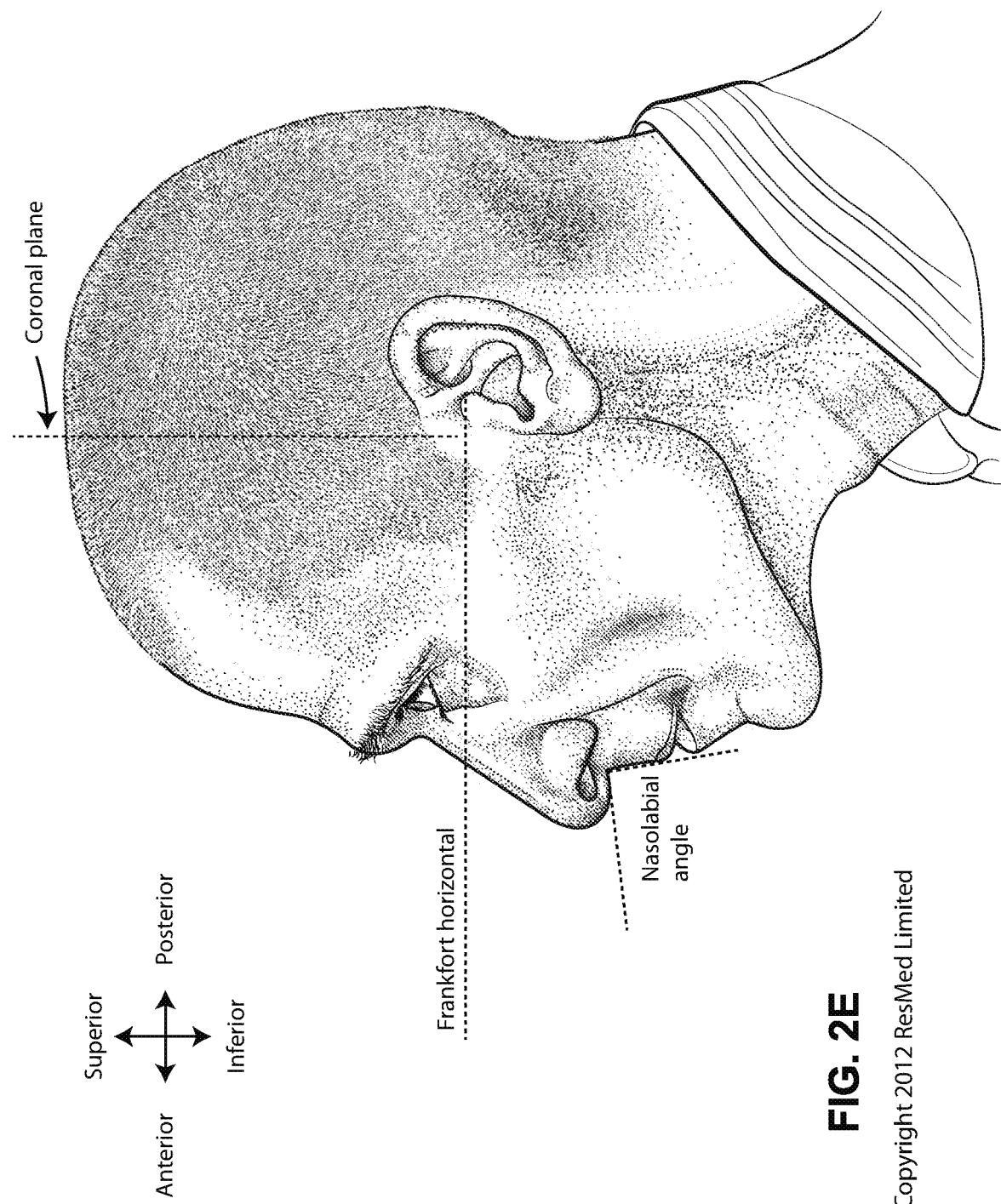

FIG. 2E is a further side view of a head. The approximate locations of the Frankfort horizontal and nasolabial angle are indicated. The coronal plane is also indicated.

Figure 2F:
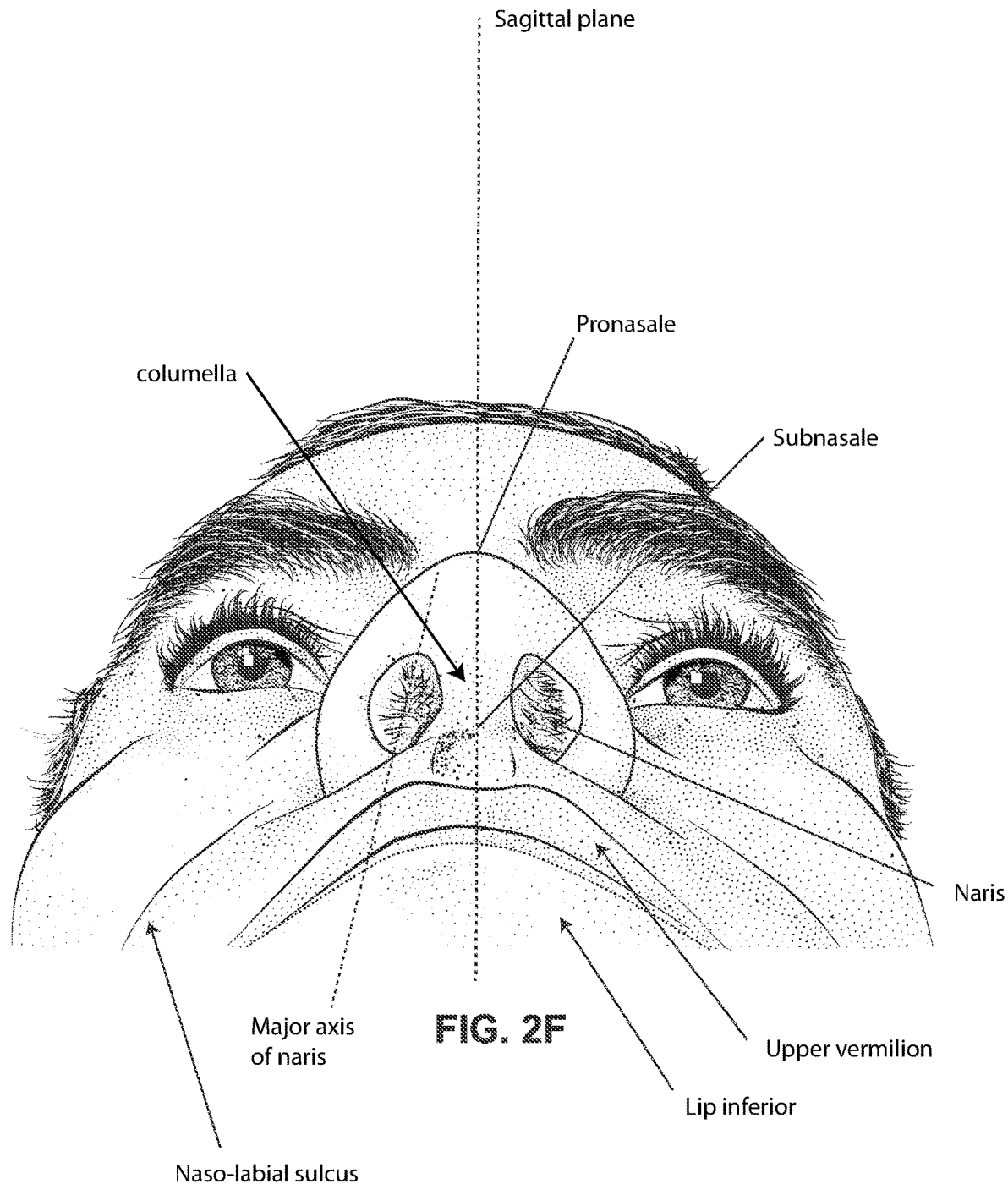

FIG. 2F shows a base view of a nose with several features identified including naso-labial sulcus, lip inferior, upper Vermilion, naris, subnasale, columella, pronasale, the major axis of a naris and the midsagittal plane.

FIG. 2G shows a side view of the superficial features of a nose.

FIG. 2H shows subcutaneal structures of the nose, including lateral cartilage, septum cartilage, greater alar cartilage, lesser alar cartilage, sesamoid cartilage, nasal bone, epidermis, adipose tissue, frontal process of the maxilla and fibrofatty tissue.

FIG. 2I shows a medial dissection of a nose, approximately several millimeters from the midsagittal plane, amongst other things showing the septum cartilage and medial crus of greater alar cartilage.

FIG. 2J shows a front view of the bones of a skull including the frontal, nasal and zygomatic bones. Nasal concha are indicated, as are the maxilla, and mandible.

FIG. 2K shows a lateral view of a skull with the outline of the surface of a head, as well as several muscles. The following bones are shown: frontal, sphenoid, nasal, zygomatic, maxilla, mandible, parietal, temporal and occipital. The mental protuberance is indicated. The following muscles are shown: digastricus, masseter, sternocleidomastoid and trapezius.

Figure 2L:
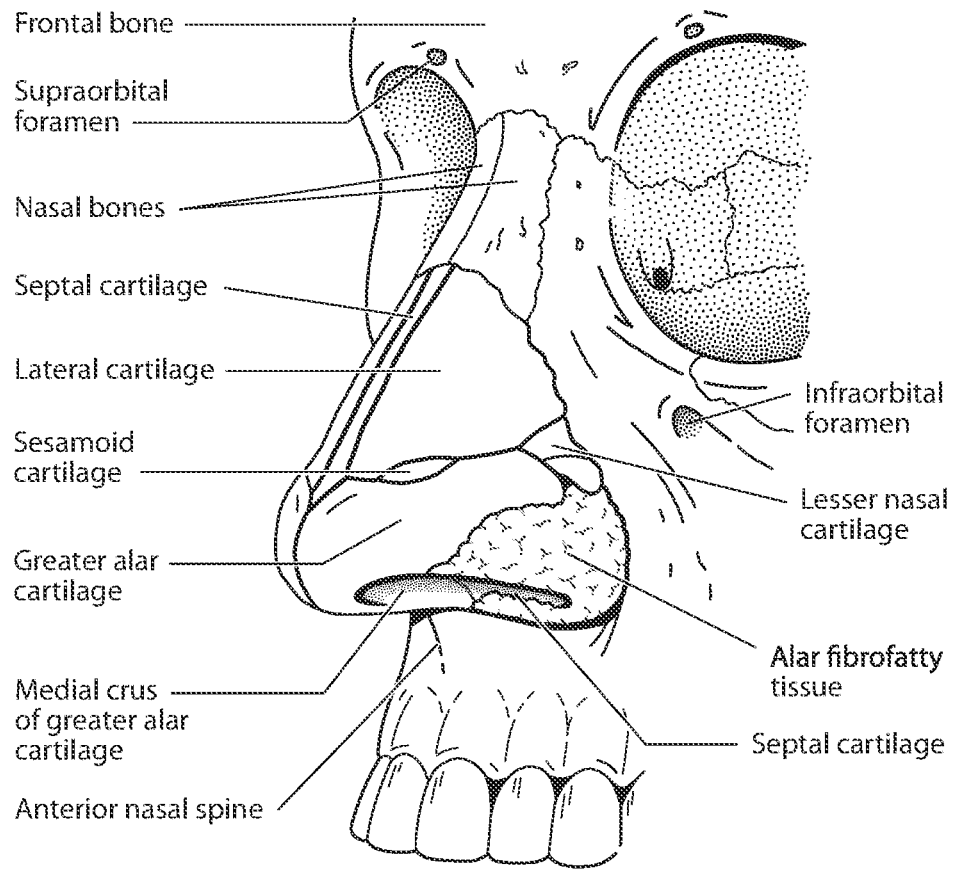

FIG. 2L shows an anterolateral view of a nose.

Figure 2M:
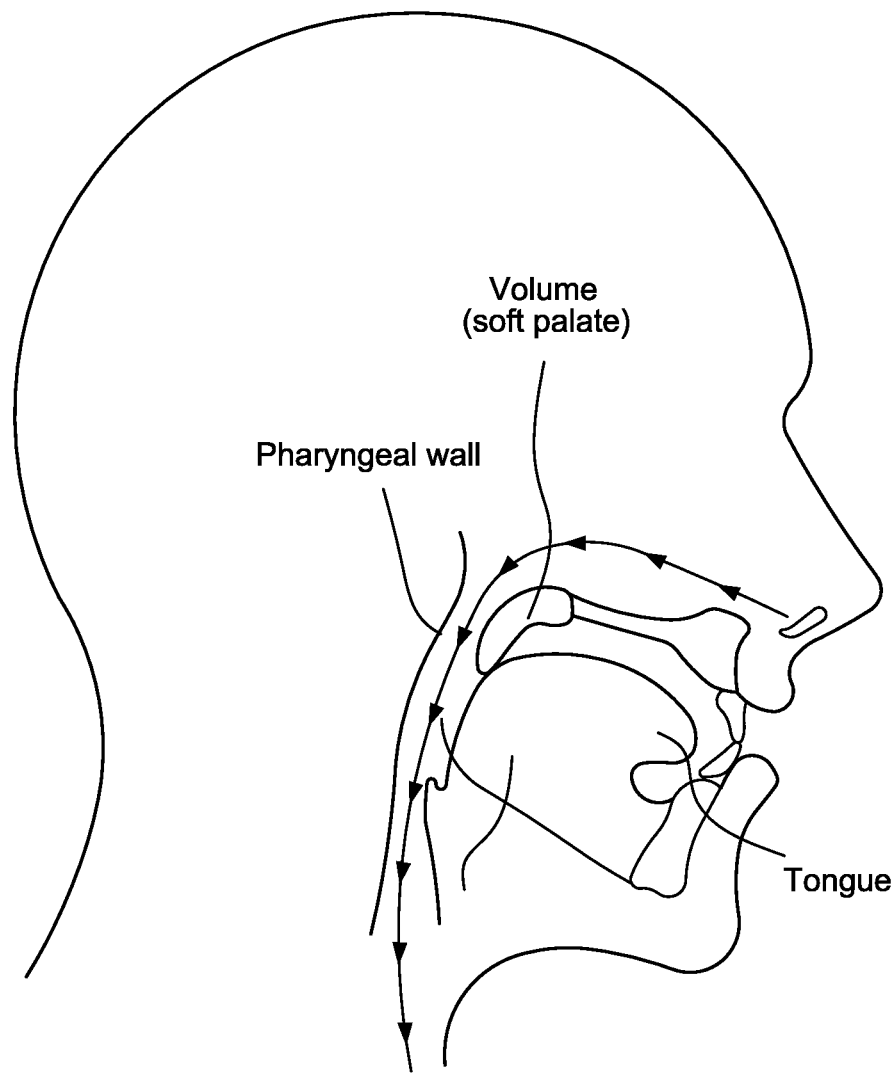

FIG. 2M shows a view of the patient's upper airway with the soft palate moved toward the oral passage in order to block airflow through the oral passage and allow airflow through the nasal passage.

4.3 Patient Interface

Figure 3A:
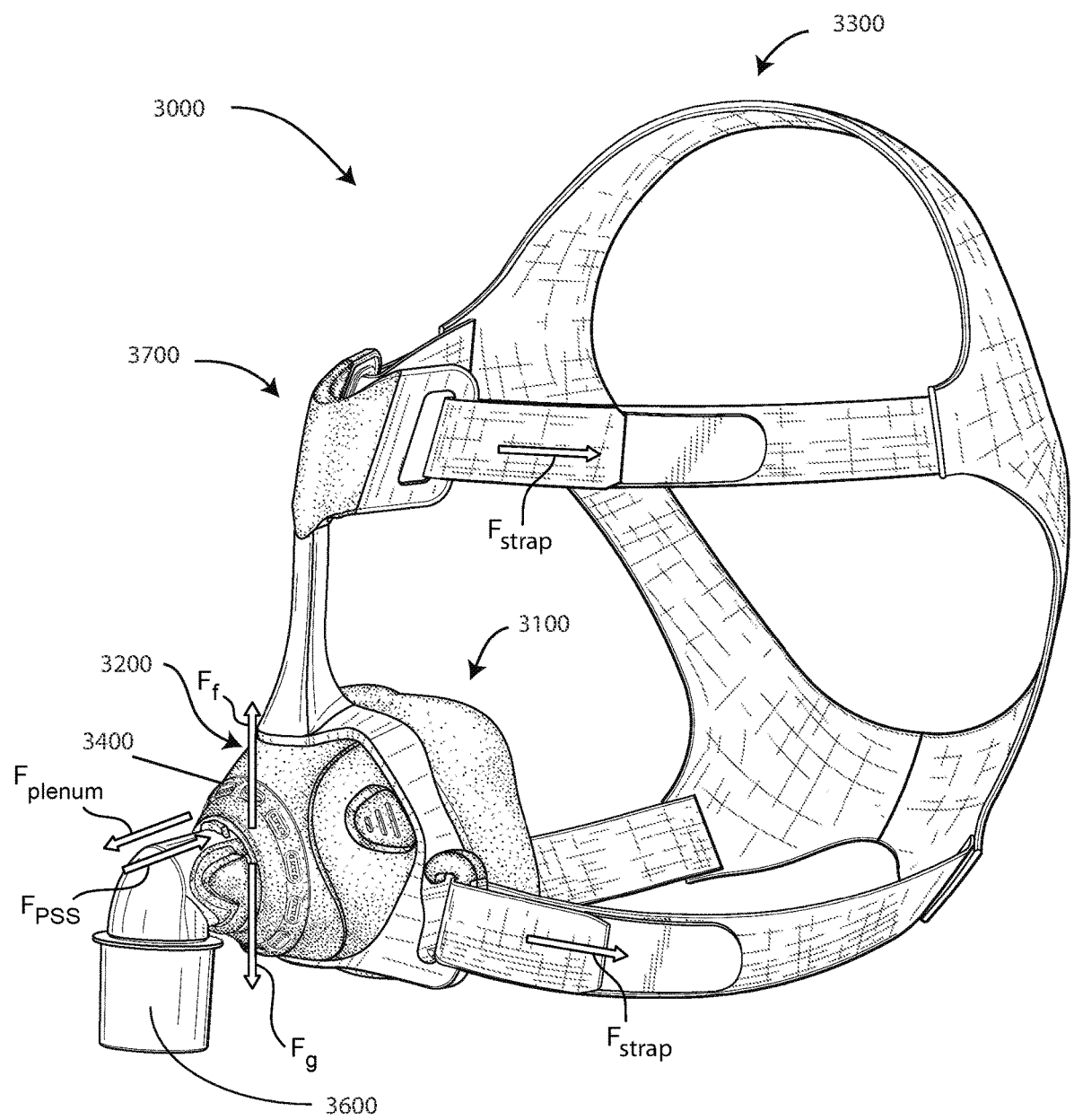

FIG. 3A shows a patient interface in the form of a nasal mask in accordance with one form of the present technology.

FIG. 3B shows a schematic of a cross-section through a structure at a point. An outward normal at the point is indicated. The curvature at the point has a positive sign, and a relatively large magnitude when compared to the magnitude of the curvature shown in FIG. 3C.

FIG. 3C shows a schematic of a cross-section through a structure at a point. An outward normal at the point is indicated. The curvature at the point has a positive sign, and a relatively small magnitude when compared to the magnitude of the curvature shown in FIG. 3B.

FIG. 3D shows a schematic of a cross-section through a structure at a point. An outward normal at the point is indicated. The curvature at the point has a value of zero.

FIG. 3E shows a schematic of a cross-section through a structure at a point. An outward normal at the point is indicated. The curvature at the point has a negative sign, and a relatively small magnitude when compared to the magnitude of the curvature shown in FIG. 3F.

FIG. 3F shows a schematic of a cross-section through a structure at a point. An outward normal at the point is indicated. The curvature at the point has a negative sign, and a relatively large magnitude when compared to the magnitude of the curvature shown in FIG. 3E.

Figure 3H:
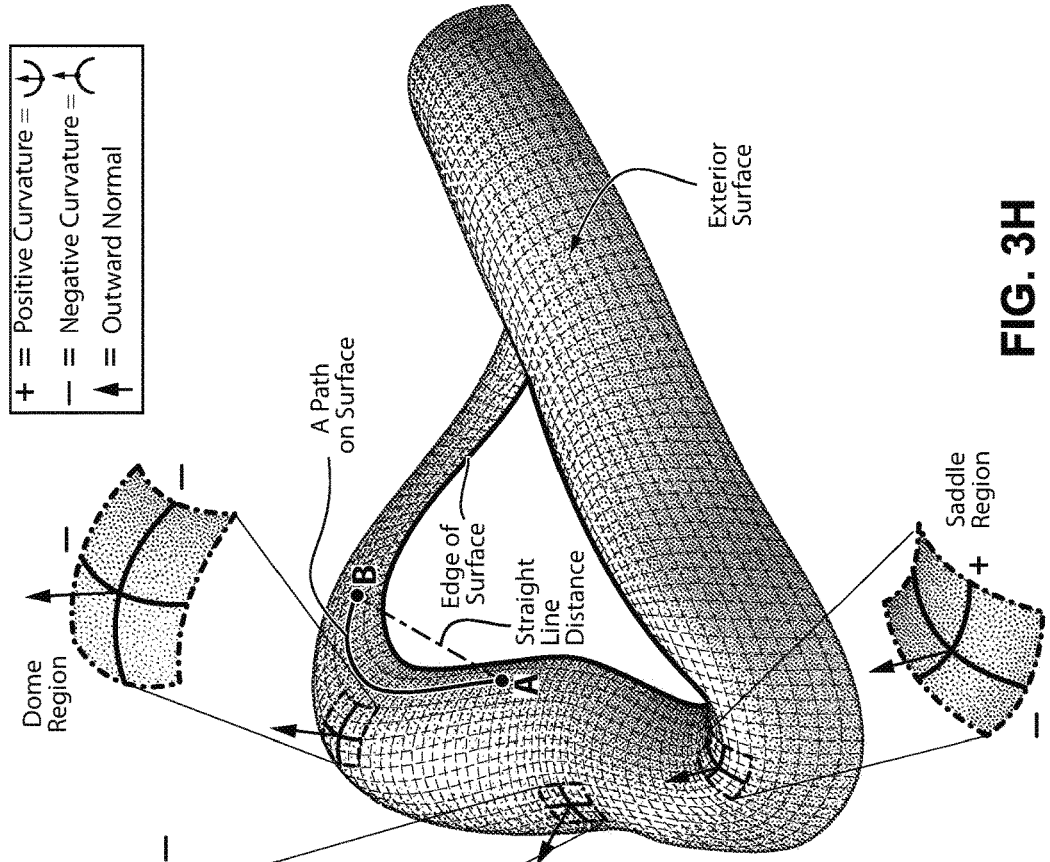
Figure 3G:
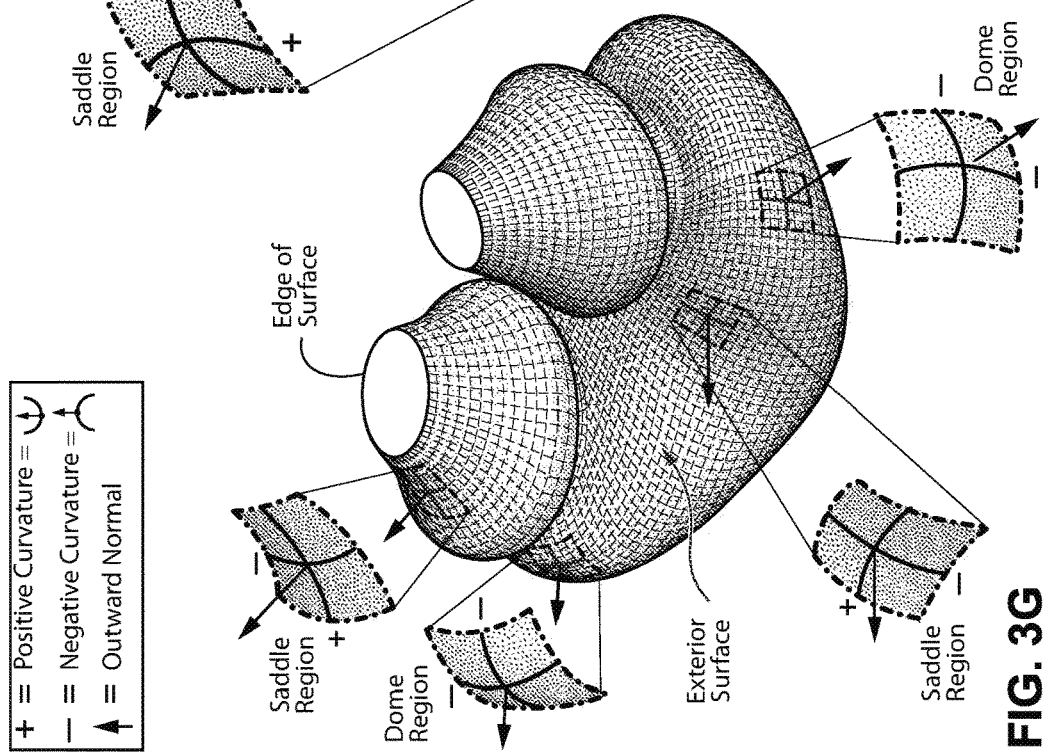

FIG. 3G shows a cushion for a mask that includes two pillows. An exterior surface of the cushion is indicated. An edge of the surface is indicated. Dome and saddle regions are indicated.

FIG. 3H shows a cushion for a mask. An exterior surface of the cushion is indicated. An edge of the surface is indicated. A path on the surface between points A and B is indicated. A straight line distance between A and B is indicated. Two saddle regions and a dome region are indicated.

FIG. 3I shows the surface of a structure, with a one dimensional hole in the surface. The illustrated plane curve forms the boundary of a one dimensional hole.

FIG. 3J shows a cross-section through the structure of FIG. 3I. The illustrated surface bounds a two dimensional hole in the structure of FIG. 3I.

FIG. 3K shows a perspective view of the structure of FIG. 3I, including the two dimensional hole and the one dimensional hole. Also shown is the surface that bounds a two dimensional hole in the structure of FIG. 3I.

FIG. 3L shows a mask having an inflatable bladder as a cushion.

FIG. 3M shows a cross-section through the mask of FIG. 3L, and shows the interior surface of the bladder. The interior surface bounds the two dimensional hole in the mask.

FIG. 3N shows a further cross-section through the mask of FIG. 3L. The interior surface is also indicated.

FIG. 3O illustrates a left-hand rule.

FIG. 3P illustrates a right-hand rule.

FIG. 3Q shows a left ear, including the left ear helix.

FIG. 3R shows a right ear, including the right ear helix.

FIG. 3S shows a right-hand helix.

FIG. 3T shows a view of a mask, including the sign of the torsion of the space curve defined by the edge of the sealing membrane in different regions of the mask.

Figure 3U:
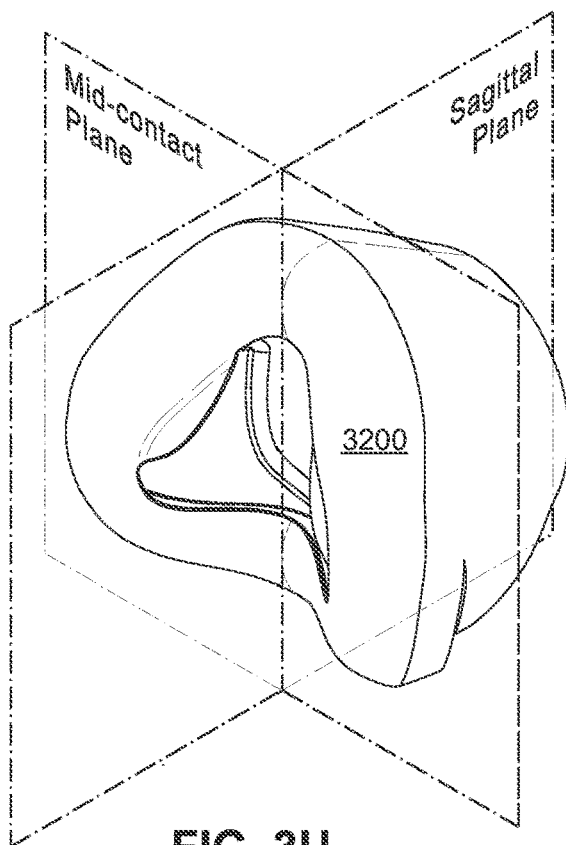

FIG. 3U shows a view of a plenum chamber 3200 showing a sagittal plane and a mid-contact plane.

Figure 3V:
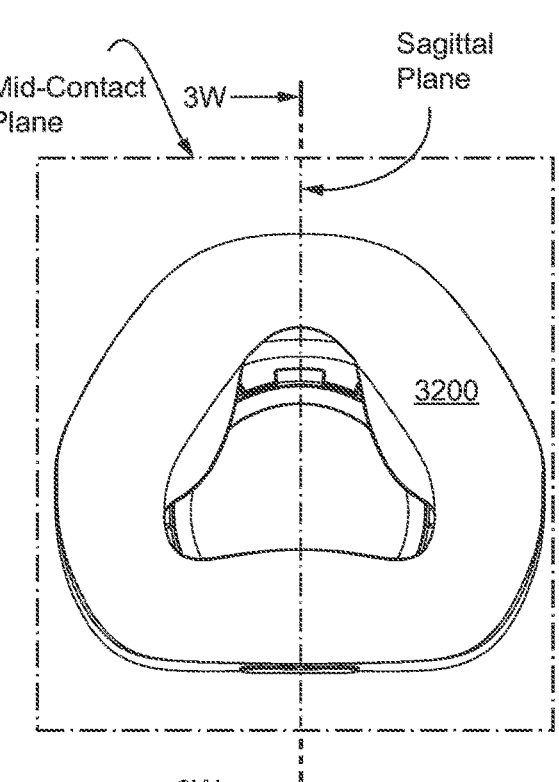

FIG. 3V shows a view of a posterior of the plenum chamber of FIG. 3U. The direction of the view is normal to the mid-contact plane. The sagittal plane in FIG. 3V bisects the plenum chamber into left-hand and right-hand sides.

Figure 3W:
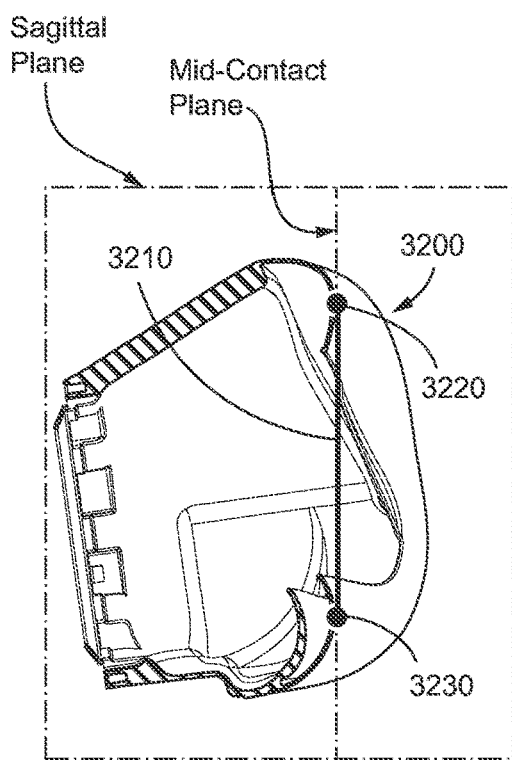

FIG. 3W shows a cross-section through the plenum chamber of FIG. 3V, the cross-section being taken at the sagittal plane shown in FIG. 3V. A 'mid-contact' plane is shown. The mid-contact plane is perpendicular to the sagittal plane. The orientation of the mid-contact plane corresponds to the orientation of a chord 3210 which lies on the sagittal plane and just touches the cushion of the plenum chamber at two points on the sagittal plane: a superior point 3220 and an inferior point 3230. Depending on the geometry of the cushion in this region, the mid-contact plane may be a tangent at both the superior and inferior points.

Figure 3X:
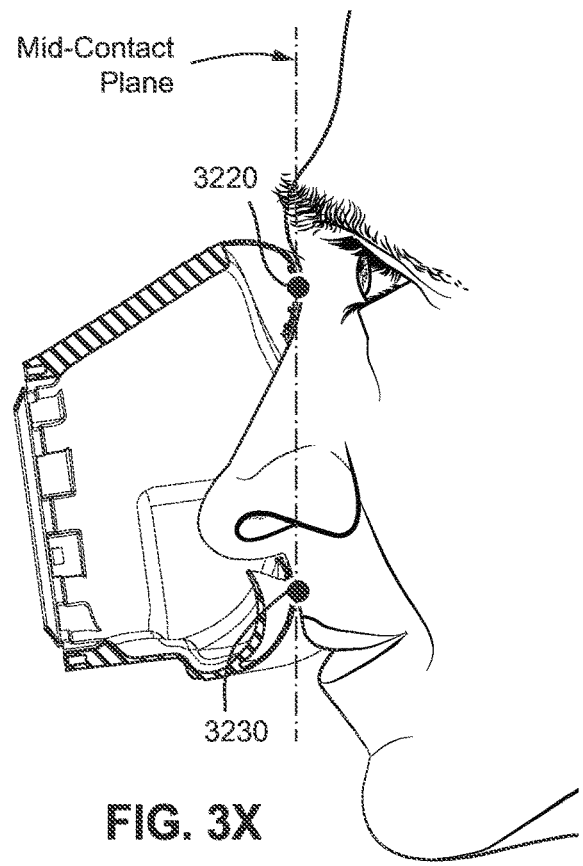

FIG. 3X shows the plenum chamber 3200 of FIG. 3U in position for use on a face. The sagittal plane of the plenum chamber 3200 generally coincides with the midsagittal plane of the face when the plenum chamber is in position for use. The mid-contact plane corresponds generally to the 'plane of the face' when the plenum chamber is in position for use. In FIG. 3X the plenum chamber 3200 is that of a nasal mask, and the superior point 3220 sits approximately on the sellion, while the inferior point 3230 sits on the lip superior.

4.4 RPT Device

Figure 4A:
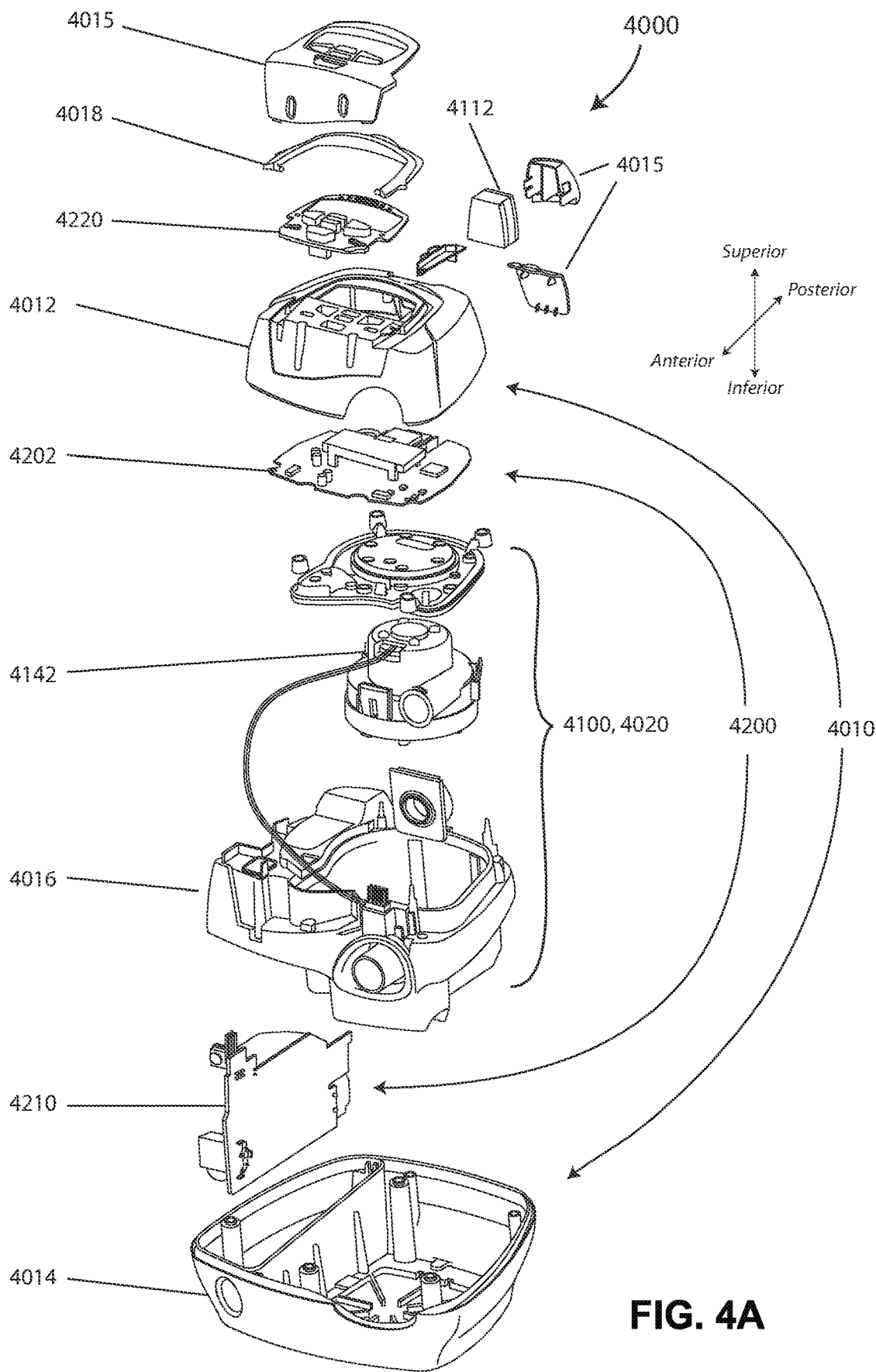

FIG. 4A shows an RPT device in accordance with one form of the present technology.

Figure 4B:
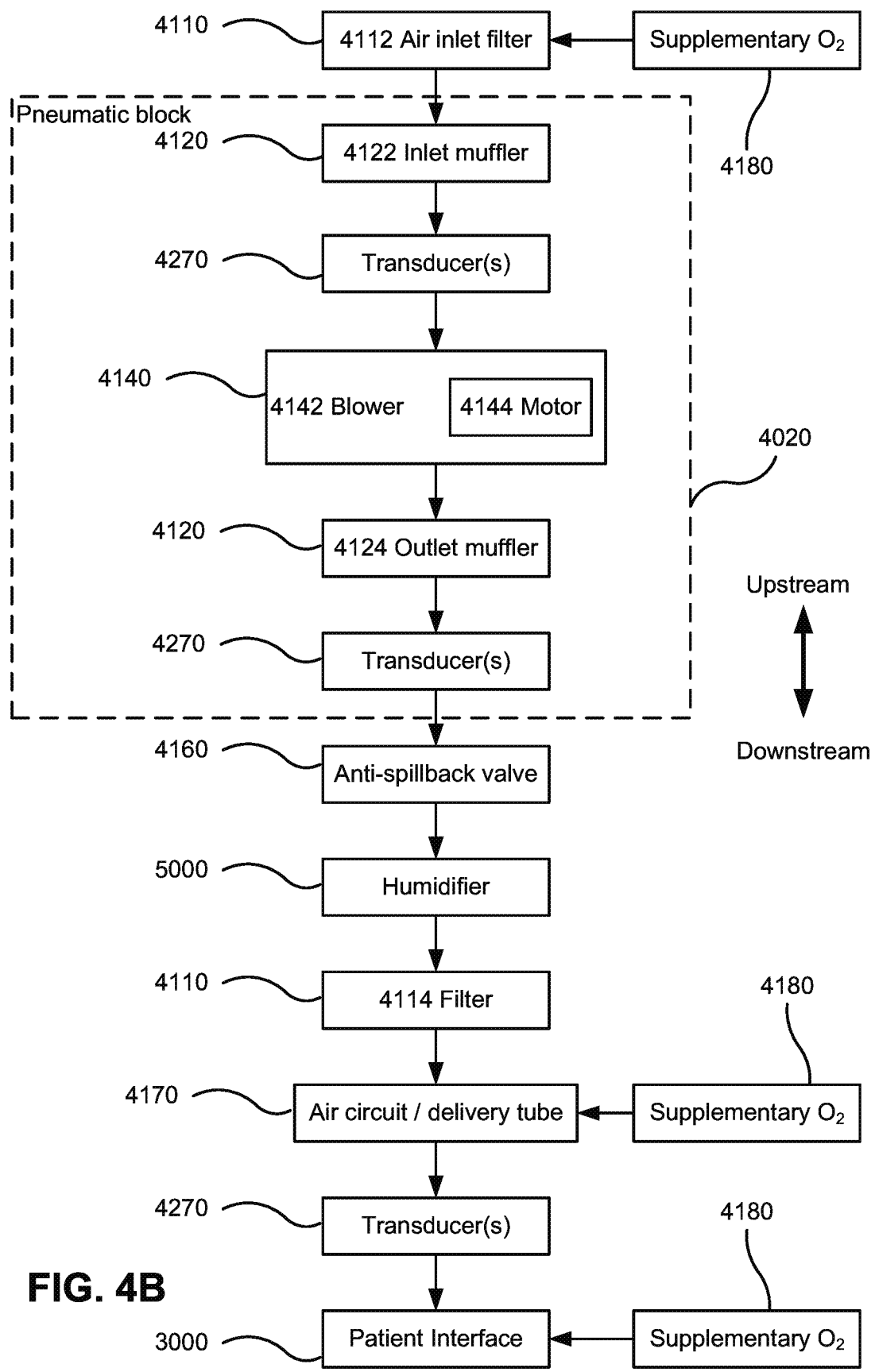

FIG. 4B is a schematic diagram of the pneumatic path of an RPT device in accordance with one form of the present technology. The directions of upstream and downstream are indicated with reference to the blower and the patient interface. The blower is defined to be upstream of the patient interface and the patient interface is defined to be downstream of the blower, regardless of the actual flow direction at any particular moment. Items which are located within the pneumatic path between the blower and the patient interface are downstream of the blower and upstream of the patient interface.

4.5 Humidifier

Figure 5A:
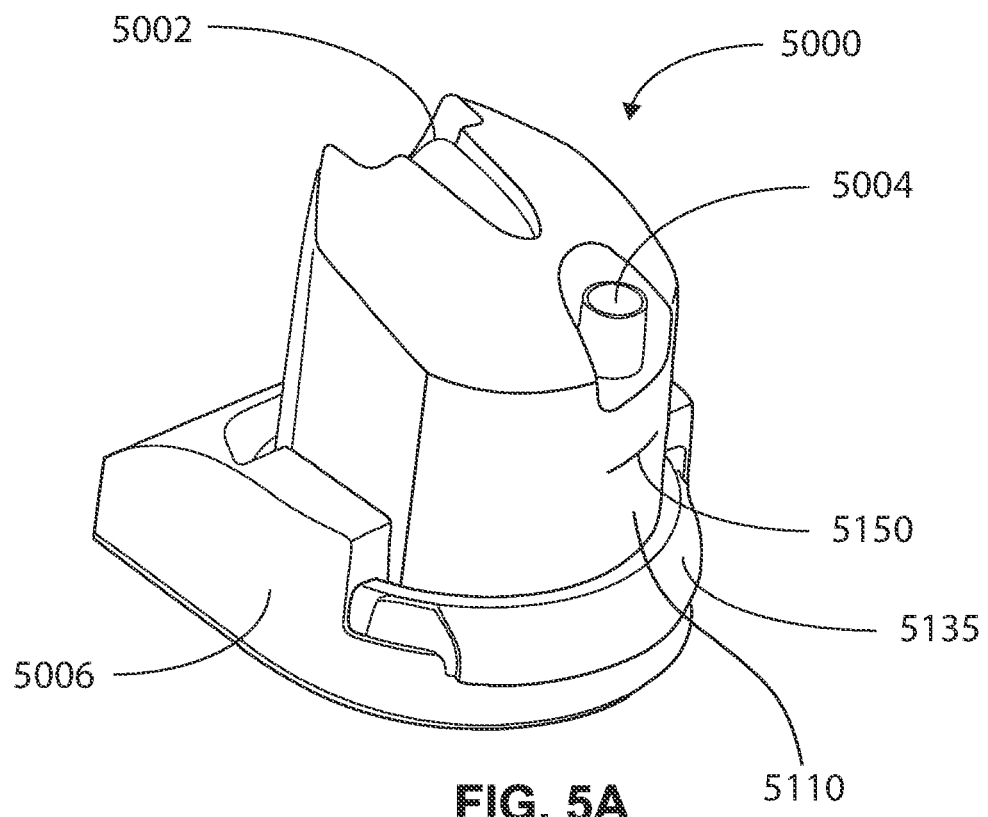

FIG. 5A shows an isometric view of a humidifier in accordance with one form of the present technology.

Figure 5B:
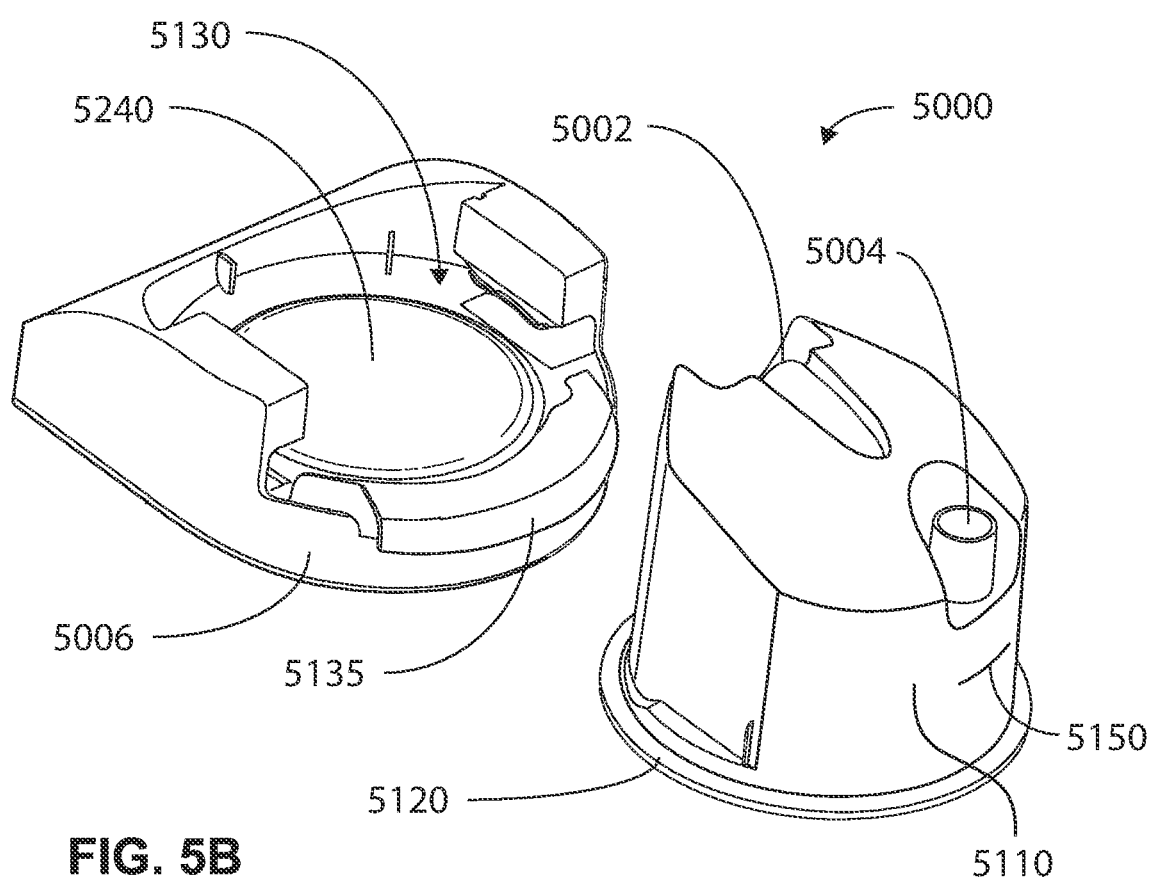

FIG. 5B shows an isometric view of a humidifier in accordance with one form of the present technology, showing a humidifier reservoir 5110 removed from the humidifier reservoir dock 5130.

4.6 Breathing Waveforms

Figure 6A:
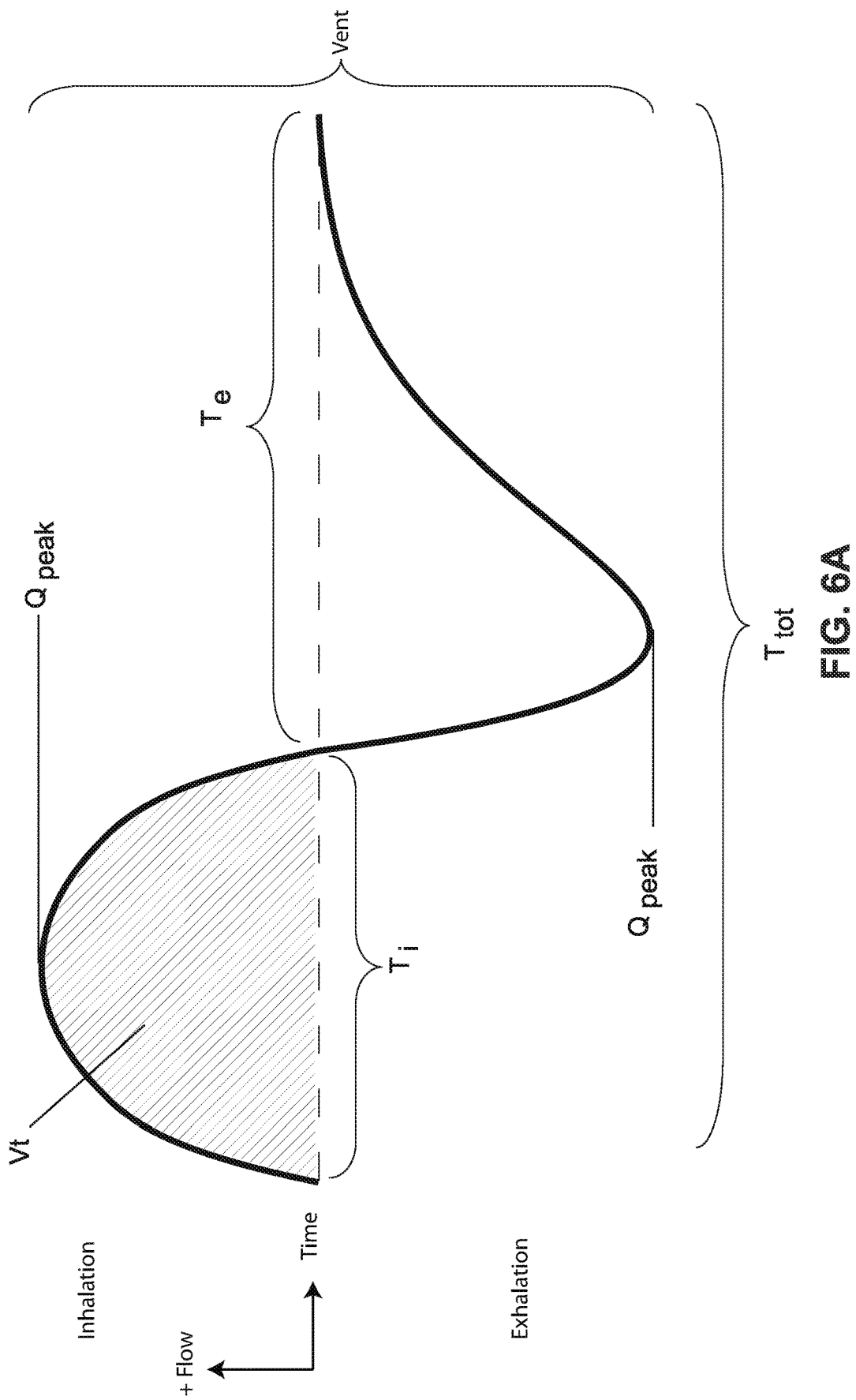

FIG. 6 shows a model typical breath waveform of a person while sleeping.

4.7 Natural Breathing Full Face Mask

Figure 7:
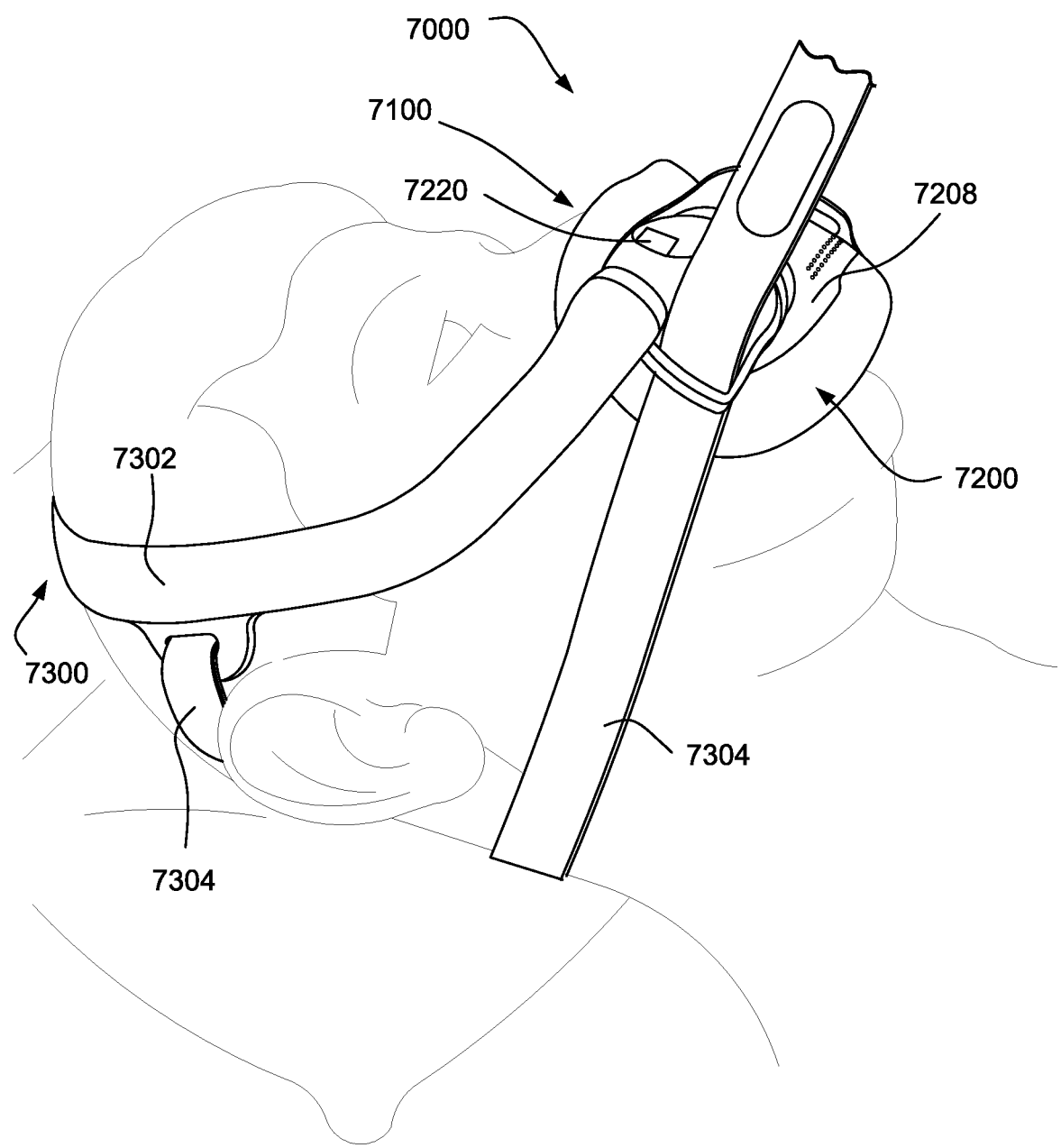

FIG. 7 shows a perspective view of a patient wearing a natural breathing full face mask.

Figure 8:
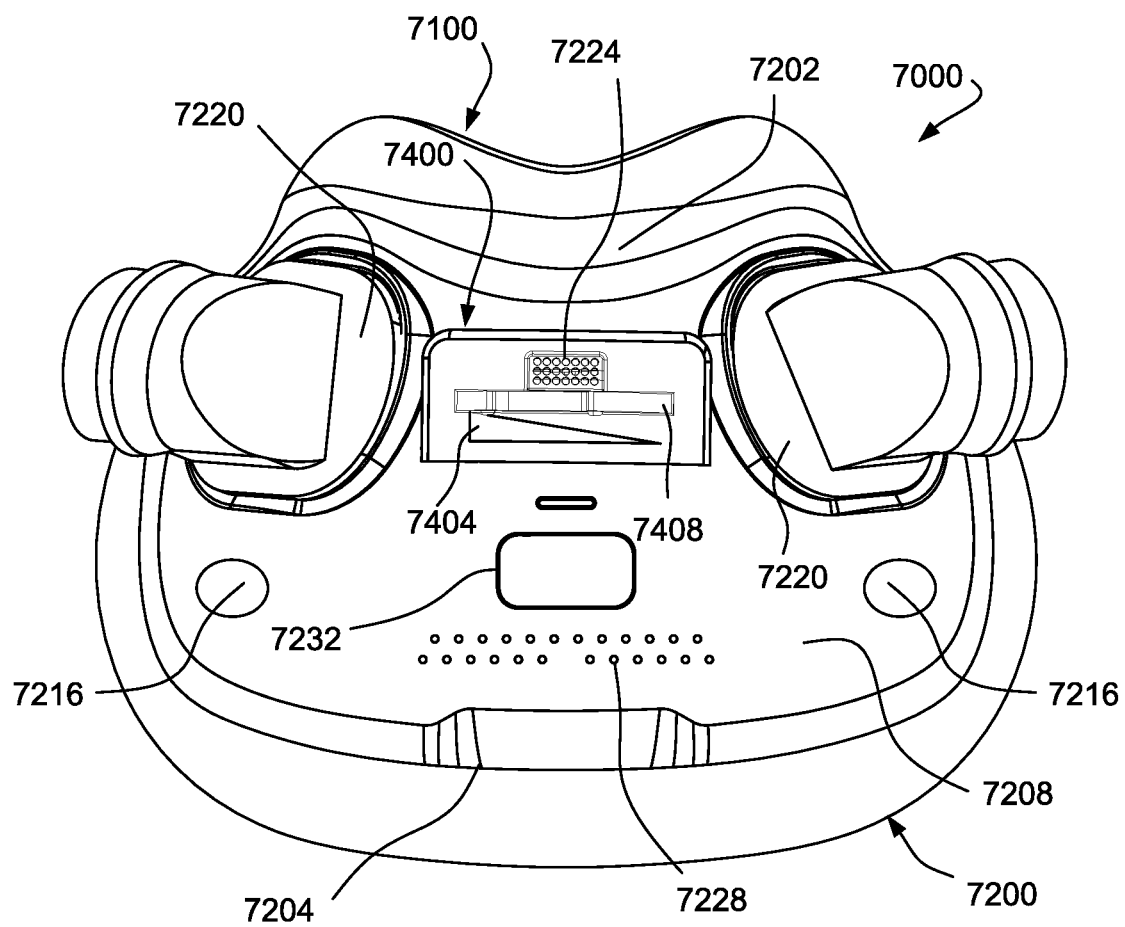

FIG. 8 shows a front perspective view of the natural breathing full face mask of FIG. 7.

Figures 1, 8:
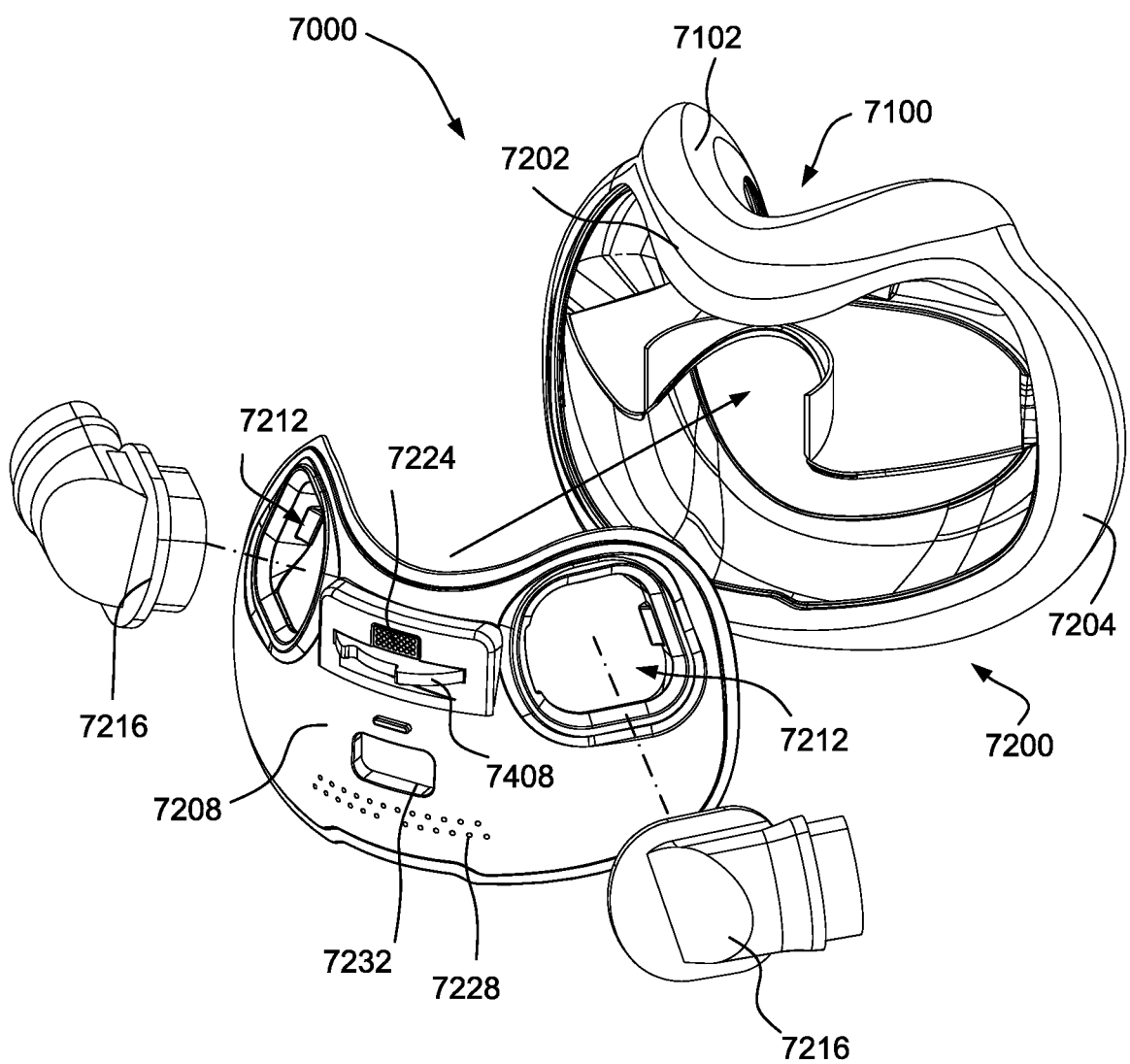

FIG. 8-1 shows an exploded view of the nasal breathing full face mask of FIG. 7.

Figure 9:
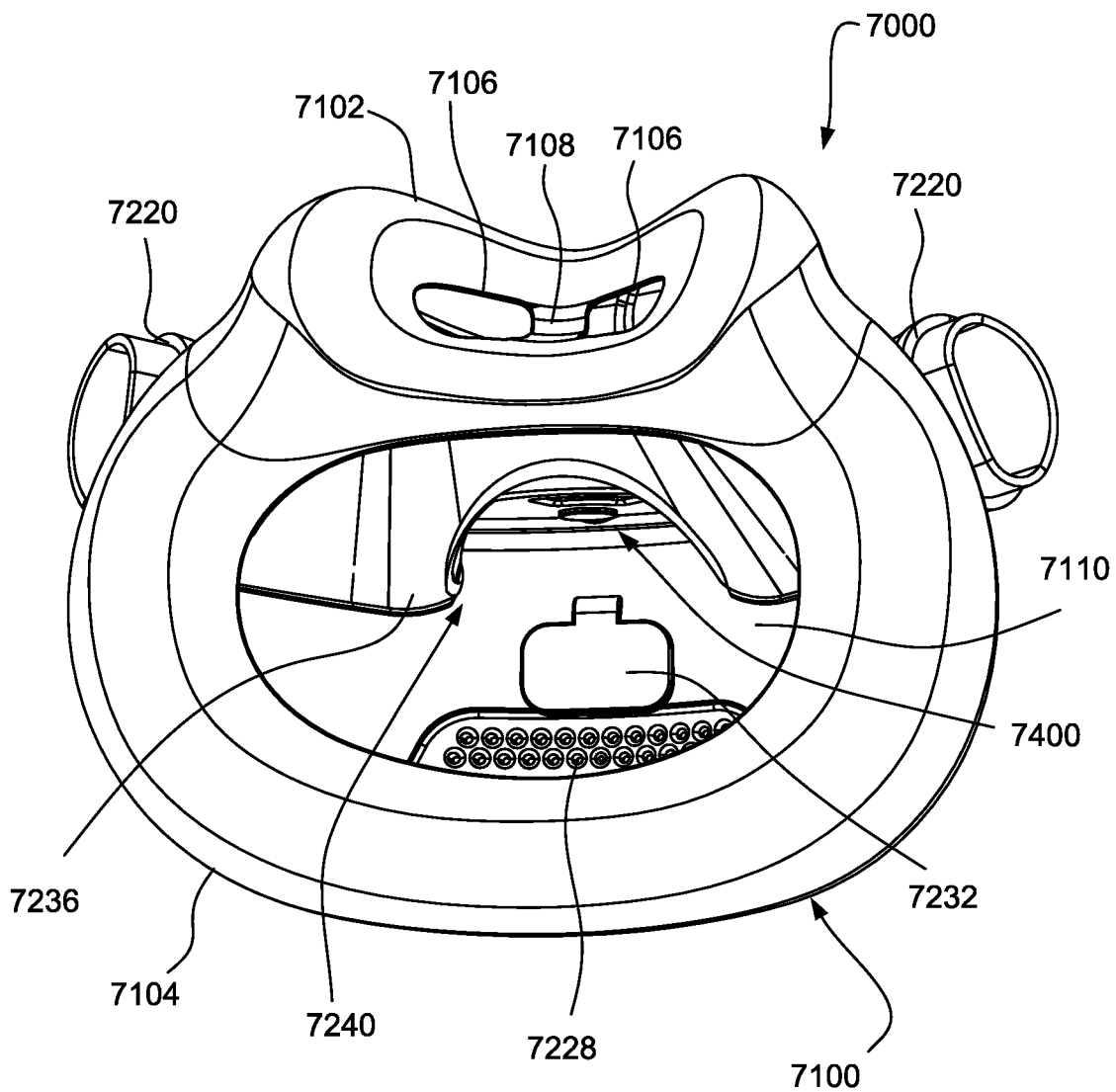

FIG. 9 shows a rear perspective view of the natural breathing full face mask of FIG. 7.

Figure 10:
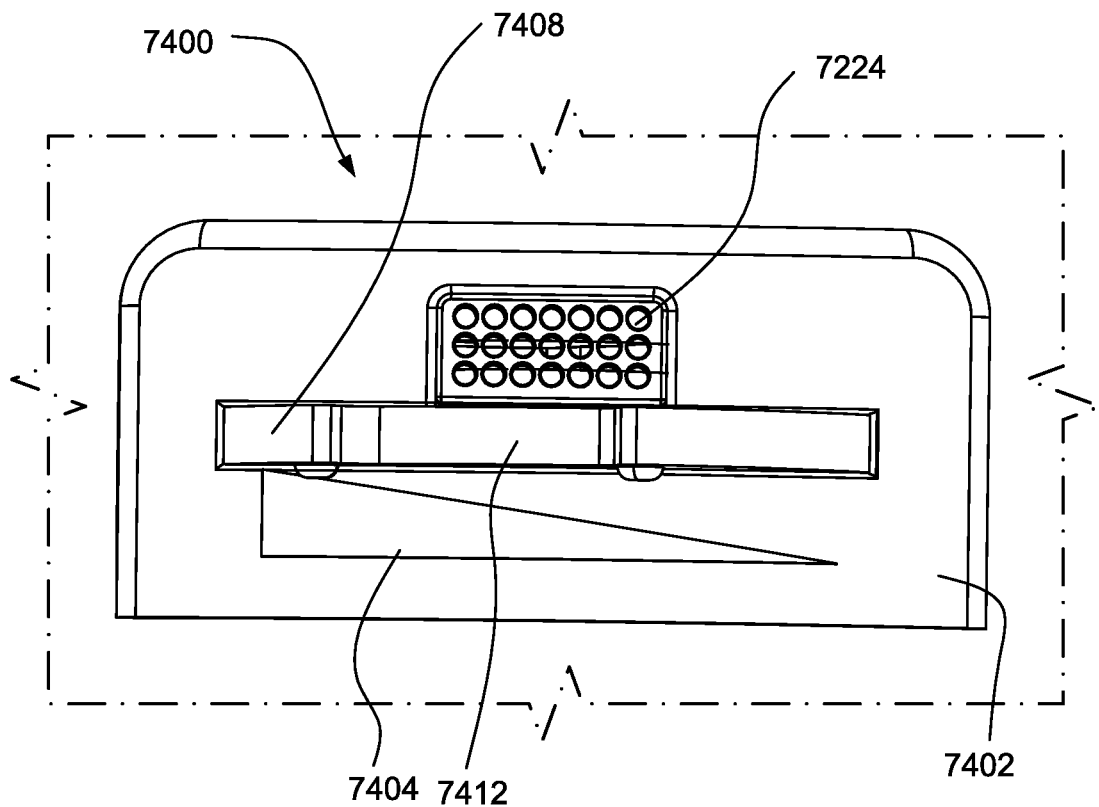

FIG. 10 shows a front perspective view of a valve body used with the natural breathing full face mask of FIG. 7.

Figure 11:
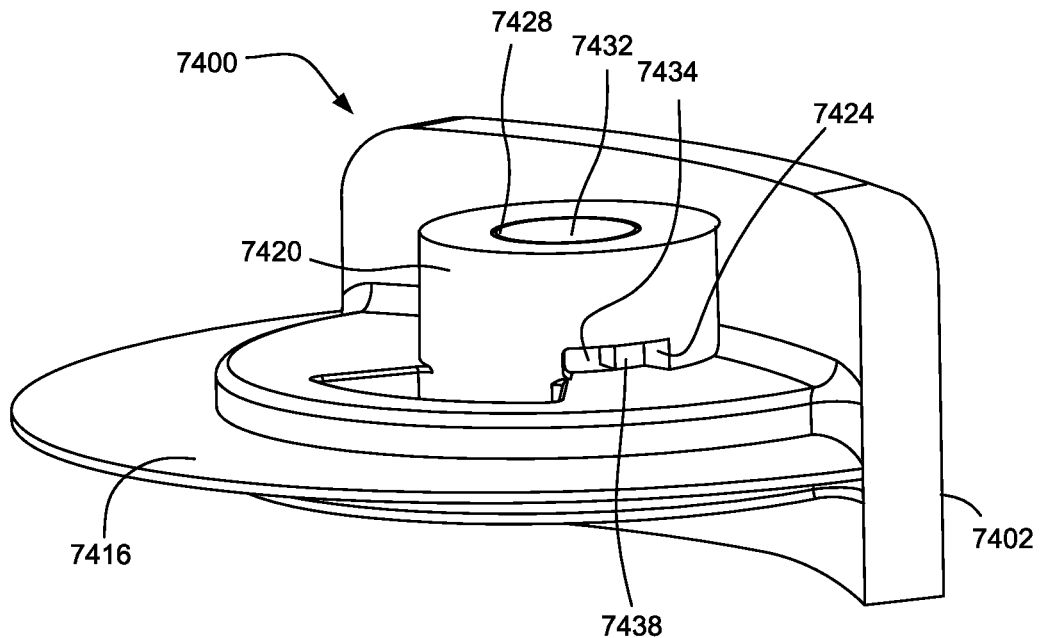

FIG. 11 shows a rear perspective view of the valve body of FIG. 10 with an adjustment structure being positioned in an open position.

Figure 12:
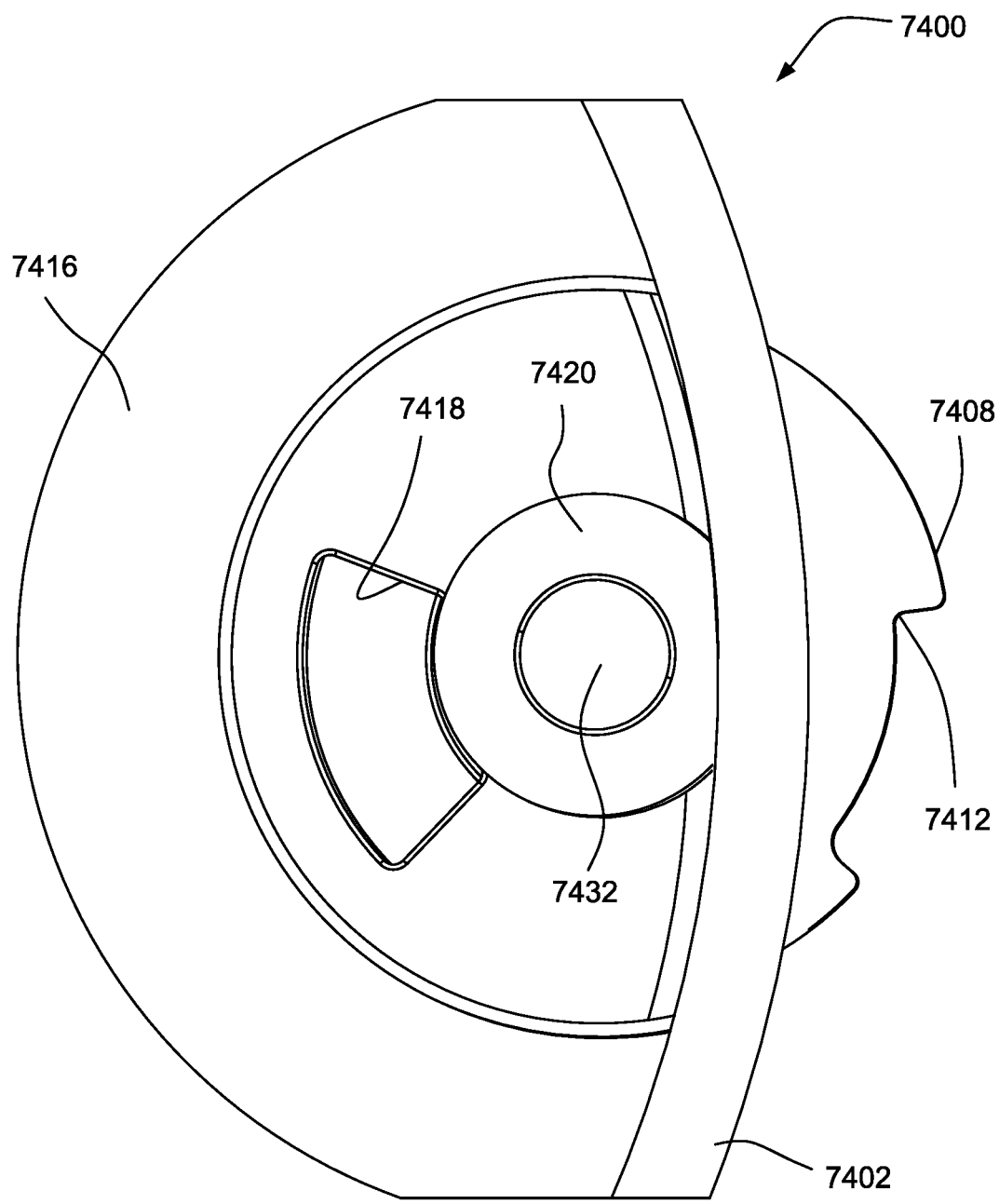

FIG. 12 shows a top view of the valve body of FIG. 10 with the adjustment structure in the open position.

Figure 13:
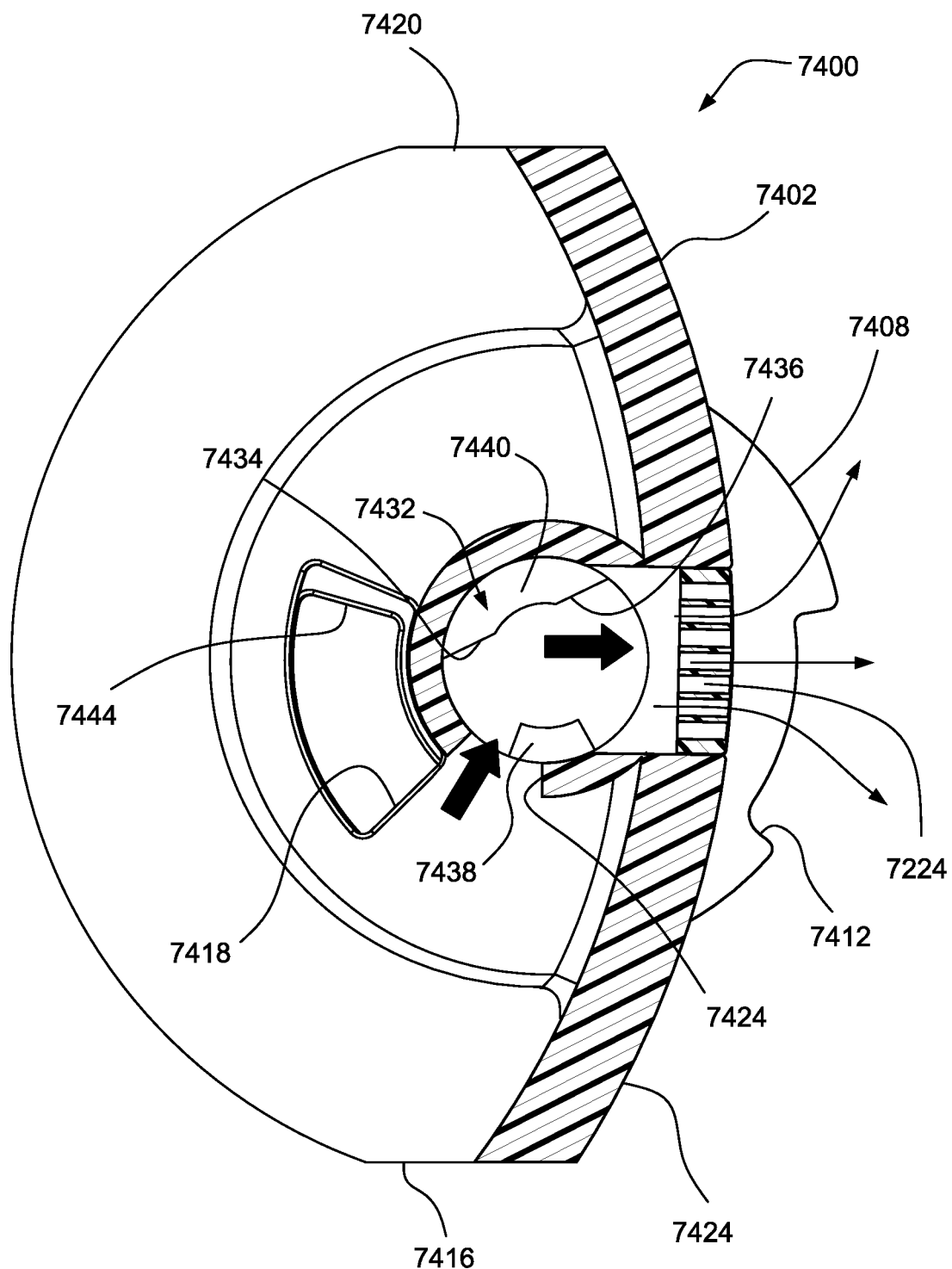

FIG. 13 shows a cross-sectional view of the valve body of FIG. 10 with the adjustment structure in the open position.

Figure 14:
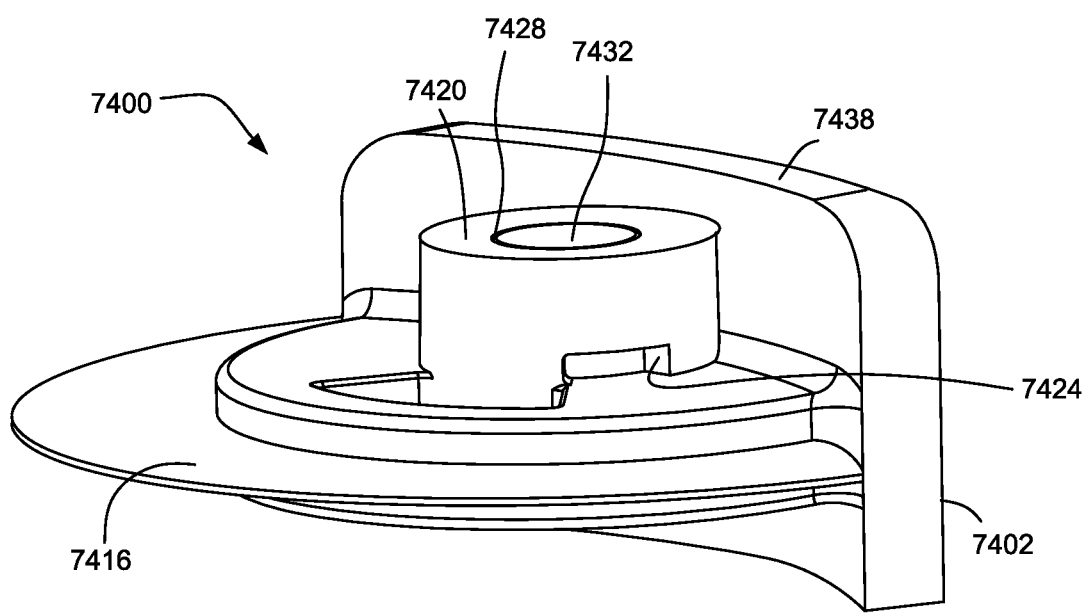

FIG. 14 shows a rear perspective view of the valve body of FIG. 10 with an adjustment structure being positioned in a closed position.

Figure 15:
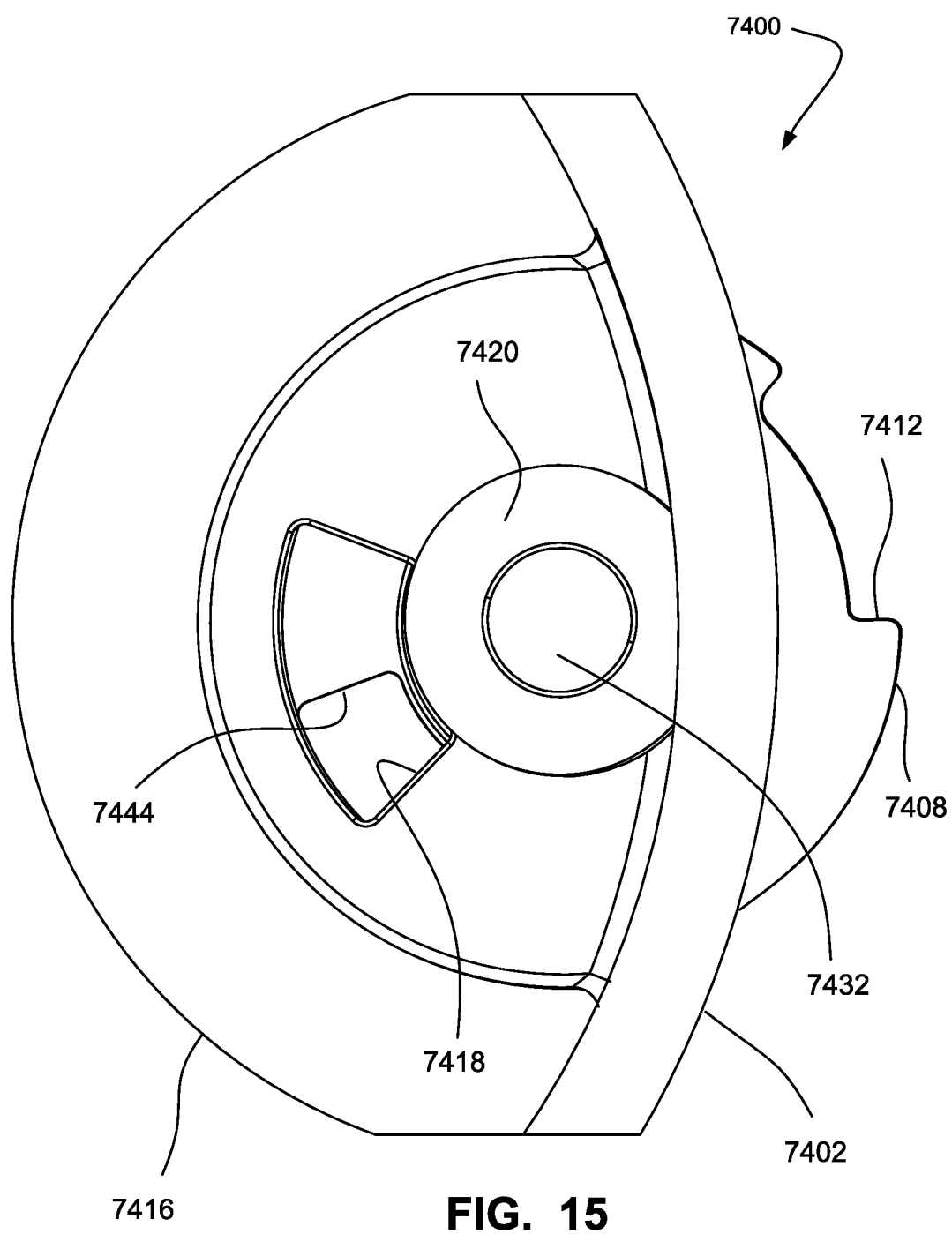

FIG. 15 shows a top view of the valve body of FIG. 10 with the adjustment structure in the closed position.

Figure 16:
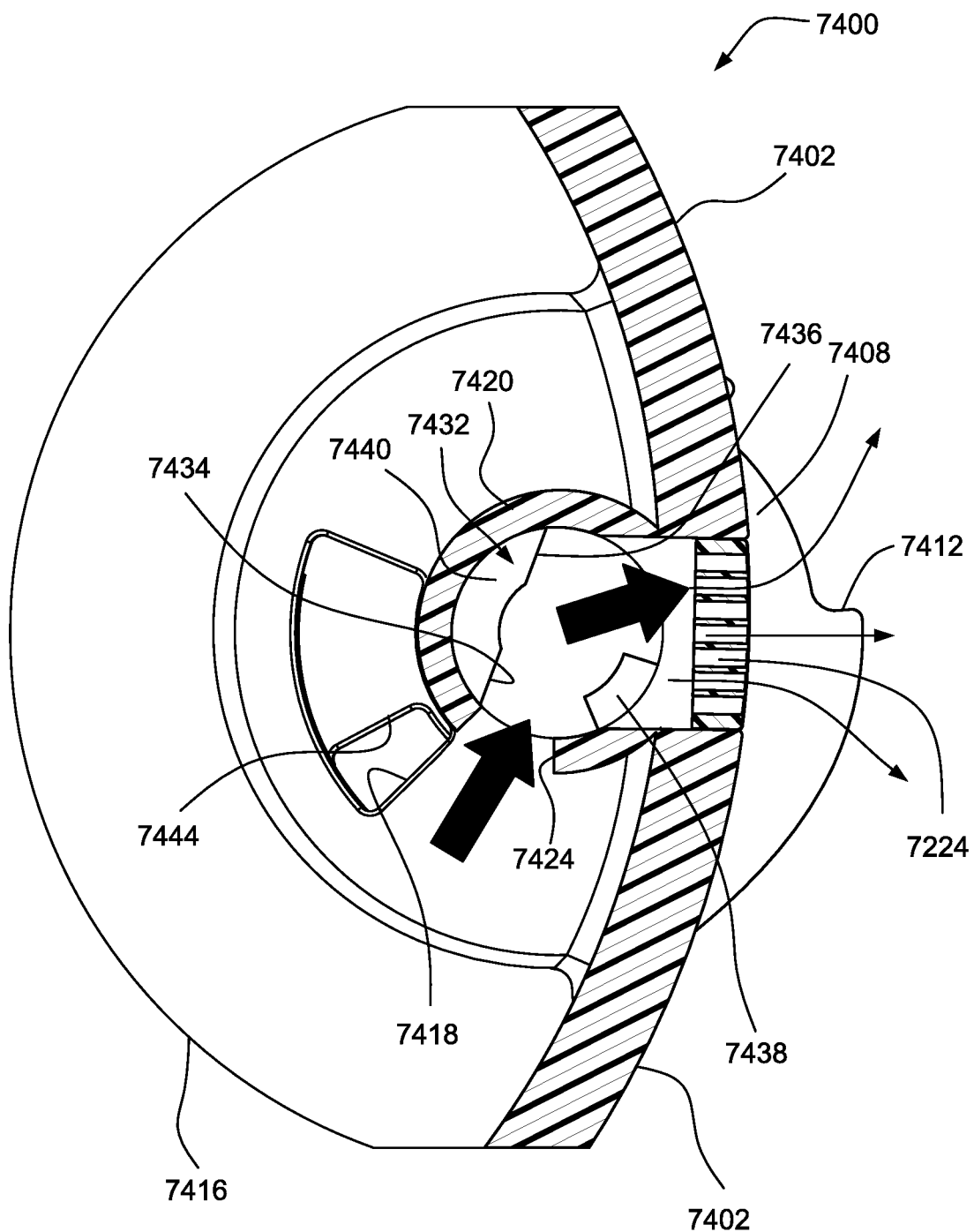

FIG. 16 shows a cross-sectional view of the valve body of FIG. 10 with the adjustment structure in the closed position.

Figure 17:
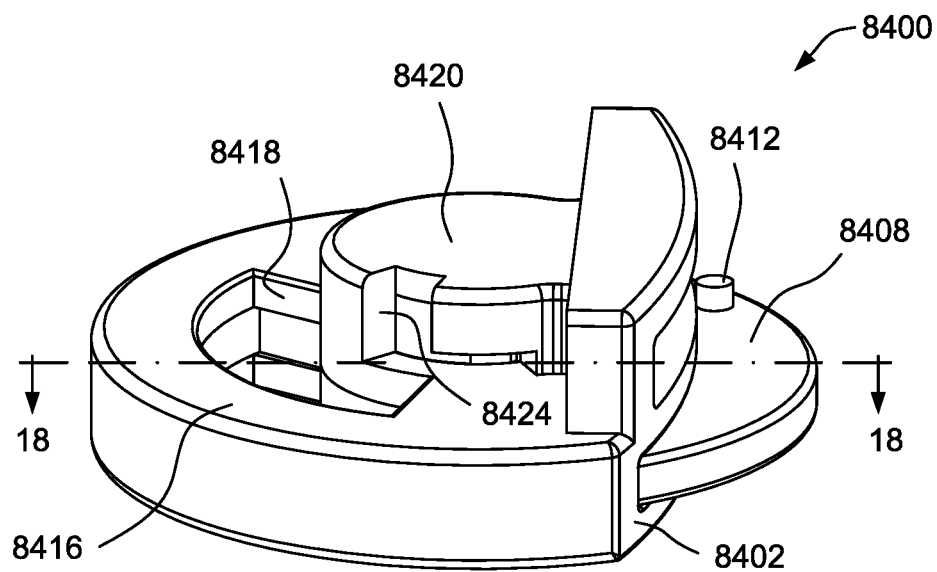

FIG. 17 shows a rear perspective view of a valve body according to another example.

Figure 18:
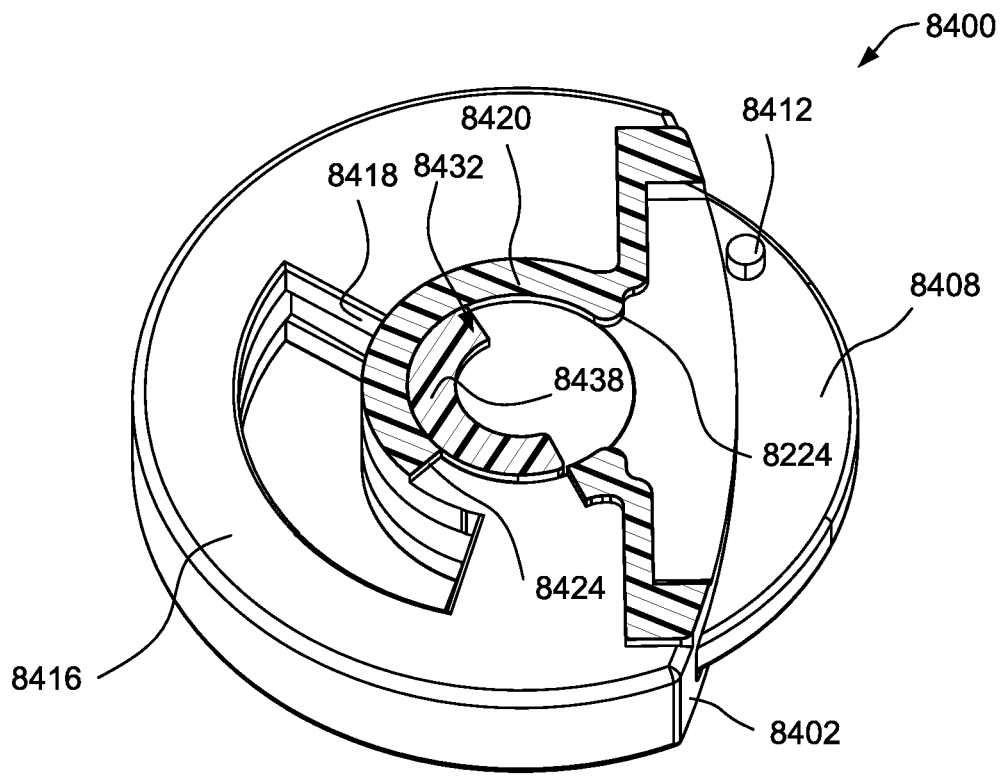

FIG. 18 shows a cross-sectional view along line 18-18 of the valve body of FIG. 17 with the adjustment structure in the open position.

Figure 19:
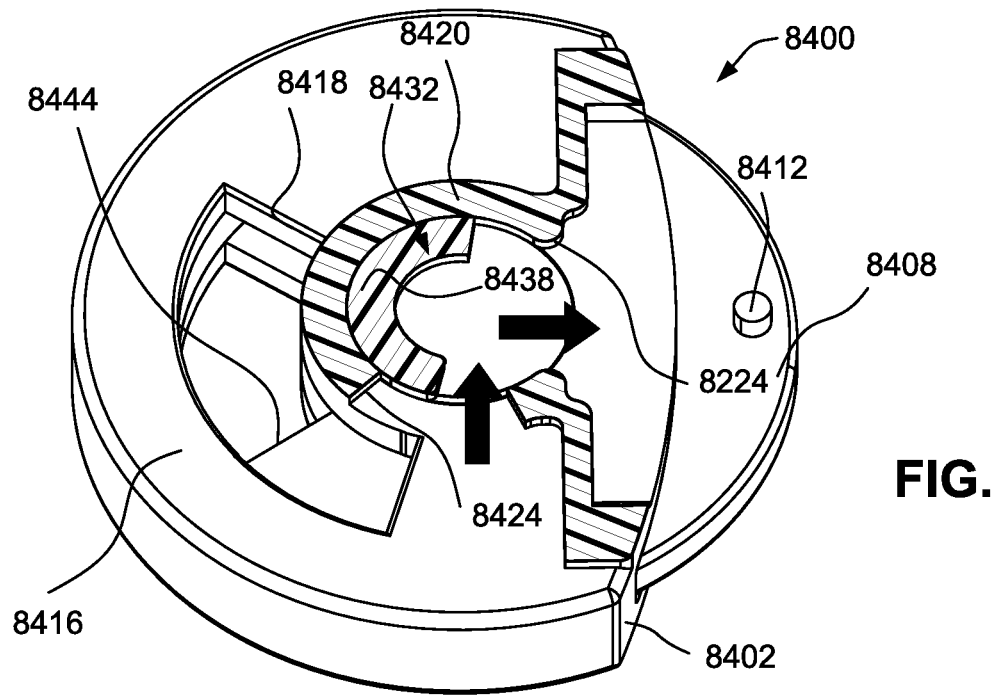

FIG. 19 shows a cross-sectional view along line 18-18 of the valve body of FIG. 17 with the adjustment structure moved partially toward the closed position.

Figure 20:
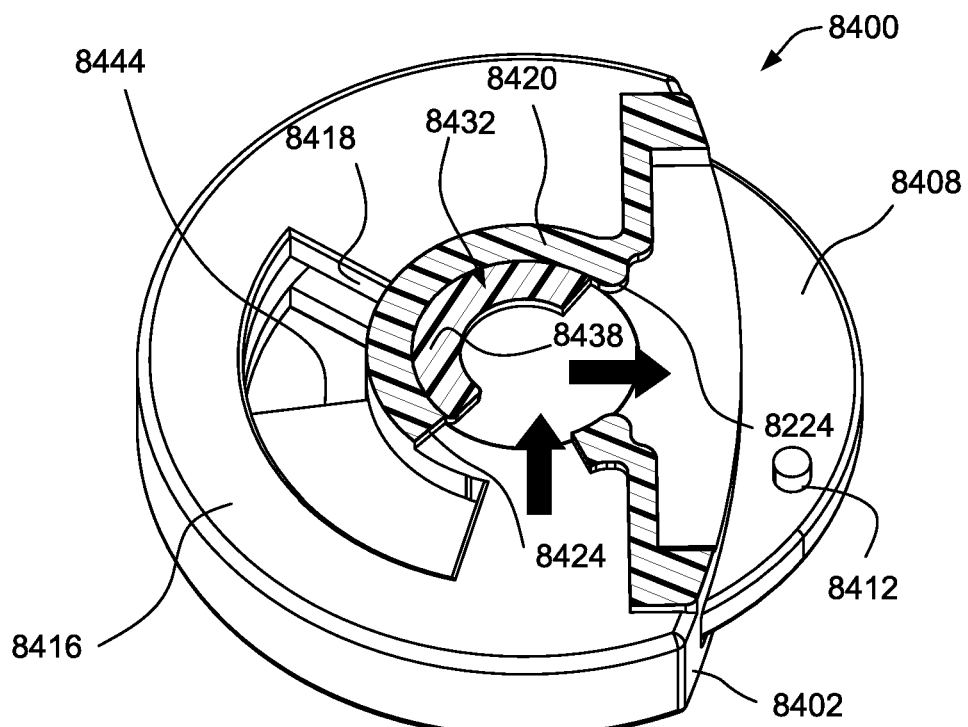

FIG. 20 shows a cross-sectional view along line 18-18 of the valve body of FIG. 17 with the adjustment structure moved mostly toward the closed position.

FIG. 2I shows a cross-sectional view along line 18-18 of the valve body of FIG. 17 with the adjustment structure in the closed position.

Figure 22:
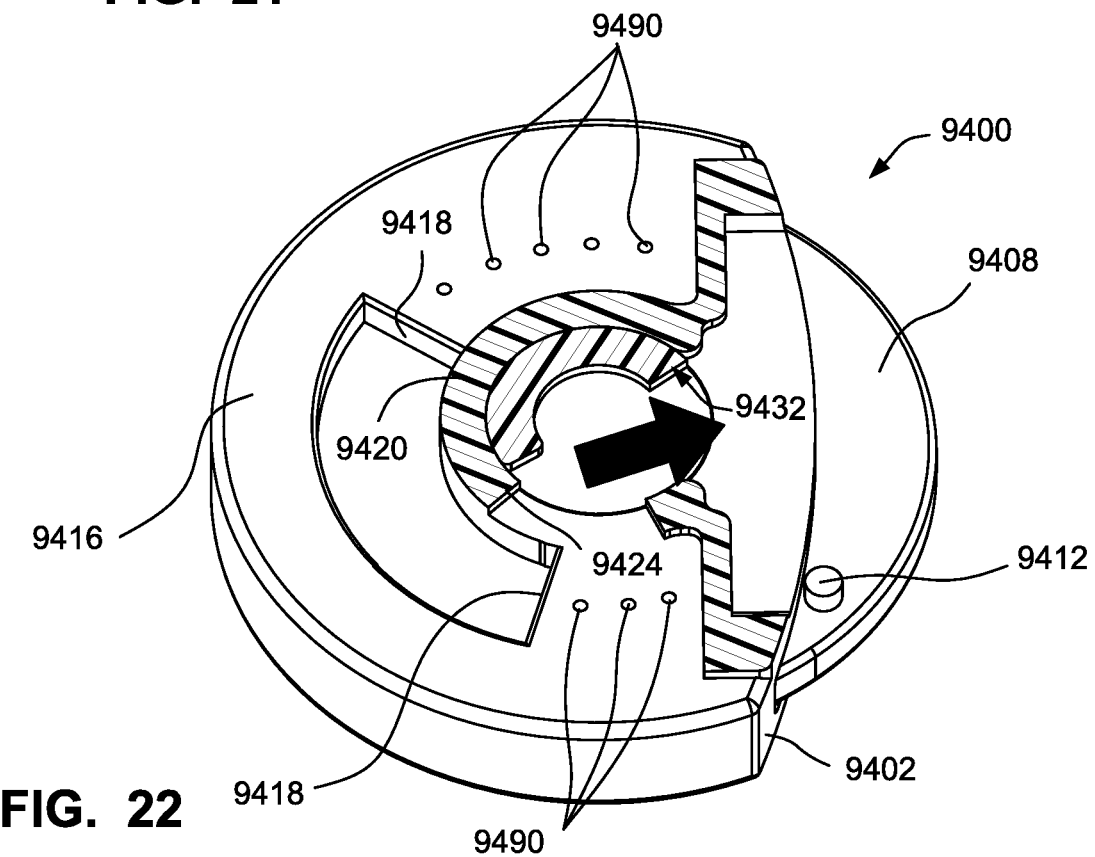

FIG. 22 shows a cross-sectional view of the valve body according to another example with the adjustment structure in the closed position.

Figure 23:
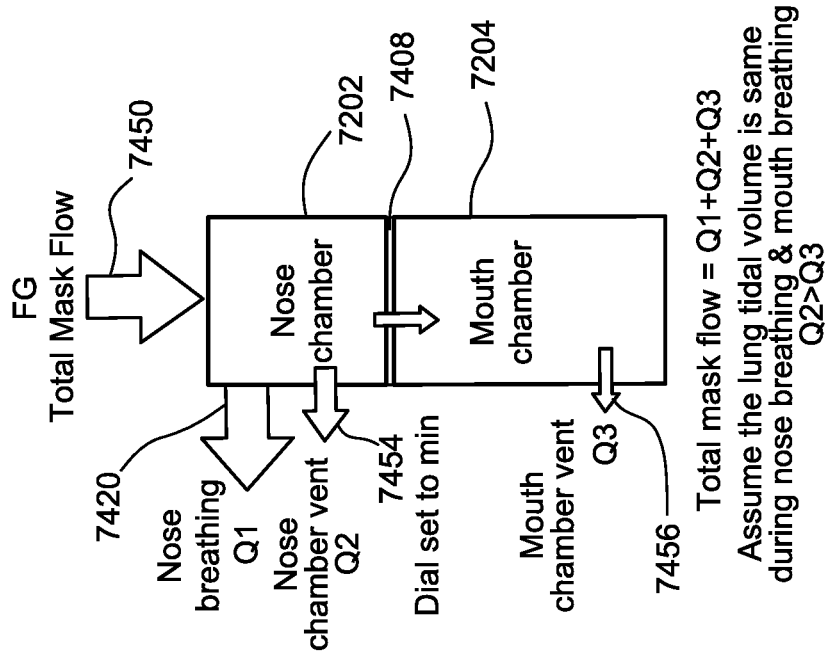

FIG. 23 shows a schematic view of the natural breathing full face mask of FIG. 7 operating with the adjustment structure in the open position.

Figure 24:
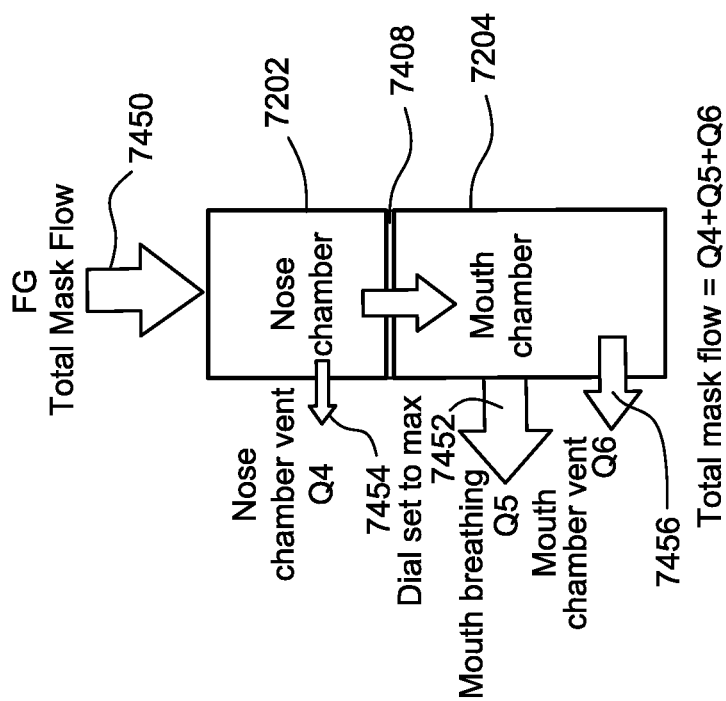

FIG. 24 shows a schematic view of the natural breathing full face mask of FIG. 7 operating with the adjustment structure in the closed position.

Figure 25:
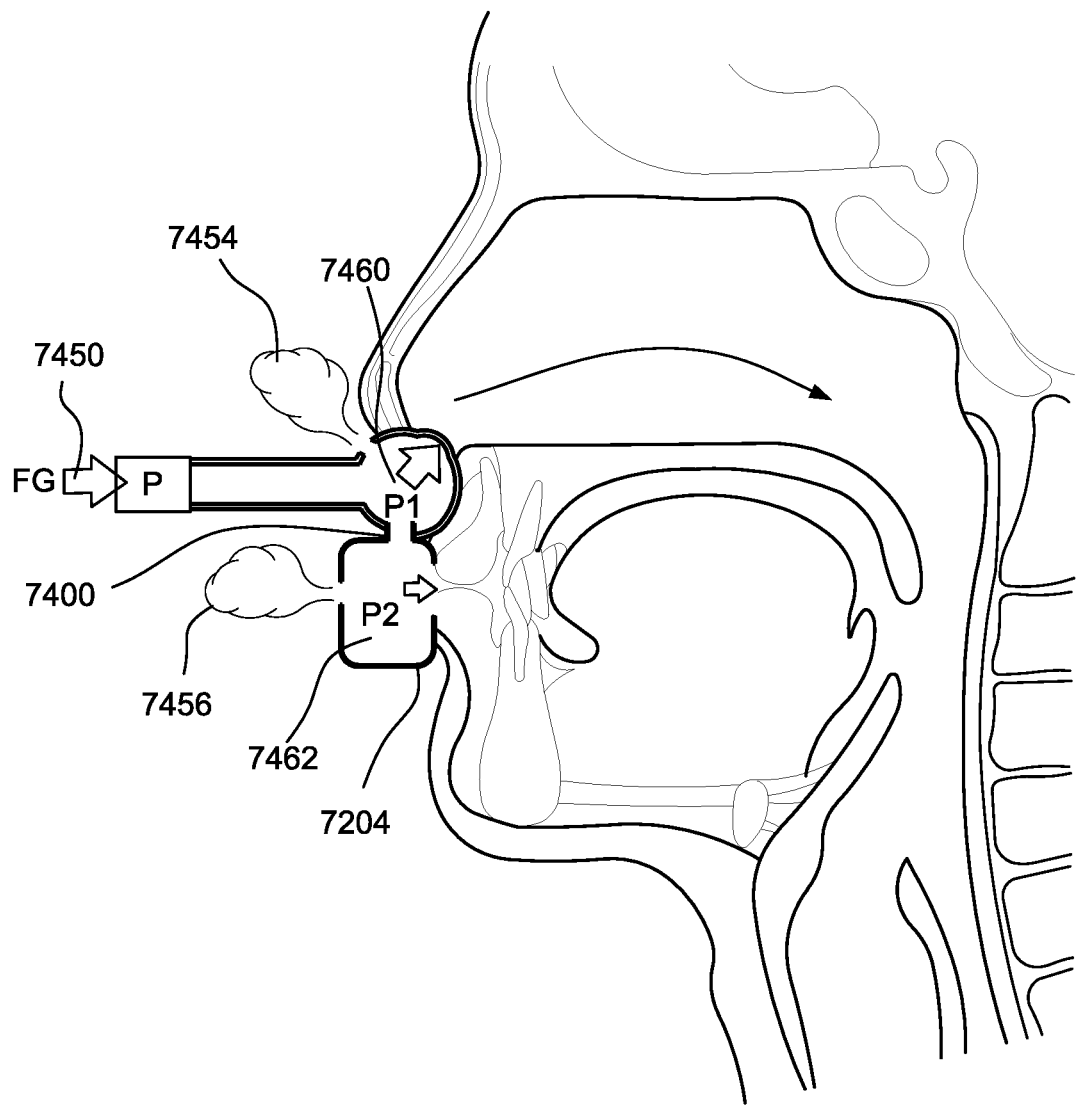

FIG. 25 shows a view of a patient's upper airway with the patient wearing the natural breathing full face mask of FIG. 7.

Figure 26:
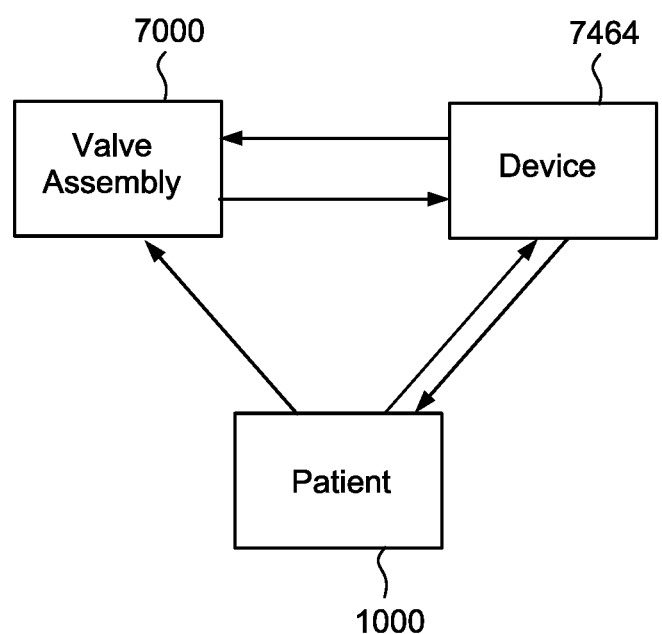

FIG. 26 is a schematic view illustrating communication pathways between a valve assembly, a device, and a patient.

Figure 27:
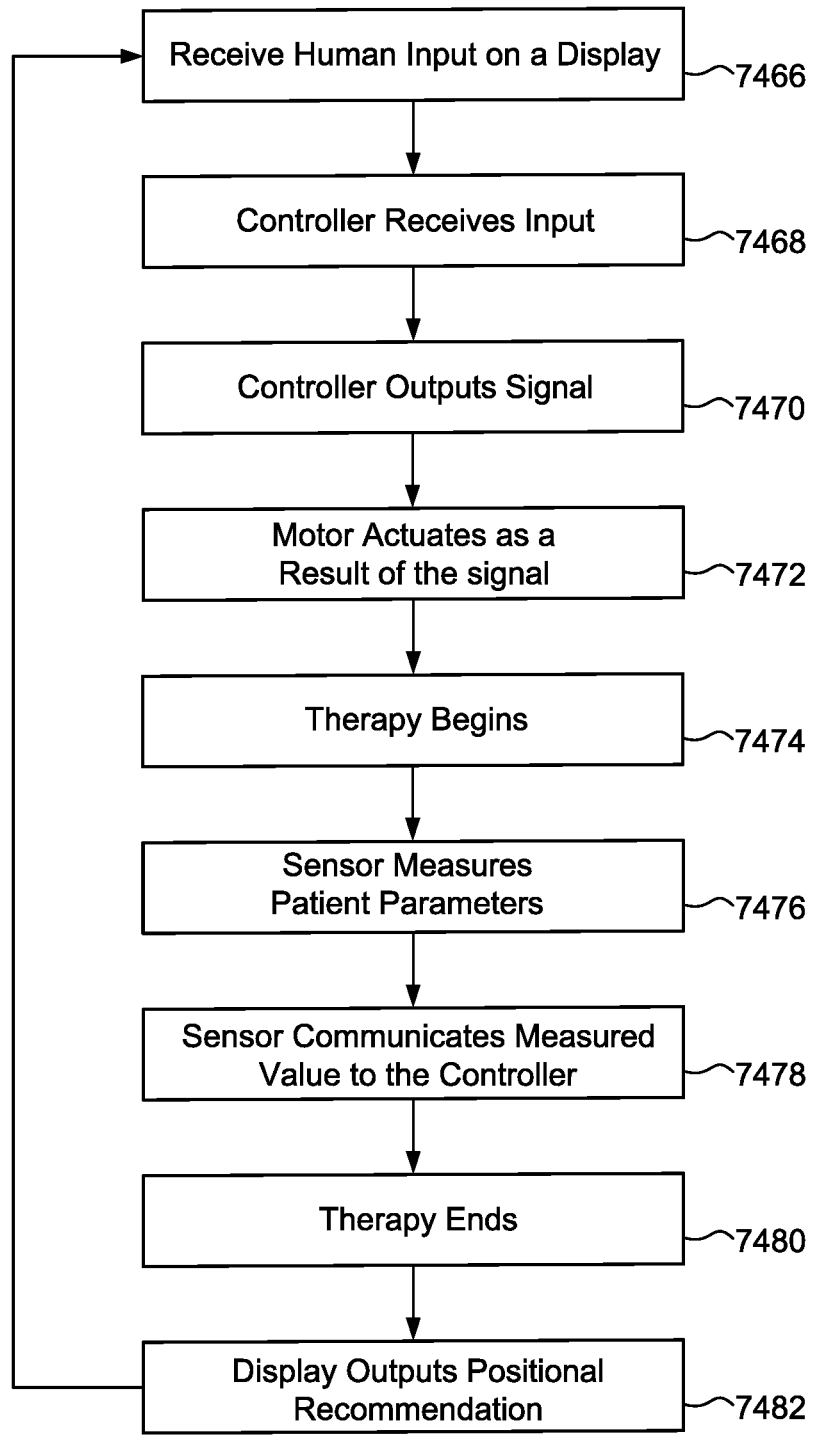

FIG. 27 is a flow chart illustrating a method of controlling the valve body of FIG. 10.

Figure 28:
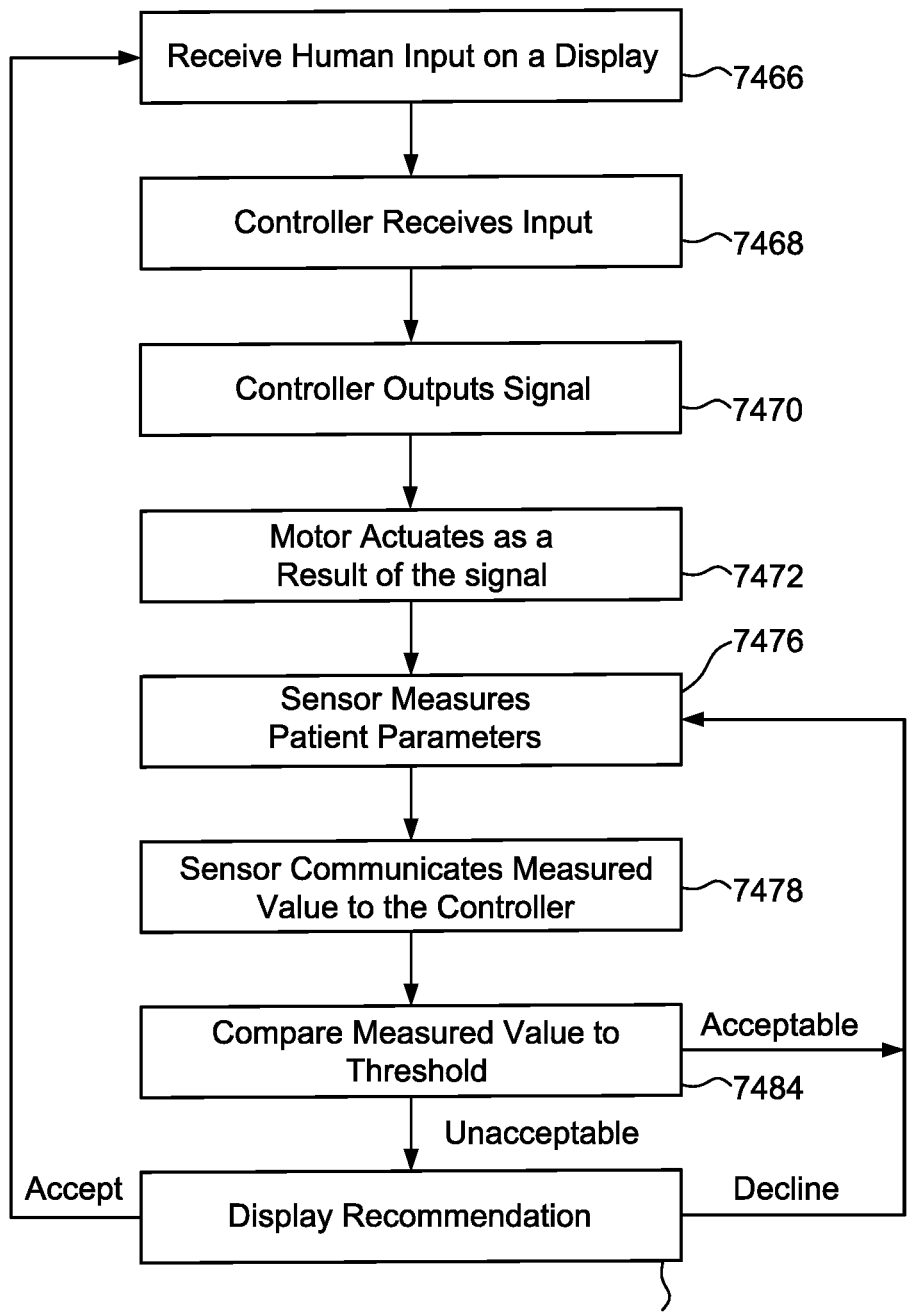

FIG. 28 is a flow chart illustrating an alternate method of controlling the valve body of FIG. 10.

Figure 29:
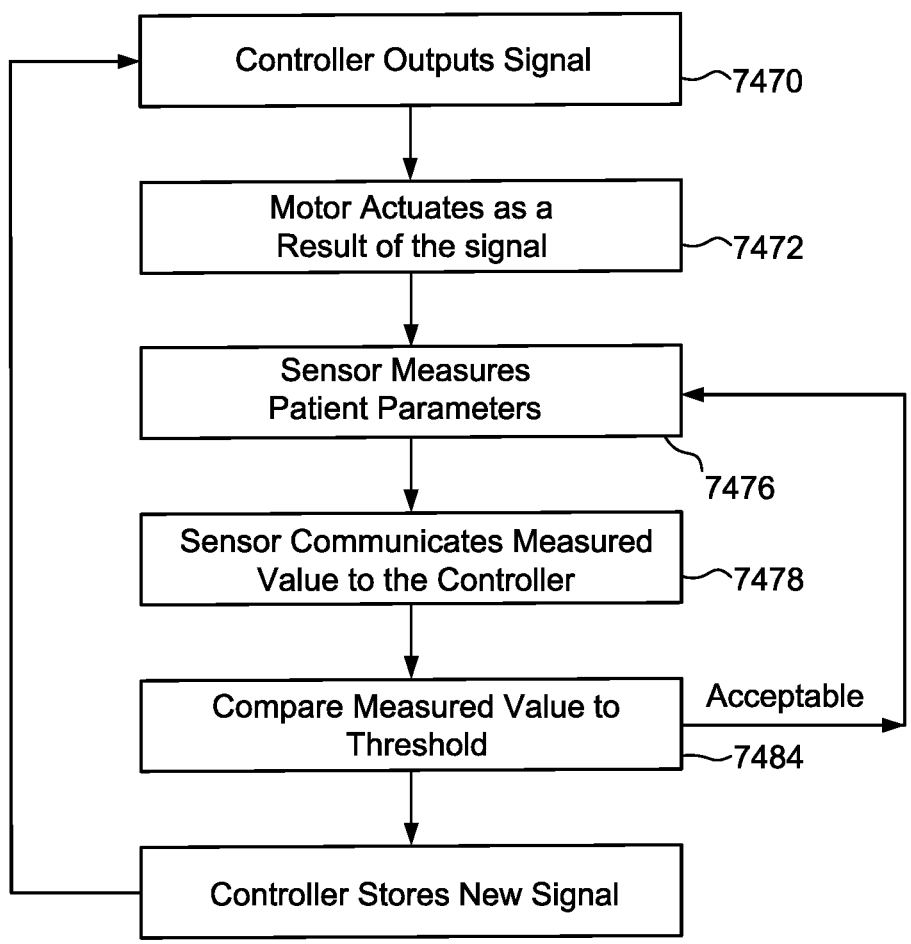

FIG. 29 is a flow chart illustrating a further alternate method of controlling the valve body of FIG. 10.

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Therapy

In one form, the present technology comprises a method for treating a respiratory disorder comprising applying positive pressure to the entrance of the airways of a patient 1000.

In certain examples of the present technology, a supply of air at positive pressure is provided to the nasal passages of the patient via one or both nares.

In certain examples of the present technology, mouth breathing is limited, restricted or prevented.

5.2 Respiratory Therapy Systems

In one form, the present technology comprises a respiratory therapy system for treating a respiratory disorder. The respiratory therapy system may comprise an RPT device 4000 for supplying a flow of air to the patient 1000 via an air circuit 4170 and a patient interface 3000.

Using the respiratory therapy system may assist in ameliorating the respiratory disorder. Long-term use of the respiratory therapy system may assist in providing the patient with continued benefits.

5.3 Patient Interface

A non-invasive patient interface 3000 in accordance with one aspect of the present technology comprises the following functional aspects: a seal-forming structure 3100, a plenum chamber 3200, a positioning and stabilising structure 3300, a vent 3400, one form of connection port 3600 for connection to air circuit 4170, and a forehead support 3700. In some forms a functional aspect may be provided by one or more physical components. In some forms, one physical component may provide one or more functional aspects. In use the seal-forming structure 3100 is arranged to surround an entrance to the airways of the patient so as to maintain positive pressure at the entrance(s) to the airways of the patient 1000. The sealed patient interface 3000 is therefore suitable for delivery of positive pressure therapy.

If a patient interface is unable to comfortably deliver a minimum level of positive pressure to the airways, the patient interface may be unsuitable for respiratory pressure therapy.

The patient interface 3000 in accordance with one form of the present technology is constructed and arranged to be able to provide a supply of air at a positive pressure of at least 6 cmH2O with respect to ambient.

The patient interface 3000 in accordance with one form of the present technology is constructed and arranged to be able to provide a supply of air at a positive pressure of at least 10 cmH2O with respect to ambient.

The patient interface 3000 in accordance with one form of the present technology is constructed and arranged to be able to provide a supply of air at a positive pressure of at least 20 cmH2O with respect to ambient.

5.3.1 Seal-Forming Structure

In one form of the present technology, a seal-forming structure 3100 provides a target seal-forming region, and may additionally provide a cushioning function. The target seal-forming region is a region on the seal-forming structure 3100 where sealing may occur. The region where sealing actually occurs—the actual sealing surface—may change within a given treatment session, from day to day, and from patient to patient, depending on a range of factors including for example, where the patient interface was placed on the face, tension in the positioning and stabilising structure and the shape of a patient's face.

In one form the target seal-forming region is located on an outside surface of the seal-forming structure 3100.

In certain forms of the present technology, the seal-forming structure 3100 is constructed from a biocompatible material, e.g. silicone rubber.

A seal-forming structure 3100 in accordance with the present technology may be constructed from a soft, flexible, resilient material such as silicone.

In certain forms of the present technology, a system is provided comprising more than one a seal-forming structure 3100, each being configured to correspond to a different size and/or shape range. For example the system may comprise one form of a seal-forming structure 3100 suitable for a large sized head, but not a small sized head and another suitable for a small sized head, but not a large sized head.

5.3.1.1 Sealing Mechanisms

In one form, the seal-forming structure includes a sealing flange utilizing a pressure assisted sealing mechanism. In use, the sealing flange can readily respond to a system positive pressure in the interior of the plenum chamber 3200 acting on its underside to urge it into tight sealing engagement with the face. The pressure assisted mechanism may act in conjunction with elastic tension in the positioning and stabilising structure.

In one form, the seal-forming structure 3100 comprises a sealing flange and a support flange. The sealing flange comprises a relatively thin member with a thickness of less than about 1 mm, for example about 0.25 mm to about 0.45 mm, which extends around the perimeter of the plenum chamber 3200. Support flange may be relatively thicker than the sealing flange. The support flange is disposed between the sealing flange and the marginal edge of the plenum chamber 3200, and extends at least part of the way around the perimeter. The support flange is or includes a spring-like element and functions to support the sealing flange from buckling in use.

In one form, the seal-forming structure may comprise a compression sealing portion or a gasket sealing portion. In use the compression sealing portion, or the gasket sealing portion is constructed and arranged to be in compression, e.g. as a result of elastic tension in the positioning and stabilising structure.

In one form, the seal-forming structure comprises a tension portion. In use, the tension portion is held in tension, e.g. by adjacent regions of the sealing flange.

In one form, the seal-forming structure comprises a region having a tacky or adhesive surface.

In certain forms of the present technology, a seal-forming structure may comprise one or more of a pressure-assisted sealing flange, a compression sealing portion, a gasket sealing portion, a tension portion, and a portion having a tacky or adhesive surface.

5.3.1.2 Nose Bridge or Nose Ridge Region

In one form, the non-invasive patient interface 3000 comprises a seal-forming structure that forms a seal in use on a nose bridge region or on a nose-ridge region of the patient's face.

In one form, the seal-forming structure includes a saddle-shaped region constructed to form a seal in use on a nose bridge region or on a nose-ridge region of the patient's face.

5.3.1.3 Upper Lip Region

In one form, the non-invasive patient interface 3000 comprises a seal-forming structure that forms a seal in use on an upper lip region (that is, the lip superior) of the patient's face.

In one form, the seal-forming structure includes a saddle-shaped region constructed to form a seal in use on an upper lip region of the patient's face.

5.3.1.4 Chin-Region

In one form the non-invasive patient interface 3000 comprises a seal-forming structure that forms a seal in use on a chin-region of the patient's face.

In one form, the seal-forming structure includes a saddle-shaped region constructed to form a seal in use on a chin-region of the patient's face.

5.3.1.5 Forehead Region

In one form, the seal-forming structure that forms a seal in use on a forehead region of the patient's face. In such a form, the plenum chamber may cover the eyes in use.

5.3.1.6 Nasal Pillows

In one form the seal-forming structure of the non-invasive patient interface 3000 comprises a pair of nasal puffs, or nasal pillows, each nasal puff or nasal pillow being constructed and arranged to form a seal with a respective naris of the nose of a patient.

Nasal pillows in accordance with an aspect of the present technology include: a frusto-cone, at least a portion of which forms a seal on an underside of the patient's nose, a stalk, a flexible region on the underside of the frusto-cone and connecting the frusto-cone to the stalk. In addition, the structure to which the nasal pillow of the present technology is connected includes a flexible region adjacent the base of the stalk. The flexible regions can act in concert to facilitate a universal joint structure that is accommodating of relative movement both displacement and angular of the frusto-cone and the structure to which the nasal pillow is connected. For example, the frusto-cone may be axially displaced towards the structure to which the stalk is connected.

5.3.2 Plenum Chamber

The plenum chamber 3200 has a perimeter that is shaped to be complementary to the surface contour of the face of an average person in the region where a seal will form in use. In use, a marginal edge of the plenum chamber 3200 is positioned in close proximity to an adjacent surface of the face. Actual contact with the face is provided by the seal-forming structure 3100. The seal-forming structure 3100 may extend in use about the entire perimeter of the plenum chamber 3200. In some forms, the plenum chamber 3200 and the seal-forming structure 3100 are formed from a single homogeneous piece of material.

In certain forms of the present technology, the plenum chamber 3200 does not cover the eyes of the patient in use. In other words, the eyes are outside the pressurised volume defined by the plenum chamber. Such forms tend to be less obtrusive and/or more comfortable for the wearer, which can improve compliance with therapy.

In certain forms of the present technology, the plenum chamber 3200 is constructed from a transparent material, e.g. a transparent polycarbonate. The use of a transparent material can reduce the obtrusiveness of the patient interface, and help improve compliance with therapy. The use of a transparent material can aid a clinician to observe how the patient interface is located and functioning.

In certain forms of the present technology, the plenum chamber 3200 is constructed from a translucent material. The use of a translucent material can reduce the obtrusiveness of the patient interface, and help improve compliance with therapy.

5.3.3 Positioning and Stabilising Structure

The seal-forming structure 3100 of the patient interface 3000 of the present technology may be held in sealing position in use by the positioning and stabilising structure 3300.

In one form the positioning and stabilising structure 3300 provides a retention force at least sufficient to overcome the effect of the positive pressure in the plenum chamber 3200 to lift off the face.

In one form the positioning and stabilising structure 3300 provides a retention force to overcome the effect of the gravitational force on the patient interface 3000.

In one form the positioning and stabilising structure 3300 provides a retention force as a safety margin to overcome the potential effect of disrupting forces on the patient interface 3000, such as from tube drag, or accidental interference with the patient interface.

In one form of the present technology, a positioning and stabilising structure 3300 is provided that is configured in a manner consistent with being worn by a patient while sleeping. In one example the positioning and stabilising structure 3300 has a low profile, or cross-sectional thickness, to reduce the perceived or actual bulk of the apparatus. In one example, the positioning and stabilising structure 3300 comprises at least one strap having a rectangular cross-section. In one example the positioning and stabilising structure 3300 comprises at least one flat strap.

In one form of the present technology, a positioning and stabilising structure 3300 is provided that is configured so as not to be too large and bulky to prevent the patient from lying in a supine sleeping position with a back region of the patient's head on a pillow.

In one form of the present technology, a positioning and stabilising structure 3300 is provided that is configured so as not to be too large and bulky to prevent the patient from lying in a side sleeping position with a side region of the patient's head on a pillow.

In one form of the present technology, a positioning and stabilising structure 3300 is provided with a decoupling portion located between an anterior portion of the positioning and stabilising structure 3300, and a posterior portion of the positioning and stabilising structure 3300. The decoupling portion does not resist compression and may be, e.g. a flexible or floppy strap. The decoupling portion is constructed and arranged so that when the patient lies with their head on a pillow, the presence of the decoupling portion prevents a force on the posterior portion from being transmitted along the positioning and stabilising structure 3300 and disrupting the seal.

In one form of the present technology, a positioning and stabilising structure 3300 comprises a strap constructed from a laminate of a fabric patient-contacting layer, a foam inner layer and a fabric outer layer. In one form, the foam is porous to allow moisture, (e.g., sweat), to pass through the strap. In one form, the fabric outer layer comprises loop material to engage with a hook material portion.

In certain forms of the present technology, a positioning and stabilising structure 3300 comprises a strap that is extensible, e.g. resiliently extensible. For example the strap may be configured in use to be in tension, and to direct a force to draw a seal-forming structure into sealing contact with a portion of a patient's face. In an example the strap may be configured as a tie.

In one form of the present technology, the positioning and stabilising structure comprises a first tie, the first tie being constructed and arranged so that in use at least a portion of an inferior edge thereof passes superior to an otobasion superior of the patient's head and overlays a portion of a parietal bone without overlaying the occipital bone.

In one form of the present technology suitable for a nasal-only mask or for a full-face mask, the positioning and stabilising structure includes a second tie, the second tie being constructed and arranged so that in use at least a portion of a superior edge thereof passes inferior to an otobasion inferior of the patient's head and overlays or lies inferior to the occipital bone of the patient's head.

In one form of the present technology suitable for a nasal-only mask or for a full-face mask, the positioning and stabilising structure includes a third tie that is constructed and arranged to interconnect the first tie and the second tie to reduce a tendency of the first tie and the second tie to move apart from one another.

In certain forms of the present technology, a positioning and stabilising structure 3300 comprises a strap that is bendable and e.g. non-rigid. An advantage of this aspect is that the strap is more comfortable for a patient to lie upon while the patient is sleeping.

In certain forms of the present technology, a positioning and stabilising structure 3300 comprises a strap constructed to be breathable to allow moisture vapour to be transmitted through the strap, In certain forms of the present technology, a system is provided comprising more than one positioning and stabilizing structure 3300, each being configured to provide a retaining force to correspond to a different size and/or shape range. For example the system may comprise one form of positioning and stabilizing structure 3300 suitable for a large sized head, but not a small sized head, and another. suitable for a small sized head, but not a large sized head.

5.3.4 Vent

In one form, the patient interface 3000 includes a vent 3400 constructed and arranged to allow for the washout of exhaled gases, e.g. carbon dioxide.

In certain forms the vent 3400 is configured to allow a continuous vent flow from an interior of the plenum chamber 3200 to ambient whilst the pressure within the plenum chamber is positive with respect to ambient. The vent 3400 is configured such that the vent flow rate has a magnitude sufficient to reduce rebreathing of exhaled CO2 by the patient while maintaining the therapeutic pressure in the plenum chamber in use.

One form of vent 3400 in accordance with the present technology comprises a plurality of holes, for example, about 20 to about 80 holes, or about 40 to about 60 holes, or about 45 to about 55 holes.

The vent 3400 may be located in the plenum chamber 3200. Alternatively, the vent 3400 is located in a decoupling structure, e.g., a swivel.

5.3.5 Decoupling Structure(s)

In one form the patient interface 3000 includes at least one decoupling structure, for example, a swivel or a ball and socket.

5.3.6 Connection Port

Connection port 3600 allows for connection to the air circuit 4170.

5.3.7 Forehead Support

In one form, the patient interface 3000 includes a forehead support 3700.

5.3.8 Anti-Asphyxia Valve

In one form, the patient interface 3000 includes an anti-asphyxia valve (AAV).

As described below with respect to FIG. 8, the AAV 7232 may be used with a full-face mask in order to allow a patient to breath in the absence of the flow of pressurized breathable gas. The AAV 7232 may be large enough in order to allow patients to inhale a sufficient amount of air with each breath.

5.3.9 Ports

In one form of the present technology, a patient interface 3000 includes one or more ports that allow access to the volume within the plenum chamber 3200. In one form this allows a clinician to supply supplementary oxygen. In one form, this allows for the direct measurement of a property of gases within the plenum chamber 3200, such as the pressure.

5.3.10 Natural Breathing Interface

5.3.10.1 Summary of Nasal Breathing Benefits

Although patients may need to continuously use a patient interface in order to ameliorate a respiratory disorder, adherence to the therapy may be low. In other words, patients may inconsistently use the patient interface, or may give up on the therapy all together. This lack of adherence may be particularly high in patients that use a full-face mask to ameliorate their respiratory disorder.

Using a mask that promotes natural breathing in a patient may assist in increasing adherence to wearing the patient interface by reducing factors in a patient interface that a patient may find uncomfortable.

Humans are capable of inhaling breathable gas through either their nose or their mouth. However, it is biologically more efficient for humans to breathe through their noses in all but exceptional situations. Nasal breathing protects a human's respiratory system by priming the air for respiration. The nasal passageway warms and humidifies inhaled air before it goes further down the respiratory tract. This ensures that the inhaled air does not damage the airway or the lungs. Alternatively, breathing in dry, cold air—as happens during mouth breathing—can irritate the airway and lungs, leading to wheezing, coughing, and/or shortness of breath and could affect asthma. The nasal passageway also filters airborne particles. Mucus, nose hairs, and cilia catch potentially harmful bacteria before it enters the respiratory tract, which can protect a person from illnesses such as pneumonia. Nasal breathing helps to clear mucus from the nose that can otherwise lead to infections such as sinusitis, ear infections and blockage of the nasal passage.

These elements are missing from the mouth and constant mouth breathing can lead to increased congestion in the nasal passage and perpetuating the cycle. Therefore, nose breathing should be the first choice or the primary breathing and mouth breathing should only occur when the nostrils are congested, due to things like allergies, sickness, and/or other complex conditions.

Nose breathing, unlike mouth breathing, may also help to optimise oxygen ($O_2$) and carbon dioxide ($CO_2$) levels in a patient's respiratory system because too much $O_2$ is expelled when a patient exhales through his mouth. This is due to typically larger volume breaths and a higher rate of breathing when a patient breathes through his mouth. The patient's lungs do not have time to absorb as much of the $O_2$ and therefore the breathing rate needs to increase further. One of the main respiratory rate drivers is $CO_2$. Thus, mouth breathing could lead to some level of over breathing which could throw off a patient's $O_2$—$CO_2$ balance, which could lead to adverse effects including hyperventilation, light-headedness, and less efficient lung function.

Nitric oxide (NO) is also an important gas in the respiratory process. Nitric oxide is a vasodilator, which means that it helps expand blood vessels to improve blood circulation. Among other things, this lowers blood pressure, boosts the immune system, increases brain function, and it also known to be antifungal, antiviral and antibacterial. However, NO inhalation only occurs through nasal breathing.

In addition to the benefits of nose breathing, mouth breathing also contributes to dry mouth in a patient (e.g., by preventing a sufficient amount of saliva in the patient's mouth), leaving your teeth and gums susceptible to bacteria. The proliferation of the bacteria can kill the oral microbiome, which may lead to serious conditions like gingivitis, periodontitis, receding gums, cavities, oral decay, and halitosis.

Because of the benefits of nasal breathing, it is desirable for clinicians to prescribe nasal masks (i.e., masks that leave the patient's mouth uncovered) to patients. However, these masks may be ineffective for some patients. For example, patients may experience mouth leak if they sleep with their mouth open and use a nasal mask. In other words, the pressurized air may enter the patient's nose and exit the patient's mouth without having entered the patient's lungs. Other patients may be habitual mouth breathers and may inhale and exhale through their mouth despite receiving the pressurized air proximate to their nose. Still other patients with sleep apnea may develop a habit to sleep with their mouth open to accommodate their need for oxygen. For any of these reasons, patients may feel that the nasal mask is ineffective, and may discontinue use.

Therefore, it may be beneficial to provide a full-face mask that encourages nasal breathing in order to encourage use of the patient interface, while also providing the benefits of nasal breathing.

5.3.10.2 Summary of Natural Breathing Masks

As shown in FIGS. 7 to 9, a patient interface 7000 may be a natural breathing mask that encourages nasal breathing dominance as compared to a standard full-face mask. The patient interface 7000 may therefore be considered a nasal breathing full-face mask.

In a traditional full face mask, an equivalent pressure may be applied to both the patient's nose and to the patient's mouth. This may be the result of a single plenum chamber that receives both the patient's nose and the patient's mouth. Alternatively, there may be a separate nasal plenum chamber and oral plenum chamber that are in constant, and substantially uninterrupted, fluid communication with each other so that the pressure is equal in both chambers.

The natural breathing mask 7000 may create two separate chambers, one for the patient's nose (i.e., a nasal plenum chamber 7202) and one for the patient's mouth (i.e., an oral plenum chamber 7204). Generally, the oral plenum chamber 7204 receives the patient's mouth (e.g., the patient's lips) while in use. Depending on the style of natural breathing mask 7000 however, the nasal plenum chamber 7202 may or may not receive at least a portion of the patient's nose. For example, the illustrated example of FIG. 8 contacts an underside of the patient's nose to seal around the patient's nares, but the seal-forming structure 7100 may prevent the patient's nose from entering the nasal plenum chamber 7202. Alternatively, the nasal plenum chamber 7202 may include an opening like the oral plenum chamber 7204 so that at least a portion of the patient's nose (e.g., the patient's pronasale) is receivable within the nasal plenum chamber 7202.

However, the separate chambers may have different pressures while in use. For example, the nasal plenum chamber may include a higher pressure during use than the oral plenum chamber. The higher pressure in the nasal plenum chamber may be sufficient to overcome the pneumatic resistance in the nasal passage and may create a pneumatic air splint that keeps the upper nasal passage open and restrict the oral passage. As shown in FIG. 2M, the pressure difference moves the soft palate towards the oral passage in order to substantially block airflow through the oral passage. The movement of the soft palate opens the nasal passage thereby enabling the patient to breathe through his nose.

Using the nasal breathing full-face mask 7000 reduces the continuous mouth breathing that triggers excessive mucus formation and nasal passage blocking, which in turn leads to more mouth breathing.

Using the nasal breathing full-face mask 7000 may provide various health benefits to patients. For example, it may assist in substantially limiting the patient from becoming a habitual mouth breather. Using the nasal breathing full-face mask 7000 may also reduce dry mouth in a patient.

In some forms, the nasal breathing full-face mask 7000 may need a lower sealing force as compared to a standard full-face mask, which may make wearing the nasal breathing full-face mask 7000 more comfortable for a patient.

These benefits, as well as others, may help improve patient compliance with consistently wearing the nasal breathing full-face mask 7000, which helps to better ameliorate the breathing disorder.

5.3.10.3 Description of Nasal Breathing Mask

As illustrated in FIGS. 7 and 8, the nasal breathing full-face mask 7000 may include a seal-forming structure 7100 and a plenum chamber 7200. The seal-forming structure 7100 may be structured to engage the patient's face and form a seal around the patient's nares and the patient's mouth in order to limit pressurized air from escaping to the ambient environment. The plenum chamber 7200 may form a space for receiving the pressurized breathable gas, and may provide a space for receiving the patient's nares and mouth so that both are received within a pressurized environment.

As shown in FIG. 9, the seal-forming structure 7100 may include a first or nasal seal-forming structure 7102 and a second or oral seal-forming structure 7104. The nasal seal-forming structure 7102 may be structured to seal around the patient's nares and the oral seal-forming structure 7104 may be structured to seal around the patient's mouth.

In the illustrated example, the nasal seal-forming structure 7102 and the oral seal-forming structure 7104 may be constructed from a single piece of material. The material may be fold and/or shaped in order to form the different shapes needed for the nasal and oral seal-forming structures 7102, 7104 respectively.

In certain forms, the nasal and oral seal-forming structures 7102, 7104 may be constructed from a flexible and elastomeric material (e.g., silicone). The elastomeric material may be able to stretch and conform to a patient's face in order to provide a snug fit (e.g., in order to reduce leaks).

In certain forms, the nasal and oral seal-forming structures 7102, 7104 may be constructed from a textile material. The textile material may be coated with an impermeable membrane (e.g., on a non-patient contacting side) and/or may be woven in a way as to make the membrane substantially impermeable. The textile material may be comfortable against the patient's skin, and may help to improve the patient's compliance with the therapy.

In one form, the textile material used to form the nasal and oral seal-forming structures 7102, 7104 may be formed with complex curvatures in order to form the various shapes to conform to the patient's face. The complex curvatures may be described in U.S. application Ser. No. 16/850,803, which is incorporated herein by reference in its entirety.

With continued reference to FIG. 9, the nasal seal-forming structure 7102 may include a pair of nasal openings 7106 and a bridge 7108 separating the nasal openings 7106.

In some forms, the nasal openings 7106 may be formed to be approximately the size of the patient's nares so that the material of the nasal seal-forming structure 7102 contacts the patient's alar rims in order to form a seal around each naris.

Each nasal opening may provide communication into a nasal plenum chamber 7202 (described below). This may allow a patient to inhale pressurized gas from the nasal plenum chamber 7202.

In some forms, the bridge 7108 may contact the patient's columella while in use. In some forms, the bridge 7108 may be held in tension prior to use and may further stretch as a result of contact with the patient's nose. In other forms, the bridge 7108 may be slack prior to use, and may become taut as a result of contact with the patient's face.

In other examples (see e.g., FIG. 25), the nasal seal-forming structure 7102 may be formed as nasal pillows, which may seal against an inner surface of the patient's nares. In some forms, less of the patient's nose may be in contact with the nasal breathing full-face mask 7000, which may be a factor in promoting patient compliance.

In some forms, the nasal seal-forming structure 7102 may be formed from a different piece of material than the oral seal-forming structure 7104. For example, the nasal pillows may be constructed separately from the oral seal-forming structure 7104 in order to form the necessary shape. This may be a separate piece of the same material, or it may be two different materials (e.g., one constructed from silicone and one constructed from textile).

Returning to FIG. 9, the oral seal-forming structure 7104 may include an oral opening 7110. Similar to the nasal openings 7106, the oral opening 7110 may provide communication with the oral plenum chamber 7204 (described below). The patient wearing the nasal breathing full-face mask 7000 may be able to inhale and/or exhale into the oral plenum chamber 7204 through his mouth.

Returning to FIGS. 7 and 8, the nasal breathing full-face mask 7000 may include a shell 7208 on an anterior (e.g., non-patient contacting) side. In the illustrated example, the shell 7208 may be formed as a portion of the plenum chamber 7200. In other words, the shell 7208 may assist in maintaining the pressurized air within the plenum chamber 7200. However, in other examples, the shell 7208 may be formed separately from the plenum chamber 7200 so that the shell 7208 is not needed to maintain pressurized gas within the plenum chamber 7200.

In some forms, the shell 7208 may be constructed from a rigid or semi-rigid material. For example, the shell 7208 may be constructed from a rigid plastic material. The rigid material (or semi-rigid material) may provide support for the nasal breathing full-face mask 7000. For example, the rigidity may help support the shape of the nasal breathing full-face mask 7000 in order to reduce creasing of the seal-forming structure 7100.

In certain forms, the shell 7208 may be formed from a transparent and/or translucent material. This may allow other people to see into the plenum chamber 7200 (e.g., to check the position of the seal-forming structure 7100) while the patient is wearing the nasal breathing full-face mask 7000. The transparent and/or translucent material may also allow the patient to more easily see into the plenum chamber 7200 when the nasal breathing full-face mask 7000 is not in use, which may assist the patient in cleaning the nasal breathing full-face mask 7000.

In certain forms (see e.g., FIG. 8-1), the shell 7208 may be removable from the plenum chamber 7200. For example, the rigid material of the shell 7208 may be coupled to the flexible material of the remainder of the plenum chamber 7200. When not in use, the shell 7208 may be removed in order to increase access to the interior of the plenum chamber 7200 for cleaning. The shell 7208 may then be reattached to the remainder of the plenum chamber 7200 so that the nasal breathing full-face mask 7000 may continue to be used.

As shown in FIG. 8, the shell 7208 may extend substantially along the height of the plenum chamber 7200. In other words, the shell 7208 may enclose at least a portion of the nasal plenum chamber 7202 and the oral plenum chamber 7204. In the illustrated example, the shell 7208 may not extend to the superior-most and/or inferior-most portions of the plenum chamber (e.g., the upper-most and lower-most edges). This may allow the seal-forming structure 7100 to flex, which may allow for additional comfort and/or better sealing.

As shown in FIG. 8-1, openings 7212 may be included at superior regions of the shell 7208. The openings 7212 may provide fluid communication into the plenum chamber 7200.

In the illustrated example, the openings 7212 may be disposed in order to align with the nasal plenum chamber 7202. In other words, the openings 7212 may be entirely above the oral plenum chamber 7204 so that fluid flow though the openings 7212 is conveyed directly into the nasal plenum chamber 7202.

With continued reference to FIG. 8-1, the shell 7208 may also include connectors 7216, which may be spaced apart from the openings 7212. For example, the connectors 7216 may be disposed on an inferior portion of the shell 7208 (e.g., aligned with the oral plenum chamber 7204).

In some forms, the connectors 7216 may be magnets and may be structured to removably connect to other magnets or magnetic materials. In other forms, the connectors 7216 may be mechanical connectors, hook and loop material, an adhesive, and/or any other similar form of connector.

As shown in FIGS. 7 to 8-1, conduit connectors 7220 may be connected to the openings 7212 with a sealed connection. In some forms, the conduit connectors 7220 may be connected with a mechanical engagement (e.g., a press fit, a snap fit, and/or a frictional fit). Other forms of engagement (e.g., magnetic engagement) may be used instead of or in addition to the mechanical engagement.

As shown in FIG. 7, the connectors 7216 and the conduit connectors 7220 may be used to assist connecting the positioning and stabilizing structure 7300 to the plenum chamber 7200 (e.g., via the shell 7208).

In some forms, conduits 7302 may be connected (e.g., permanently or removably) to the conduit connectors 7220. The conduits 7302 may be constructed from a flexible material (e.g., silicone, textile, etc.). The conduits 7302 may convey pressurized breathable gas to the plenum chamber 7200 through the conduit connectors 7220.

In some forms, the conduits 7302 may provide a force (e.g., a tensile force) when connected to the conduit connectors 7220 and worn by the patient. The conduits may provide a force directed toward a posterior and/or superior portions of the patient's head in order to provide a sealing force to the seal-forming structure 7100 (e.g., to maintain the seal-forming structure 7100 in an operable position.

In certain forms, the conduits 7302 may be able to stretch to accommodate patients with different head sizes (e.g., in order to create a snug but not overly tight fit). The conduits 7302 may also be manufactured in different sizes so that patients with different sized heads may utilize different sized conduits 7302.

In certain forms, the conduits 7302 may expand when conveying pressurized air. The expanded conduits 7302 may provide added cushioning against the patient's head, and/or may provide a force directed into the patient's head in order to better retain the conduits 7302 in position.

In some forms, headgear straps 7304 may provide a force (e.g., a tensile force) when connected to the connectors 7216. The headgear straps 7304 may be constructed from a flexible material (e.g., textile, etc.).

In some forms, the headgear straps 7304 may be connected to a magnetic connector and/or may include a magnetic material (e.g., a magnetic thread which is described in detail in International Application No. PCT/SG2020/050792, which is incorporated herein by reference in its entirety). The headgear straps 7304 may be removably connected to the connectors 7216 using the magnets.

In other forms, each connector 7216 may include a loop that may receive a headgear strap 7304. For example, a headgear strap 7304 may be threaded through the respective connector 7216 so that its length may be adjusted. This may allow the tension in the headgear straps 7304 to be adjusted in order to provide a sealing force that is comfortable to a particular patient.

5.3.10.3.1 Valve Assembly

As shown in FIG. 8, the shell 7208 may include at least one vent designed to assist in removing waste gas (e.g., $CO_2$) from the plenum chamber 7200 so that additional breathable gas may fill the plenum chamber 7200 and can be inhaled by the patient.

In some forms, the at least one vent may include a plurality of vent holes grouped together, and each configured to allow fluid flow out of the plenum chamber 7200 and into the ambient environment.

In the illustrated example, the shell 7208 may include a first or nasal vent 7224 and a second or oral vent 7228. The nasal vent 7224 may be in communication with the nasal plenum chamber 7202 and the oral vent 7228 may be in communication with the oral plenum chamber 7204. Each vent 7224, 7228 may include a plurality of holes through which gas may be exhaust from the plenum chamber 7200.

In some forms, the nasal and oral vents 7224, 7228 may be sized to allow gas to exhaust from the plenum chamber 7200 without substantially decreasing the internal pressure within the plenum chamber 7200. In other words, the pressure within the plenum chamber 7200 may be substantially similar to the pressure that the pressurized gas is supplied at and may not substantially decrease as a result of venting through the nasal and/or oral vents 7224, 7228.

In other forms, the nasal vents 7224 may be positioned on the conduit connectors 7220 instead of and/or in addition to the nasal vents 7224 on the shell 7208.

In some forms, the shell 7208 may include an AAV 7232 that may be spaced apart from the nasal and oral vents 7224, 7228. The AAV 7232 may be disposed on the shell 7208 in order to be in communication with the oral plenum chamber 7204. This may allow the patient to breathe through his mouth in the absence of a flow of pressurized air.

In some forms, the AAV 7232 may be normally biased to an open position so that the oral plenum chamber 7204 is open to the atmosphere and at ambient pressure. While worn by a patient during the application of therapy, the pressurized air supplied to the oral plenum chamber 7204 may move the AAV 7232 in the closed position. Once in the closed position, the AAV 7232 closes the oral plenum chamber 7204 from the external environment and limits ambient air from exiting and/or entering the oral plenum chamber 7204. As the pressure in the oral plenum chamber 7204 drops below certain pressure, the air may no longer be able to retain the AAV 7232 in the closed position, and the bias may return the AAV 7232 to the open position. This may allow the patient to continue to breathe when pressurized air is not supplied at all, or not supplied to the oral plenum chamber 7204.

In certain forms, a sufficient amount of pressurized air may enter the oral plenum chamber 7204 to overcome the bias and may move the AAV 7232 to the closed position. However, the volumetric flow of air into the oral plenum chamber 7204 may be insufficient for a patient to continuously breathe through their mouth. As such, the patient may inhale through their mouth, which may move the AAV 7232 to the open position (e.g., as a result of the pressure change) so that ambient air enters the oral plenum chamber 7204. This may allow the patient to breathe through their mouth when pressurized air is at least partially blocked from reaching the oral plenum chamber 7204.

In certain forms, pressurized air may enter the oral plenum chamber 7204 at a therapeutic pressure. The therapeutic pressure may be substantially equal to or less than the therapeutic pressure in the nasal plenum chamber 7202 (e.g., both pressures may be greater than a minimum therapeutic pressure, but the pressure in the nasal plenum chamber 7202 may be greater than the pressure in the oral plenum chamber as a result of the valve assembly 7400, described below). The therapeutic pressure in the oral plenum chamber 7204 may be sufficient to retain the AAV 7232 in the closed position.

As shown in FIGS. 8 and 10, a valve assembly 7400 may be incorporated into the shell 7208. In some forms, this may be an integral incorporation (e.g., via an overmold), and the valve assembly 7400 may not be removable from the remainder of the shell 7208. In other forms, the valve assembly 7400 may be removably connected to the remainder of the shell 7208 with a sealing engagement (e.g., via a press fit, snap fit and/or frictional fit).

In the illustrated form, at least a portion of the valve assembly 7400 may be constructed from a rigid material (e.g., plastic). The rigid material may match the material of the shell 7208. In other forms, at least a portion of the valve assembly 7400 may be constructed from a flexible material (e.g., silicone).

As shown in FIG. 10, a front face 7402 of the valve assembly 7400 may have a substantially rectangular shape when viewed from the front, although any other shape may be used (e.g., circular, elliptical, triangular, etc.). The front face 7402 of the valve assembly 7400 may also have a curvature across an anterior surface that substantially matches the curvature of the remainder of the shell 7208.

In the illustrated example, the nasal vent 7224 may be disposed on the valve assembly 7400. For example, in an example where the valve assembly 7400 is removable, the nasal vent 7224 would also be removable from the plenum chamber 7200.

In some forms, the valve assembly 7400 may include an indicator 7404. The indicator 7404 may be a marking on the valve assembly 7400 that assists in communicating information to the patient or clinician. In the illustrated example, the indicator 7404 may have a substantially triangular shape. The indicator 7404 may also extend across a substantial portion (e.g., at least half the width) of the valve assembly 7400 so that it is easily visible.

In alternate examples (not shown), the indicator 7404 may be an electronic display. This could include a liquid-crystal display (LCD) screen, or it could include at least one (e.g., one, two, three, etc.) light-emitting diode (LED). Either of these may be able to similarly communicate information to the patient and/or the clinician.

With continued reference to FIG. 10, the valve assembly 7400 also includes an adjustment structure 7408. The adjustment structure 7408 may be movable relative to the shell 7208. In the illustrated example, the adjustment structure 7408 is rotatable relative to the shell 7208. In other examples, the adjustment structure 7408 may be slidable relative to the shell 7208.

In the illustrated example, the adjustment structure 7408 may be disposed between the nasal vent 7224 and the indicator 7404, although other positions are also possible.

In some forms, the adjustment structure 7408 may include an interfacing structure 7412. For example, the interfacing structure 7412 may be a grip formed on the adjustment structure 7408. The interfacing structure 7412 may provide a space for a patient to engage, and more easily move, the adjustment structure 7408. The interfacing structure 7412 may also provide a visual and/or tactile indication as to the position (e.g., rotational and/or translational) of the adjustment structure 7408. For example, the position of the interfacing structure 7412 may be used in combination with the indicator 7404 in order to determine where the adjustment structure 7408 is positioned.

In certain forms (see e.g., FIGS. 12 and 13), the adjustment structure 7408 may have a substantially circular body (although other shapes may be used). The circular adjustment structure 7408 may assist the adjustment structure 7408 in rotating. The interfacing structure 7412 may be formed as a cut out so that the outer perimeter of the adjustment structure 7408 is not completely circular. The patient's finger may be able to fit within the cut out in order to actuate the adjustment structure 7408.

In one form, the cut out of the interfacing structure 7412 may be approximately the size of the patient's finger. For example, the cut out may be large enough for a patient to position his finger and actuate the interfacing structure 7412.

As shown in FIGS. 11 to 16, the valve assembly 7400 may include a partition 7416. The partition 7416 may be coupled to the front face 7402. In the illustrated example, the partition 7416 may extend in a substantially perpendicular direction from the front face 7402 (e.g., from a tangent line along a center of the front face 7402).

In the illustrated form, the partition 7416 may be a curved wall extending from the front face 7402 (e.g., from an opposite face from the indicator 7404). In other forms, the partition 7416 may have another shape (e.g., triangular, rectangular, etc.).

In some forms, the partition 7416 may be formed as a thin wall. For example, the partition 7416 may be thinner than the front face 7402. The partition 7416 may be constructed from a rigid material (e.g., plastic) in order to maintain the shape (e.g., in order to limit bending under gravity).

As shown in FIGS. 12 and 13, the partition 7416 may include a first body opening 7418. The first body opening 7418 may extend completely through the partition 7416.

In some forms, the first body opening 7418 may be approximately centered on the partition 7416.

In some forms, the first body opening 7418 may extend along a curved path. For example, the first body opening 7418 may form a segment of a ring or circle. In some forms, the first body opening 7418 may extend about 1° to about 179°. In some forms, the first body opening 7418 may extend about 2° to about 150°. In some forms, the first body opening 7418 may extend about 4° to about 110°. In some forms, the first body opening 7418 may extend about 6° to about 90°. In some forms, the first body opening 7418 may extend about 8° to about 75°. In some forms, the first body opening 7418 may extend about 10° to about 70°. In some forms, the first body opening 7418 may extend about 40° to about 60°. In some forms, the first body opening 7418 may extend about 50°.

As shown in FIGS. 11 to 16, an inner housing 7420 may be coupled to the partition 7416. For example, the inner housing 7420 may be integrally formed with the partition 7416.

In some forms, the inner housing 7420 may extend substantially perpendicularly from the partition 7416. The outer perimeter of the inner housing 7420 may also have a substantially cylindrical shape, although any other shape may be used.

In some forms, the inner housing 7420 may be disposed proximate to the front face 7402. For example, the inner housing 7420 may be adjacent to a rear side of the front face 7402. In other forms, the inner housing 7420 may be spaced apart from the front face 7402.

As shown in FIG. 11, the inner housing 7420 may include a second body opening 7424. In the illustrated example, the second body opening 7424 may extend a similar angular distance as the first body opening 7418. However, the area and/or the perimeter of the second body opening 7424 may be different than the area and/or perimeter of the first body opening 7418, although they may be substantially the same. In the illustrated example, the second body opening 7424 is smaller than the first body opening 7418, although this may be reversed.

As shown in FIG. 13, the inner housing 7420 may be at least partially hollow and may include open space. The second body opening 7424 may provide fluid communication with the hollow interior of the inner housing 7420.

With continued reference to FIG. 13, the first body opening 7418 and the second body opening 7424 may be oriented in substantially perpendicular directions. For example, the first body opening 7418 may be oriented about a substantially vertical axis (e.g., when aligned as shown in FIG. 11), and the second body opening 7424 may be oriented about a substantially horizontal axis (e.g., when aligned as shown in FIG. 11).

In some forms, the nasal vent 7224 may be disposed on the front face 7402 and aligned with the inner housing 7420. In other words, the nasal vent 7224 may provide fluid communication with into and/or out of the inner housing 7420. Thus, airflow may be able to travel from one side of the front face 7402 to the other by entering the second body opening 7424, passing through the inner housing 7420, and exiting through the nasal vent 7224. Airflow may flow in the opposite direction in some examples.

Returning to FIG. 11, the inner housing 7420 may include a superior opening 7428. The superior opening 7428 may be oriented along a substantially parallel axis to the first body opening 7418, and along a substantially perpendicular axis to the second body opening 7424.

As shown in FIG. 12, the adjustment structure 7408 may include a central portion 7432 configured to fit within the inner housing 7420. For example, the central portion 7432 may be slightly smaller than the superior opening 7428 in order to fit within the superior opening 7428. The superior opening 7428 and the central portion 7432 may both be round (e.g., circular) in shape, which may help the adjustment structure 7408 move (e.g., rotate) relative to the inner housing 7420. In other examples (not shown), the inner housing 7420 may be connected to the adjustment structure 7408 without the superior opening 7428.

As shown in FIG. 13, the central portion 7432 may be at least partially hollow. For example, the space within the central portion 7432 may be open so that there is still an open space within the inner housing 7420 even when the central portion 7432 is connected.

With continued reference to FIG. 13, the central portion 7432 may not include a wall with a complete perimeter. In other words, the central portion 7432 may include at least one opening. In the illustrated example, the central portion 7432 includes an inlet opening 7434 and an outlet opening 7436. The central portion 7432 may include a first wall 7438 and a second wall 7440. The first wall 7438 may be spaced apart from the second wall 7440 in order to form the openings. In some forms, the first wall 7438 and the second wall 7440 may be different sizes (e.g., the first wall is smaller than the second wall 7440), although this may not be the case.

In some forms, the first wall 7438 may be approximately the same size as the second body opening 7424. This may mean that the first wall 7438 extends the exact same angular distance as the second body opening 7424. Alternatively, the first wall 7438 may extend a slightly greater or slightly less angular distance as compared to the second body opening 7424.

In some forms, the inlet opening 7434 may be approximately the same size as the second body opening 7424. In the illustrated example, the inlet opening 7434 may be slightly larger than the second body opening 7424 (e.g., it may extend a slightly greater angular distance than the second body opening 7424). In other examples, the inlet opening 7434 may extend the same angular distance or a slightly smaller angular distance than the second body opening 7424.

As shown in FIGS. 14 and 15, the adjustment structure 7408 may include an adjustment opening 7444. In some forms, the adjustment opening 7444 may be approximately the same size as the first body opening 7418. In the illustrated example, the adjustment opening 7444 may be slightly larger than the first body opening 7418 (e.g., it may extend a slightly greater angular distance than the first body opening 7418). In other examples, the adjustment opening 7444 may extend the same angular distance or a slightly smaller angular distance than the first body opening 7418.

5.3.10.3.2 Adjustment

As described above, the adjustment structure 7408 may be movable relative to the front face 7402 of the valve assembly 7400. The illustrated example shows that the adjustment structure 7408 is rotatable between a first or open position and a second or closed position.

The open position is illustrated in FIGS. 11 to 13. In this position, the adjustment structure 7408 is rotated (e.g., via the interfacing structure 7412) toward the maximum portion of the indicator 7404 (e.g., the left-hand side of FIG. 10).

In certain forms, the cut out of the interfacing structure 7412 may assist the patient in orienting the adjustment structure 7408 in order to determine its angular position relative to the maximum portion of the indicator 7404. For example, the interfacing structure 7412 may contact the front face 7402 and limit further movement in either the open position or the closed position.

The adjustment structure 7408 rotates about a central axis of the central portion 7432 as it moves between the open position and the closed position. The inlet opening 7434 and the adjustment opening 7444 are movable together as the adjustment structure 7408 rotates.

As shown in FIG. 11, the first wall 7438 at least partially blocks or obstructs the second body opening 7424 in the open position. In the illustrated example, the first wall 7438 may not completely block the second body opening 7424 so that fluid communication is still possible through the second body opening 7424. However, other examples of the first wall 7438 may be designed so that it completely blocks the second body opening 7424 in the open position in order to block fluid flow through the second body opening 7424.

In addition to the size of the first wall 7438, the position of the first wall 7438 relative to the second body opening 7424 may also be dependent on the size of the inlet opening 7434. For example, in the illustrated example, the inlet opening 7434 may be larger than the second body opening 7424. This may allow the adjustment structure 7408 to rotate between the open and closed positions without completely obstructing the second body opening 7424 because the larger inlet opening 7434 is always at least partially aligned.

In certain forms, the first wall 7438 may obstruct at least about 25% of the second body opening 7424 in the open position. In certain forms, the first wall 7438 may obstruct at least about 50% of the second body opening 7424 in the open position. In certain forms, the first wall 7438 may obstruct at least about 75% of the second body opening 7424 in the open position. In certain forms, the first wall 7438 may obstruct at least about 90% of the second body opening 7424 in the open position. In certain forms, the first wall 7438 may obstruct less than 99% of the second body opening 7424 in the open position.

As shown in FIG. 13, the adjustment opening 7444 of the adjustment structure 7408 may be substantially aligned with the first body opening 7418. For example, substantially no portion of the body of the adjustment structure 7408 may be directly in line with the first body opening 7418. This may allow airflow to pass through the first body opening 7418 with substantially no obstructions.

In some forms, the adjustment opening 7444 may be larger than the first body opening 7418 so that the edges of the adjustment opening 7444 extend beyond the edges of the first body opening 7418. In this way, the body of the adjustment structure 7408 (e.g., area outside of the adjustment opening 7444) may not obstruct the first body opening 7418.

In certain forms, the body of the adjustment structure 7408 may obstruct no more than 90% of the first body opening 7418 in the open position. In certain forms, the body of the adjustment structure 7408 may obstruct no more than 75% of the first body opening 7418 in the open position. In certain forms, the body of the adjustment structure 7408 may obstruct no more than 50% of the first body opening 7418 in the open position. In certain forms, the body of the adjustment structure 7408 may obstruct no more than 25% of the first body opening 7418 in the open position. In certain forms, the body of the adjustment structure 7408 may obstruct no more than 5% of the first body opening 7418 in the open position.

As shown in FIG. 13, the open position allows for relatively unobstructed fluid communication through the first body opening 7418, while at least partially blocking fluid communication through the second body opening 7424. This allows fluid flow to pass through the partition 7416 but limits the flow of fluid from entering the inner housing 7420, which may also limit fluid flow from passing through the nasal vent 7224.

As shown in FIGS. 14 to 16, the adjustment structure 7408 may be rotated in the opposite direction (e.g., counter clockwise as illustrated in FIGS. 15 and 16) to move from the open position to the closed position. The patient may move the adjustment structure 7408 (e.g., using his finger to engage the interfacing structure 7412 as described above) toward the minimum end of the indicator 7404.

As shown in FIGS. 14 and 16, the second body opening 7424 may be substantially unobstructed in the closed position. For example, as illustrated in FIG. 16, the counter clockwise movement of the adjustment structure 7408 may also cause the first wall 7438 to move in the counter clockwise direction.

The movement of the adjustment structure 7408 may move the first wall 7438 out of alignment (or partial alignment) with the second body opening 7424. Additionally, the second wall 7440 may be spaced apart from the first wall 7438 to create a sufficiently large inlet opening 7434 so that the second wall 7440 does not block or substantially obstruct the second body opening 7424.

In this position, the inlet opening 7434 may be aligned with the second body opening 7424. For example, the second body opening 7424 and the inlet opening 7434 may appear as a single opening (see e.g., FIG. 14). This may allow airflow to easily enter the inner housing 7420. As illustrated in FIG. 16, the outlet opening 7436 may be similarly unobstructed by the by the inner housing 7420. For example, FIG. 16 illustrates that the first wall 7438 may be partially aligned with the nasal vent 7224 so that the outlet opening 7436 is not completely aligned with the nasal vent 7224 (e.g., and is partially aligned with a side of the inner housing 7420). However, there may not be significant obstructions that impede airflow from exiting (or entering) the inner housing 7420 through the nasal vent 7224.

As shown in FIGS. 15 and 16, movement to the closed position may also change the relationship between the adjustment structure 7408 and the first body opening 7418.

For example, the movement of the adjustment structure 7408 to the closed positon may move the adjustment opening 7444 out of alignment with the first body opening 7418. As shown in FIG. 15, the position of the adjustment structure 7408 may move the adjustment opening 7444 at least partially under the partition 7416 so that the surface of the adjustment structure 7408 partially blocks airflow through the first body opening 7418.

In some forms, the adjustment structure 7408 may pivot so that the entire adjustment opening 7444 is beneath the partition 7416 and the first body opening 7418 is entirely aligned with the surface of the adjustment structure 7408. In this configuration, airflow may be entirely blocked from traveling from one side of the partition 7416 to the other within the area of the partition 7416.

In some forms, the adjustment structure 7408 may pivot so that only a portion of the adjustment opening 7444 is beneath the partition 7416 and the first body opening 7418 may remain at least partially aligned with a portion of the adjustment opening 7444. In this configuration, airflow may be able to travel from one side of the partition 7416 to the other within the area of the partition 7416 because at least a portion of the adjustment opening 7444 and the first body opening 7418 are aligned.

As shown in FIGS. 17 to 21, an alternate version of the of a valve assembly 8400 is illustrated. The valve assembly 8400 is similar to the valve assembly 7400 described in FIGS. 11 to 16. Only some similarities and differences are described below.

As shown in FIGS. 17 and 18, the valve assembly 8400 is illustrated with the adjustment structure 8408 in the open position. In this position, the first body opening 8418 is completely open (e.g., the adjustment structure 8408 is not blocking any portion of the first body opening 8418). Additionally, the first wall 8438 of the central portion 8432 may be completely blocking the second body opening 8424 on the inner housing 8420 in order to limit airflow flowing toward the nasal vent 8224. As described above, the open position allowed airflow to freely flow through the first body opening 8418 from the nasal plenum chamber 7202 to the oral plenum chamber 7204. The pressurized air may vent to ambient through the oral vent 7228.

As shown in FIG. 19, the adjustment structure 8408 may move (e.g., rotate) from the open position toward the closed position. In the illustrated example, the adjustment structure 8408 may rotate in the clockwise direction (e.g., as seen in FIG. 19) when moving from the open position to the closed position, although the adjustment structure may rotate in the opposite direction in other examples.

The adjustment structure 8408 may be more circular than the adjustment structure 7408. For example, the adjustment structure 8408 may not include the cut out for an interface structure (e.g., like interface structure 7412). Instead, an interface structure 8412 may project from the surface of the adjustment structure 8408.

In the illustrated example, the interface structure 8412 may be a generally cylindrical shape extending from a superior surface of the adjustment structure 8408. In other forms, other shapes may be used. The interface structure 8412 may be shaped in order to allow a patient to engage the cylindrical surface and move the adjustment structure 8408. In some forms, the interface structure 8412 may act as a stop in order to limit movement of the adjustment structure 8408. For example, the interface structure 8412 may contact the front face 8402 to limit further movement in one rotational direction.

As the adjustment structure 8408 moves toward the closed position, the adjustment opening 8444 moves out of alignment with the first body opening 8418. As this occurs, pressurized air is partially blocked from traveling through the first body opening 8418 between the nasal plenum chamber 7202 and the oral plenum chamber 7204.

In some forms, the first wall 8438 of the central portion 8432 may move out of alignment with the second body opening 8424 to allow airflow to flow toward the nasal vent 8224. In this position, the second body opening 8424 is at least one-quarter open (e.g., at least one-quarter the total area of the second body opening 8424 is not covered by the first wall 8438). For example, the second body opening 8424 may be at least one-half open.

As illustrated in FIG. 19, the adjustment structure 8408 may be rotated about 1° to about 50°. The adjustment structure 8408 may be rotated about 5° to about 30°. The adjustment structure 8408 may be rotated about 10° to about 20°. The adjustment structure 8408 may be rotated about 15°. In this position, the first body opening 8418 is at least half open (e.g., at least half the total area of the first body opening 8418 is not covered by the adjustment structure 8408).

As shown in FIG. 20, the adjustment structure 8408 may move (e.g., rotate) further from the open position toward the closed position. In the illustrated example, the adjustment structure 8408 may continue to rotate in the clockwise direction (e.g., as seen in FIG. 20) when moving from the open position to the closed position.

As the adjustment structure 8408 continues to move toward the closed position, the adjustment opening 8444 moves further out of alignment with the first body opening 8418. As this occurs, pressurized air is further blocked from traveling through the first body opening 8418 between the nasal plenum chamber 7202 and the oral plenum chamber 7204.

In some forms, the first wall 8438 of the central portion 8432 may continue to move and be at least partially unaligned (e.g., not completely obstructing) with the second body opening 8424 to allow airflow to flow toward the nasal vent 8224. In this position, the second body opening 8424 is at least one-half open (e.g., at least one-half the total area of the second body opening 8424 is not covered by the first wall 8438). For example, the second body opening 8424 may be fully open.

As illustrated in FIG. 20, the adjustment structure 8408 may be rotated about 1° to about 75°. The adjustment structure 8408 may be rotated about 10° to about 60°. The adjustment structure 8408 may be rotated about 20° to about 40°. The adjustment structure 8408 may be rotated about 30°. In this position, the first body opening 8418 is less than half open (e.g., more than half the total area of the first body opening 8418 is covered by the adjustment structure 8408).

As shown in FIG. 2I, the adjustment structure 8408 may move (e.g., rotate) into the closed position. In the illustrated example, the adjustment structure 8408 may continue to rotate in the clockwise direction (e.g., as seen in FIG. 2I) when moving from the open position to the closed position.

In the illustrated example, the interface structure 8412 may contact the front face 8402 when the adjustment structure 8408 reaches the closed position. Contact between the interface structure 8412 and the front face 8402 may limit any additional movement in the given rotational direction (e.g., the clockwise direction).

In some forms, the adjustment structure 8408 may not completely block the first body opening 8418 in the closed position. For example, the illustrated adjustment opening 8444 remains partially aligned with the first body opening 8418. The interface structure 8412 serves as a stop in order to limit additional movement (e.g., rotation) of the adjustment structure 8408 to a position where the adjustment structure 8408 would completely cover the first body opening 8418. The second body opening 8424 may remain fully open, or may move into a fully open position (depending on the previous position of the adjustment structure 8408).

As illustrated in FIG. 2I, the adjustment structure 8408 may be rotated about 1° to about 90°. The adjustment structure 8408 may be rotated about 10° to about 75°. The adjustment structure 8408 may be rotated about 30° to about 60°. The adjustment structure 8408 may be rotated about 50°. In this position, the first body opening 8418 is about one-quarter open (e.g., more than three-quarters of the total area of the first body opening 8418 is covered by the adjustment structure 8408).

In some forms, a patient may be able to make an infinite number of adjustments when moving the adjustment structure 8408 between the open and closed positions (i.e., FIGS. 17 to 21). In other words, the patient is not required to stop the adjustment structure 8408 at the intermediate positions illustrated in FIGS. 19 and 20. Those figures instead illustrate possible intermediate positions. The patient may move the adjustment structure 8408 to a different intermediate position than illustrated based on patient preference or need (e.g., in order to allow a greater or lesser amount of pressurized air to flow through the first body opening 8418).

As shown in FIG. 22, a further alternate version of a valve assembly 9400 is illustrated. The valve assembly 9400 is similar to the valve assembly 7400 described in FIGS. 11 to 16, and to the valve assembly 8400 described in FIGS. 17 to 21. Only some similarities and differences are described below.

As shown in FIG. 22, the adjustment structure 9408 may be in the closed position. Unlike the examples illustrated in FIGS. 11 to 16 and in FIGS. 17 to 21, the adjustment structure 9408 may completely fill the first body opening 9418 in order to substantially block airflow between the nasal plenum chamber 7202 and the oral plenum chamber 7204.

In the illustrated example, the adjustment structure 9408 may move (e.g., rotate) so that the first body opening 9418 is completely covered by the adjustment structure 9408. This may be achieved by changing the position of the interface structure 9412 and/or the size of the adjustment opening (not shown). For example, the interface structure 9412 may allow additional movement (e.g., rotation) before contacting the front face 9402 in order to allow more of the adjustment structure 9408 to cover the first body opening 9418. Alternatively, or in addition, the adjustment opening (e.g., similar to adjustment openings 7444, 8444) may be smaller (e.g., extend a smaller angular distance) so that there are fewer angular positions where the first body opening 9418 is at least partially aligned with the adjustment opening. In this position, the second body opening 9424 of the inner housing 9420 may be unobstructed by the central portion 9432.

In some forms, the partition 9416 may include at least one hole 9490. For example, the illustrated partition 9416 includes a plurality of holes 9490 that are spaced around the surface of the partition 9416. The holes may continue to provide fluid communication between the oral plenum chamber and the nasal plenum chamber when the adjustment structure 9408 is in the closed position (e.g., similar to how communication between the nasal and oral plenum chambers is permitted in FIG. 16 when the adjustment structure 7408 does not completely block the first body opening 7418). The number and/or diameter of the holes 9490 may be selected in order to achieve a desired volumetric flow between the nasal and oral plenum chambers.

In other forms (not shown), the partition 9416 may not include any holes. The closed position of the adjustment structure 9408 may therefore completely block fluid flow between the nasal and oral plenum chambers 7202, 7204, which may keep the oral plenum chamber 7204 at or substantially near the ambient pressure. However, other examples may provide a permeable or semi-permeable partition 9416 that may allow for a predetermined or controlled flow between the nasal and oral plenum chambers 7202, 7204. This would allow the oral plenum chamber 7204 to receive at least some pressurized air when the adjustment structure 9408 is in the closed position.

5.3.10.3.3 Manual Operation

As shown in FIG. 8 and described above, the valve assembly 7400 is ordinarily coupled to the shell 7208 and seals the associated opening of the shell 7208 in order to limit airflow from escaping to ambient while the patient interface 7000 is in use.

As shown in FIG. 9, the patient interface 7000 may include a membrane 7236 that may at least partially separate the nasal plenum chamber 7202 from the oral plenum chamber 7204. The membrane 7236 may be constructed from a flexible, impermeable material (e.g., a silicone material like the plenum chamber 7200 and/or the seal-forming structure 7100). Alternatively, the membrane 7236 may be constructed from a textile material (e.g., a textile material woven to be at least partially impermeable, the textile material coated with an impermeable material, etc.) or any other type of flexible material. In still further examples, the membrane 7236 may be constructed from a rigid or semi-rigid material, which may assist in maintaining the shape of the patient interface 7000 (e.g., may limit bending in order to maintain a better seal).

In some forms, the membrane 7236 may be a substantially impermeable material so that fluid flow is not permitted through the membrane 7236. This may assist in isolating the nasal plenum chamber 7202 from the oral plenum chamber 7204.

In other forms, the membrane 7236 may be at least partially permeable and may allow at least some airflow to pass between the nasal and oral plenum chambers 7202, 7204. For example, the membrane 7236 may be structured to allow a per-determined flow rate of air to pass between the nasal and oral plenum chambers 7202, 7204. The membrane 7236 may include a microscopic structure that permits the flow of air between the plenum chambers 7202, 7204.

In still other forms, the membrane 7236 may include holes (not shown) that allow airflow to pass between the nasal plenum chamber 7202 and the oral plenum chamber 7204. The holes may be uniform in size, or the holes may vary in size across the membrane 7236. The holes may be sized in order to achieve a desired rate of flow between the nasal plenum chamber 7202 and the oral plenum chamber 7204.

In that form, the adjustment opening 7444 may be larger than the holes (or at least some of the holes) so that the open position still results in a greater airflow to the oral plenum chamber 7204 than in the closed position.

With continued reference to FIG. 9, the membrane 7236 may include a space 7240 where the membrane 7236 does not extend completely between the seal-forming structure 7100 and the plenum chamber 7200. For example, the membrane 7236 may not extend entirely between the nasal plenum chamber 7202 and the nasal seal-forming structure 7102 (or alternatively the oral seal-forming structure 7104).

As shown in FIG. 9, the partition 7416 may substantially fill the space 7240 when the valve assembly 7400 is connected to the plenum chamber 7200. For example, as described above, the partition 7416 may extend into the plenum chamber 7200 (e.g., the nasal plenum chamber 7202). The length of the partition 7416 (e.g., measured from the front face 7402) may be sufficient to contact the membrane 7236.

In some forms, the partition 7416 and the membrane 7236 may engage in a sealing arrangement in order to seal the interface between the nasal and oral plenum chambers 7202, 7204. For example, the membrane 7236 may include a groove (not shown) and the partition 7416 may fit within the groove (e.g., with a friction fit or a snap fit). This may create a sealing interface against the partition 7416 to limit airflow from passing through. Alternatively, the position of the groove may be reversed (e.g., on the partition 7416) in order to achieve the same result.

Once the partition 7416 engages the membrane 7236, the nasal and oral plenum chambers 7202, 7204 may be at least partially isolated from one another. As described above, the surface of the partition 7416 is solid (although an alternate partition 9416 illustrated in FIG. 22 may include holes 9490 to allow fluid flow). Once connected to the membrane 7236, airflow may be substantially limited from flowing between the plenum chambers 7202, 7204.

As described above, many patients breathe through their mouth despite the physiological benefits to breathing through their noses. Additionally, clinicians in hospitals or other medical facilities may not be readily aware if a patient breathes through his nose or mouth. Therefore, it may be beneficial to prescribe, at least initially, a patient interface that seals around both the patient's nares and mouth in order to limit leak and increase the effectiveness of the therapy. However, some patients may find a mask that seals around only their nares to be more comfortable. Therefore, it may be beneficial to train a mouth-breathing patient to breathe through his nose in order to allow for the transition to the nasal-only mask.

In some forms, a patient may begin using the patient interface 7000 in the open position. As described above with respect to FIGS. 11-13, the adjustment structure 7408 is positioned so that the first body opening 7418 is substantially aligned with the adjustment opening 7444 in order to provide a flow path and fluidly connect the nasal and oral plenum chambers 7202, 7204.

As shown in FIG. 23, the open position of the adjustment structure 7408 allows for airflow between the nasal and oral plenum chambers 7202, 7204. A total airflow 7450 may be conveyed (e.g., via conduits) into the nasal plenum chamber 7202. The patient may inhale this air into his airways through his nares. The airflow may also travel to the oral plenum chamber 7204 (e.g., without first being inhaled) by passing through the first body opening 7418 and the adjustment opening 7444.

When a patient first begins wearing the patient interface 7000, the adjustment structure 7408 may be rotated to its maximum position. In other words, the adjustment structure 7408 may be completely rotated to the maximum end of the indicator 7404 (e.g., clockwise in FIG. 13).

In this position, substantially no portion of the surface of the partition 7416 is aligned with the first body opening 7418. This means that airflow can pass between the nasal and oral plenum chambers 7202, 7204 through substantially the entire area of the first body opening 7418. As shown in FIG. 23, a portion of the airflow entering the nasal plenum chamber 7202 flows into the oral plenum chamber 7204. The exact percentage of the total airflow entering the oral plenum chamber 7204 may vary based on the amount that the patient is breathing through his mouth (e.g., more nasal inhalation may result in less airflow into the oral plenum chamber 7204).

Mouth-breathing patients may then inhale the pressurized air in the oral plenum chamber 7204. Inhaling more through the patient's mouth may drive more airflow from the nasal plenum chamber 7202 to the oral plenum chamber 7204. When first starting out, a mouth-breathing patient may inhale all the air 7452 through their mouth (e.g., because they are not adjusted to breathing through their nose).

After inhaling (though the nose and/or through the mouth), the patient exhales (through the nose and/or through the mouth) back into the plenum chamber 7200. A patient may particularly exhale through his mouth, especially when inhaling through his mouth. Therefore, the exhaust air, with the $CO_2$, may be exhaled into the oral plenum chamber 7204. Air, like exhaust $CO_2$, may be vented from the plenum chamber 7200 through the oral vent 7228 because exhalation is occurring in the oral plenum chamber 7204. The nasal vent 7224 may not need to exhaust as much air as the oral vent 7228 because less exhalation occurs in the nasal plenum chamber 7202 in this position. Therefore, the nasal vent 7224 may be closed by the adjustment structure 7408 in the open position (e.g., the first wall 7438 may at least partially obstruct the second body opening 7424) in order to limit gas (e.g., pressurized breathable gas from the initial airflow 7450 from exiting the patient interface 7000 prior to being inhaled. Therefore, a nasal exhaust flow 7454 may be substantially low (or zero) when the adjustment structure 7408 is in the open position. Because the nasal vent 7224 is substantially blocked, the oral exhaust flow 7456 may be greater in order to allow exhaust gas to flow out of the plenum chamber 7200 and limit rebreathing of exhaled air.

As shown in FIG. 13, some forms of the patient interface 7000 may only partially block airflow from reaching the nasal vent 7224 when the adjustment structure 7408 is in the open position (e.g., the maximum position). This may allow air exhaled through the patient's nares to be more easily exhausted (e.g., because the vent is closer). Additionally or alternatively, excess pressurized air may be able to vent through the nasal vent 7224 in the event that the RPT device 4000 provides excess pressure to the plenum chamber 7200.

As shown in FIGS. 17 and 18, some forms of the patient interface 7000 may fully block the airflow from reaching the nasal vent 7224 when the adjustment structure 8408 is in the open position (e.g., the maximum position). Fully blocking airflow from reaching the nasal vent 7224 may limit pressurized air from unnecessarily venting to ambient (e.g., through the nasal vent 7224) without first being inhaled. This may assist in improving efficiency of the patient interface 7000 and RPT device 4000.

With continued use, the patient may become accustom to wearing the patient interface 7000. As the patient becomes more familiar with the therapy, the adjustment structure 7408 may be moved toward the closed position. Although the adjustment structure 7408 may be moved directly to the closed position (e.g., so that the adjustment structure 7408 has only two positions), the adjustment structure 7408 may be moved to at least one intermediate position between the open position and the closed position. For example, the patient may pivot the adjustment structure 7408 toward the minimum position on the indicator 7404 without completely reaching the minimum position. In some forms, there may be discrete points between the maximum and minimum points of the indicator 7404 for retaining the adjustment structure 7408 (e.g., the adjustment structure 7408 may be movable to a finite number of locations). In some forms, the adjustment structure 7408 may be movable to an infinite number of locations between the maximum and minimum points of the indicator 7404. The adjustment structure 7408 may be retained in the selected position by a fastener and/or by friction between the adjustment structure 7408 and the inner housing 7420 and/or the front face 7402.

After a period of time on the open position (e.g., one session, two sessions, etc.), the patient may move the adjustment structure 7408 toward the closed position. This may cause the partition 7416 to obstruct at least a portion of the first body opening 7418, while causing the first wall 7438 to obstruct less of the second body opening 7424.

As a result of the new position, less air may travel between the nasal plenum chamber 7202 and the oral plenum chamber 7204 (e.g., as a result of the smaller opening between the two plenum chambers 7202, 7204). In other words, more of the total airflow 7450 entering the nasal plenum chamber 7202 remains in the nasal plenum chamber 7202 as opposed to traveling to the oral plenum chamber 7204. Retaining more of the total airflow 7450 in the nasal plenum chamber 7202 may encourage the patient to inhale through his nose instead of through his mouth. As a result, the patient may exhale more through his nose and/or more gas may need to be exhausted from the nasal plenum chamber 7202 (e.g., to prevent the nasal plenum chamber 7202 from becoming over-pressurized). As described above, moving the adjustment structure 7408 toward the closed position moves the first wall 7438 toward a position out of alignment with the second body opening 7424 so that a greater amount of nasal exhaust flow 7454 may exit through the nasal vent 7224. In this configuration, the patient may continue to exhale through his mouth and/or pressurized air may continue to flow to the oral plenum chamber 7204, so the oral exhaust flow 7456 may continue to vent through the oral vent 7228.

In some forms, the nasal exhaust flow 7454 and the oral exhaust flow 7456 may be inverse from one another. For example, as the nasal exhaust flow 7454 increases (i.e., in the closed position), the oral exhaust flow decreases 7456. In certain forms, the change in one flow may be proportional to the change in the other flow.

As the patient becomes more accustomed to the new position of the adjustment structure 7408, the patient may make further adjustments by moving the adjustment structure 7408. For example, if the patient is successfully receiving the therapy in the new position, the adjustment structure 7408 may be further pivoted toward the closed position. Conversely, if the patient does not successfully receive the therapy at the new position, the patient may pivot the adjustment structure 7408 back toward the open position in order to receive more pressurized air in the oral plenum chamber 7204.

After a number of sessions where the patient is able to adjust to inhaling through his nose, the patient may rotate the adjustment structure 7408 fully to the closed position. As shown in FIG. 24, fully rotating the adjustment structure 7408 to the closed position may substantially (or entirely) block airflow between the nasal plenum chamber 7202 and the oral plenum chamber 7204. Thus, the inhaled air 7452 may be mostly or entirely within the nasal plenum chamber 7202 through the nares. Only a small amount of air (if any) may flow into the oral plenum chamber 7204, which may not be enough to allow for inhalation. As described above, this small amount of air may still be above a minimum therapeutic pressure so that the AAV 7232 is in the closed position.

By not completely blocking flow between the nasal and oral plenum chambers 7202, 7204 with the adjustment structure 7408, a pressure difference may be created between the nasal and oral plenum chambers 7202, 7204. This pressure difference may promote nasal breathing, even while pressurized air is still being delivered to the oral plenum chamber 7204. The pressurized air that does reach the oral plenum chamber 7204 may assist with $CO_2$ washout.

If the patient reverts to mouth breathing, the patient may be able to inhale ambient air through the AAV 7232. For example, the AAV 7232 may be in the closed position during use (e.g., when pressurized air is present in the oral plenum chamber 7204) but may move toward an open position if the patient inhales through his mouth. In other words, the negative pressure from the patient inhaling through their mouth may exceed the positive pressure of the airflow so that the AAV 7232 may move toward the open position. In this way, the patient may continue to breathe in the event that the adjustment structure 7408 was rotated too far (e.g., the patient was not able to tolerate the selected position). This may particularly occur when the pressure in the oral plenum chamber 7204 is low (e.g., at or below the minimum therapeutic pressure).

Figure 21:
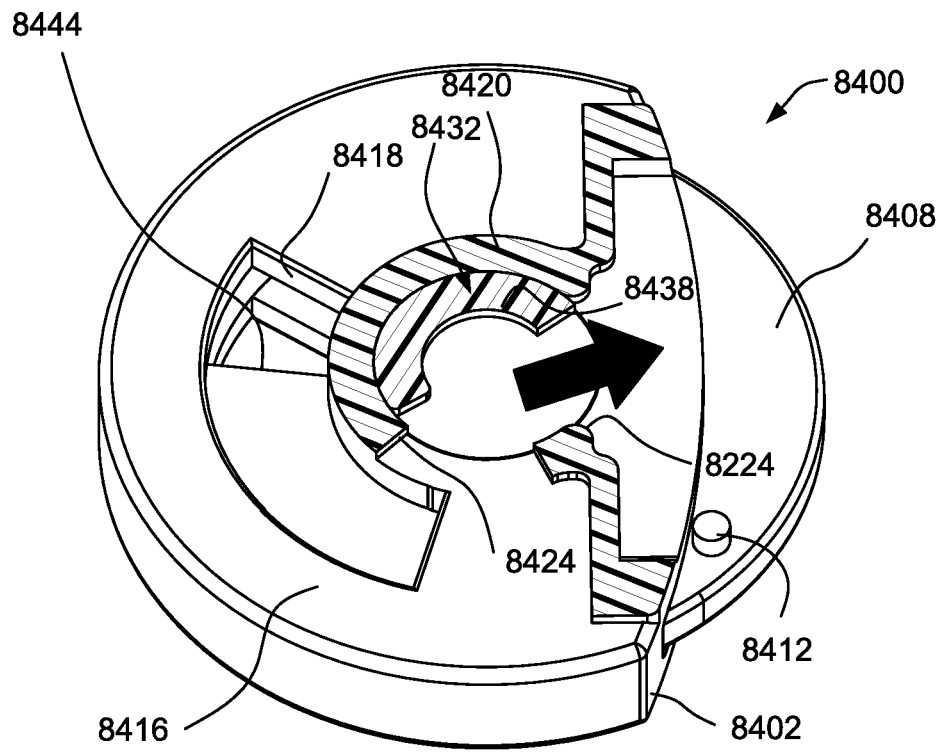

As illustrated in FIGS. 16 and 21, moving the adjustment mechanism 7408, 8408 to the fully closed position does not completely block the respective first body opening 7418, 8418. The minimum position of the adjustment mechanism 7408, 8408 may be controlled (e.g., by contact between the interface structure 8412 and the front face 8402) so that a desired flow rate may be achieved.

As illustrated in FIG. 22, the adjustment mechanism 9408 may alternatively completely block the first body opening 9418. The holes 9490 may allow the desired flow rate between the nasal and oral plenum chambers 7202, 7204. The number and/or size of the holes 9490 may influence the achieved flow rate.

In any position of the adjustment structure 7408, the total flow 7450 into the nasal plenum chamber 7202 may equal the inhaled air 7452 (through the nose and/or the mouth), the nasal exhaust air 7454, and the oral exhaust air 7456. As described above, the nasal and oral exhaust air 7454, 7456 may be inversely related to one another.

As shown in FIG. 25, the pressure within each plenum chamber 7202, 7204 may change depending on the position of the adjustment structure 7408. For example, in the open position, the first pressure 7460 within the nasal plenum chamber 7202 and second pressure 7462 within the oral plenum chamber 7204 may be substantially equal because the first body opening 7418 and the adjustment opening 7444 permit fluid flow between the plenum chambers 7202, 7204. As the adjustment structure 7408 moves toward the closed position, the second pressure 7462 may drop as less pressurized air reaches the oral plenum chamber 7204.

In some forms, utilizing different pressures 7460, 7462 within the plenum chamber 7200 may assist in more efficiently operating the patient interface 7000. For example, as the adjustment structure 7408 moves toward the closed position (or is completely in the closed position), less airflow reaches the oral plenum chamber 7204, and the second pressure 7462 may be less than the first pressure 7460. Moving toward the closed position also reduces the total volume needed to be pressurized. In other words, the pressure within the nasal plenum chamber 7202 may remain substantially constant regardless of whether the adjustment structure 7408 is in the opened or closed positions. With a lower volume needed to be pressurized in the closed position, the RPT device 4000 may provide a lower volumetric flow of air in order to achieve the desired pressure within the usable portion of the plenum chamber 7200 (e.g., just the nasal plenum chamber 7202 in the closed position). This may allow the system to draw less power and/or operate the RPT device 4000 at a lower level, which may save electrical energy and/or produce less noise.

Although the previous description is in specific reference to the valve assembly 7400, the description is equally applicable to the valve assemblies 8400, 9400.

5.3.10.3.4 Electronic Operation

In some forms, the adjustment structure 7408 may be electronically operated. The electronic operation may be in addition to or instead of the manual operation described above. Although the following description is in specific reference to the valve assembly 7400, the description is equally applicable to the valve assemblies 8400, 9400.

Operating the adjustment structure 7408 using electronics may achieve all of the benefits described above with respect to the manual adjustment. In other words, the electronic operation described below is simply a different way to actuate the adjustment structure 7408, but the result of the actuation (i.e., positioning the adjustment structure 7408 in the opened or closed position) may be substantially the same.

In some forms, the adjustment structure 7408 may be remotely operated. For example, a device 7464 (e.g., a computer, a smart phone, etc.) may include a controller that communicates (e.g., via a wired connection, Bluetooth, Wi-Fi, RFID, etc.) with a motor in the patient interface 7000 in order to adjust the position of the adjustment structure 7408.

In certain forms, a sensor may be located on the patient interface 7000 and may measure different patient characteristics related to breathing (e.g., frequency of nasal inhalation to oral inhalation). After each therapy session, the sensor may communicate the sensed characteristics with the controller. Based on the measured values, the controller may adjust the position of the adjustment structure 7408 for the next therapy session. For example, the adjustment structure 7408 is in the open position (or not completely closed position) and the patient meets an upper threshold for nasal breathing, the controller may move the adjustment structure 7408 to a further closed position on the next session. Conversely, if the patient fails to meet a lower threshold for nasal breathing (i.e., indicating that the patient was relying too heavily on oral breathing), the controller may move the adjustment structure 7408 further toward the open position on the next session.

In certain forms, the controller and the sensor may communicate during the therapy session in order to make adjustments during a particular session. For example, the controller may move the adjustment structure 7408 as necessary between the open and closed positions throughout a therapy session as the patient's breathing patterns change. This may be useful in reducing inefficiencies during a particular cycle. For example, if the patient is breathing mostly through their nose, excess air does not need to travel to the oral plenum chamber 7204. This may assist in reducing energy usage by only supplying the requisite airflow. Conversely, a patient constantly relying on the AAV 7232 to breathe may not be adequately receiving therapy. Therefore, moving the adjustment structure 7408 toward the open position may allow the patient to still inhale pressurized air and still gain benefits of the therapy session.

In certain forms, the in-session electronic adjustment may be used with either manual or electronic movement of the adjustment structure 7408. For example, the patient may pre-set the adjustment structure 7408 to a desired position prior to beginning the therapy session. The desired position may be based on patient preference and/or clinician recommendation. Then, during the therapy session, the controller may automatically move the position of the adjustment structure 7408. Alternatively, the controller may set the adjustment structure 7408 in a certain position prior to beginning the therapy session based on previously sensed values. Then, the controller can make additional adjustments during the therapy session.

In one form, maintaining communication between the nasal and oral plenum chambers 7202, 7204 may allow pressurized air to enter the oral plenum chamber 7204 even while the patient is breathing through their mouth. If a patient reverts back to mouth breathing, the patient may be able to inhale pressurized air before or during the electronic adjustment of the adjustment structure 7408. This may allow the patient to continue to receive pressurized air substantially uninterrupted during the transition period of the adjustment structure 7408.

As illustrated in FIG. 26, the device 7464 (e.g., via a controller) may be in two-way communication with the valve assembly 7400 (e.g., via a motor). The device 7464 may send signals to the valve assembly 7400 in order to adjust the position of the adjustment structure 7408, while the valve assembly 7400 (e.g., via a sensor) may communicate with the device 7464 in order to recommend a new position of the adjustment structure 7408.

This communication between the device 7464 and the valve assembly 7400 may occur independently, or it may occur with human assistance. For example, the patient 1000

(or a clinician) may input commands into the device 7464 to facilitate the movement of the adjustment structure 7408. For example, the device 7464 may recommend a position of the adjustment structure 7408 to the patient 1000 (or clinician) before therapy commences, or alternatively may recommend a position of adjustment structure 7408 to the clinician during the therapy. The device 7464 may only communicate back to the valve assembly 7400 only as a result of human intervention.

Alternatively, the patient 1000 may adjust the adjustment structure manually without providing an input to the device 7464. This may involve pivoting the adjustment structure 7408 in either the clockwise or counter clockwise direction based on a desired position. The patient 1000 may make the manual adjustment based on a recommendation from the device 7464 and/or based on a patient (or clinician) desired position.

In some forms, a clinician may monitor the patient during the therapy session and may input commands to the controller in order to change the position of the adjustment structure 7408. For example, the sensor may monitor patient conditions and may communicate those conditions to the clinician. The clinician may then input a command that changes the position of the adjustment structure 7408.

As shown in FIG. 27, one form of a method of controlling the position of the adjustment structure 7408 includes the first step 7466 of receiving a human input through a display on a device 7464. This may be done by actuating a button on a device 7464 or interacting directly with a screen of a device 7464. In still other examples, the input may be achieved through a voice control (e.g., the device 7464 may include a microphone). In the second step 7468, a controller in the device 7464 may receive a signal associated with the human input. In the third step 7470, the controller outputs a signal to the valve assembly 7400. In the fourth step 7472, the motor actuates as a result of the signal from the controller and moves the adjustment structure 7408 accordingly. In the fifth step 7474, the therapy begins, and pressurized air is delivered to the patient wearing the patient interface 7000. In the sixth step 7476, a sensor in the patient interface 7000 measures patient parameters (e.g., frequency of nasal inhalation to oral inhalation). In the seventh step 7478, the sensor communicates the measured values to the controller. In the eighth step 7480, the therapy session ends. In the ninth step 7482, the display outputs a positional recommendation that the patient (or clinician) can accept, decline, or adjust prior to the patient beginning the next therapy session.

Through this control setting, the patient or clinician can observe how the patient reacts to a new position of the adjustment structure 7408 (e.g., if the patient meets a required threshold for nasal breathing). Based on these observations, the patient or clinician may make adjustments prior to beginning the next therapy session.

As shown in FIG. 28, one form of a method of controlling the position of the adjustment structure 7408 includes the first step 7466 of receiving a human input through a display on a device 7464. This may be done by actuating a button on a device 7464 or interacting directly with a screen of a device 7464. In still other examples, the input may be achieved through a voice control (e.g., the device 7464 may include a microphone). In the second step 7468, a controller in the device 7464 may receive a signal associated with the human input. In the third step 7470, the controller outputs a signal to the valve assembly 7400. In the fourth step 7472, the motor actuates as a result of the signal from the controller and moves the adjustment structure 7408 accordingly. In the fifth step 7476, a sensor in the patient interface 7000 measures patient parameters (e.g., frequency of nasal inhalation to oral inhalation). In the sixth step 7478, the sensor communicates the measured value(s) to the controller. In the seventh step 7484, the sensor compares the measured value(s) to a threshold value. If the measured value is acceptable (e.g., either greater than or less than) compared to the threshold value (e.g., if the patient is breathing through their nose more than a minimum amount), then the controller will not recommend a positional change and the sensor will continue to measure patient parameters. If the measured value is unacceptable (e.g., either less than or greater than (i.e., opposite of acceptable)) compared to the threshold value (e.g., if the patient is breathing through their nose less than a minimum amount), then the controller will recommend a positional change for the adjustment structure 7408. In the eighth step 7482, the patient or clinician will receive the recommendation. The patient may accept the recommendation (or slightly modify the recommendation) in order to change the position of the adjustment structure 7408. Alternatively, the patient or clinician may decline the recommendation and the adjustment structure 7408 will remain in the current position.

In this form, the adjustments may take place during the therapy session and/or in between therapy sessions. This may allow for greater adjustments and increased efficiency of the system.

In this form, the threshold may be stored by the controller. The threshold may be pre-programmed into the controller, or the threshold may be input as a result of a clinician's recommendation.

The threshold may also vary depending on the position of the adjustment structure 7408. For example, the threshold for a measured value may be different in the open position than the threshold for the same measured value in the closed position.

In some forms, the recommendation step 7482 (and consequently the receiving human input step 7466) may be omitted. Instead, the controller may itself make the decision whether to change the position of the of the adjustment structure 7408. After comparing the measured value to the threshold of the seventh step 7484, the controller can output a signal of the third step 7470 without human intervention.

As shown in FIG. 29, the method may begin by outputting a signal of the third step 7470. This signal may be a stored signal. For example, the signal may have been entered by a patient or clinician (e.g., to set an initial valve when first beginning therapy). Alternatively, the controller may store a valve (e.g., from a previous session and/or a previous breath).

Next, the motor may actuate as a result of the signal 7472. As described above, the actuation of the motor controls the position of the adjustment structure 7408. Storing the desired position of the adjustment structure 7408 may assist in efficiency starting the next session because the controller remembers the desired and/or optimal position and the patient or clinician is not required to do so. This may be particularly useful if the patient briefly reverts to mouth breathing at the end of the session (e.g., so the adjustment structure 7408 moves toward the open position) but the patient is otherwise able to receive therapy in the closed position. Alternatively or additionally, this method may be useful when the adjustment is made on a session to session approach and the adjustment structure 7408 was previously set toward the closed position, but breathing patterns at the end of a session necessitated moving toward the open position on the next session. In either case, a patient who was asleep may not realize the changes were necessary.

Next, the sensor in the patient interface 7000 measures patient parameter(s) 7476 and communicates the measured valve(s) to the controller 7478 (e.g., via a wired or wireless connection as described above). This value is compared to a threshold of the seventh step 7484 to determine whether the measured value is acceptable or unacceptable.

In this case, if the value is acceptable when compared to the threshold, the sensor continues measuring 7476 and no changes to the position of the adjustment structure 7408 are made. If the value is unacceptable, the controller stores (e.g., in memory either in the patient interface 7000 or on a remote device) a new (e.g., updated) signal 7486 and outputs the signal of the second step 7468 so that the motor may actuate 7472 the adjustment structure 7408 to a new position.

In some forms, regardless of whether the value is acceptable or unacceptable, a patient or clinician is not prompted as to whether the position of the adjustment structure 7408 should be changed. Rather, the controller makes the decision itself.

In certain forms, there may be a manual override so that a human may have some control on the position of the adjustment structure 7408. For example, without being prompted, a patient or clinician may interact with a display in order to instruct the controller to output a signal to move the adjustment structure 7408 to the desired position. Alternatively, a patient or clinician may manually move the adjustment structure 7408 with his fingers.

In certain forms, the automated process may resume after the human intervention is complete. In other words, the patient or clinician may manually select a position for the adjustment structure 7408, and afterwards the controller may return to operating without prompting the human for input.

In some forms, at the conclusion of a therapy session, the controller may store (e.g., in memory) the final value for the motor position. Alternatively, the controller may calculate a position for the subsequent therapy session based on the totality of data collected during the previous therapy session (or therapy sessions). For example, the controller may evaluate trends that occurred during the therapy session and may store a starting value for the subsequent therapy session that may be different than the value at the end of the previous therapy session.

In some forms, the controller may be included on the patient interface 7000. Thus, the motor controlling the adjustment structure 7408 may not need to communicate (e.g., via wired or wireless connection) with an external device. This may assist in simplifying operation as a patient in their home may not need to operate a second device in order to use the therapy.

In some forms, an external device (e.g., a computer) may send an initial signal to a controller on the patient interface 7000 to begin the initial therapy. Afterwards, the controller may not require any further intervention from the external device in order to continue operating (e.g., continuing to change the position of the adjustment structure 7408 based on one or more sensed values).

In certain forms, the controller may still communicate (e.g., one-way communication) with the external device. This communication may involve recording and tabulating sensed values and/or the position of the adjustment structure 7408 (e.g., stored in memory accessible by the controller). This may allow a clinician or the patient to observe how the patient is adjusting to the therapy, and may allow the clinician monitoring the results to recommend additional steps in order to further promote natural breathing in a patient.

In certain forms, this one-way communication may be included in a patient interface 7000 that is otherwise all manual. For example, a patient interface 7000 where the adjustment structure 7408 is not connected to a motor and pivots only by manual intervention may still include sensors and/or controllers. This may allow the patient interface 7000 to measure the same one or more patient characteristics and communicate those characteristics to an external device. The patient or clinician will therefore be able to monitor how the selected position affects whether the selected position promotes natural breathing.

5.4 RPT Device

An RPT device 4000 in accordance with one aspect of the present technology comprises mechanical, pneumatic, and/or electrical components and is configured to execute one or more algorithms, such as any of the methods, in whole or in part, described herein. The RPT device 4000 may be configured to generate a flow of air for delivery to a patient's airways, such as to treat one or more of the respiratory conditions described elsewhere in the present document.

In one form, the RPT device 4000 is constructed and arranged to be capable of delivering a flow of air in a range of −20 L/min to +150 L/min while maintaining a positive pressure of at least 6 cmH2O, or at least 10 cmH2O, or at least 20 cmH2O.

The RPT device may have an external housing 4010, formed in two parts, an upper portion 4012 and a lower portion 4014. Furthermore, the external housing 4010 may include one or more panel(s) 4015. The RPT device 4000 comprises a chassis 4016 that supports one or more internal components of the RPT device 4000. The RPT device 4000 may include a handle 4018.

The pneumatic path of the RPT device 4000 may comprise one or more air path items, e.g., an inlet air filter 4112, an inlet muffler 4122, a pressure generator 4140 capable of supplying air at positive pressure (e.g., a blower 4142), an outlet muffler 4124 and one or more transducers 4270, such as pressure sensors and flow rate sensors.

One or more of the air path items may be located within a removable unitary structure which will be referred to as a pneumatic block 4020. The pneumatic block 4020 may be located within the external housing 4010. In one form a pneumatic block 4020 is supported by, or formed as part of the chassis 4016.

The RPT device 4000 may have an electrical power supply 4210, one or more input devices 4220, a central controller, a therapy device controller 4240, a pressure generator 4140, one or more protection circuits, memory, transducers 4270, data communication interface and one or more output devices. Electrical components 4200 may be mounted on a single Printed Circuit Board Assembly (PCBA) 4202. In an alternative form, the RPT device 4000 may include more than one PCBA 4202.

5.4.1 RPT Device Mechanical & Pneumatic Components

An RPT device may comprise one or more of the following components in an integral unit. In an alternative form, one or more of the following components may be located as respective separate units.

5.4.1.1 Air Filter(s)

An RPT device in accordance with one form of the present technology may include an air filter 4110, or a plurality of air filters 4110.

In one form, an inlet air filter 4112 is located at the beginning of the pneumatic path upstream of a pressure generator 4140.

In one form, an outlet air filter 4114, for example an antibacterial filter, is located between an outlet of the pneumatic block 4020 and a patient interface 3000.

5.4.1.2 Muffler(s)

An RPT device in accordance with one form of the present technology may include a muffler 4120, or a plurality of mufflers 4120.

In one form of the present technology, an inlet muffler 4122 is located in the pneumatic path upstream of a pressure generator 4140.

In one form of the present technology, an outlet muffler 4124 is located in the pneumatic path between the pressure generator 4140 and a patient interface 3000.

5.4.1.3 Pressure Generator

In one form of the present technology, a pressure generator 4140 for producing a flow, or a supply, of air at positive pressure is a controllable blower 4142. For example, the blower 4142 may include a brushless DC motor 4144 with one or more impellers. The impellers may be located in a volute. The blower may be capable of delivering a supply of air, for example at a rate of up to about 120 litres/minute, at a positive pressure in a range from about 4 cmH2O to about 20 cmH2O, or in other forms up to about 30 cmH2O when delivering respiratory pressure therapy. The blower may be as described in any one of the following patents or patent applications the contents of which are incorporated herein by reference in their entirety: U.S. Pat. Nos. 7,866,944; 8,638,014; 8,636,479; and PCT Patent Application Publication No. WO 2013/020167.

The pressure generator 4140 may be under the control of the therapy device controller 4240.

In other forms, a pressure generator 4140 may be a piston-driven pump, a pressure regulator connected to a high pressure source (e.g. compressed air reservoir), or a bellows.

5.4.1.4 Transducer(s)

Transducers may be internal of the RPT device, or external of the RPT device. External transducers may be located for example on or form part of the air circuit, e.g., the patient interface. External transducers may be in the form of non-contact sensors such as a Doppler radar movement sensor that transmit or transfer data to the RPT device.

In one form of the present technology, one or more transducers 4270 are located upstream and/or downstream of the pressure generator 4140. The one or more transducers 4270 may be constructed and arranged to generate signals representing properties of the flow of air such as a flow rate, a pressure or a temperature at that point in the pneumatic path.

In one form of the present technology, one or more transducers 4270 may be located proximate to the patient interface 3000.

In one form, a signal from a transducer 4270 may be filtered, such as by low-pass, high-pass or band-pass filtering.

5.4.1.5 Anti-Spill Back Valve

In one form of the present technology, an anti-spill back valve 4160 is located between the humidifier 5000 and the pneumatic block 4020. The anti-spill back valve is constructed and arranged to reduce the risk that water will flow upstream from the humidifier 5000, for example to the motor 4144.

5.4.2 RPT Device Algorithms

As mentioned above, in some forms of the present technology, the central controller may be configured to implement one or more algorithms expressed as computer programs stored in a non-transitory computer readable storage medium, such as memory. The algorithms are generally grouped into groups referred to as modules.

In other forms of the present technology, some portion or all of the algorithms may be implemented by a controller of an external device such as the local external device or the remote external device. In such forms, data representing the input signals and/or intermediate algorithm outputs necessary for the portion of the algorithms to be executed at the external device may be communicated to the external device via the local external communication network or the remote external communication network. In such forms, the portion of the algorithms to be executed at the external device may be expressed as computer programs, such as with processor control instructions to be executed by one or more processor(s), stored in a non-transitory computer readable storage medium accessible to the controller of the external device. Such programs configure the controller of the external device to execute the portion of the algorithms.

5.5 Air Circuit

An air circuit 4170 in accordance with an aspect of the present technology is a conduit or a tube constructed and arranged to allow, in use, a flow of air to travel between two components such as RPT device 4000 and the patient interface 3000.

5.6 Humidifier

5.6.1 Humidifier Overview

In one form of the present technology there is provided a humidifier 5000 (e.g. as shown in FIG. 5A) to change the absolute humidity of air or gas for delivery to a patient relative to ambient air. Typically, the humidifier 5000 is used to increase the absolute humidity and increase the temperature of the flow of air (relative to ambient air) before delivery to the patient's airways.

The humidifier 5000 may comprise a humidifier reservoir 5110, a humidifier inlet 5002 to receive a flow of air, and a humidifier outlet 5004 to deliver a humidified flow of air. In some forms, as shown in FIG. 5A and FIG. 5B, an inlet and an outlet of the humidifier reservoir 5110 may be the humidifier inlet 5002 and the humidifier outlet 5004 respectively. The humidifier 5000 may further comprise a humidifier base 5006, which may be adapted to receive the humidifier reservoir 5110 and comprise a heating element 5240.

5.6.2 Humidifier Components

5.6.2.1 Water Reservoir

According to one arrangement, the humidifier 5000 may comprise a water reservoir 5110 configured to hold, or retain, a volume of liquid (e.g. water) to be evaporated for humidification of the flow of air. The water reservoir 5110 may be configured to hold a predetermined maximum volume of water in order to provide adequate humidification for at least the duration of a respiratory therapy session, such as one evening of sleep. Typically, the reservoir 5110 is configured to hold several hundred millilitres of water, e.g. 300 millilitres (ml), 325 ml, 350 ml or 400 ml. In other forms, the humidifier 5000 may be configured to receive a supply of water from an external water source such as a building's water supply system.

According to one aspect, the water reservoir 5110 is configured to add humidity to a flow of air from the RPT device 4000 as the flow of air travels therethrough. In one form, the water reservoir 5110 may be configured to encourage the flow of air to travel in a tortuous path through the reservoir 5110 while in contact with the volume of water therein.

According to one form, the reservoir 5110 may be removable from the humidifier 5000, for example in a lateral direction as shown in FIG. 5A and FIG. 5B.

The reservoir 5110 may also be configured to discourage egress of liquid therefrom, such as when the reservoir 5110 is displaced and/or rotated from its normal, working orientation, such as through any apertures and/or in between its sub-components. As the flow of air to be humidified by the humidifier 5000 is typically pressurised, the reservoir 5110 may also be configured to prevent losses in pneumatic pressure through leak and/or flow impedance.

5.6.2.2 Conductive Portion

According to one arrangement, the reservoir 5110 comprises a conductive portion 5120 configured to allow efficient transfer of heat from the heating element 5240 to the volume of liquid in the reservoir 5110. In one form, the conductive portion 5120 may be arranged as a plate, although other shapes may also be suitable. All or a part of the conductive portion 5120 may be made of a thermally conductive material such as aluminium (e.g. approximately 2 mm thick, such as 1 mm, 1.5 mm, 2.5 mm or 3 mm), another heat conducting metal or some plastics. In some cases, suitable heat conductivity may be achieved with less conductive materials of suitable geometry.

5.6.2.3 Humidifier Reservoir Dock

In one form, the humidifier 5000 may comprise a humidifier reservoir dock 5130 (as shown in FIG. 5B) configured to receive the humidifier reservoir 5110. In some arrangements, the humidifier reservoir dock 5130 may comprise a locking feature such as a locking lever 5135 configured to retain the reservoir 5110 in the humidifier reservoir dock 5130.

5.6.2.4 Water Level Indicator

The humidifier reservoir 5110 may comprise a water level indicator 5150 as shown in FIG. 5A-5B. In some forms, the water level indicator 5150 may provide one or more indications to a user such as the patient 1000 or a care giver regarding a quantity of the volume of water in the humidifier reservoir 5110. The one or more indications provided by the water level indicator 5150 may include an indication of a maximum, predetermined volume of water, any portions thereof, such as 25%, 50% or 75% or volumes such as 200 ml, 300 ml or 400 ml.

5.6.2.5 Heating Element

A heating element 5240 may be provided to the humidifier 5000 in some cases to provide a heat input to one or more of the volume of water in the humidifier reservoir 5110 and/or to the flow of air. The heating element 5240 may comprise a heat generating component such as an electrically resistive heating track. One suitable example of a heating element 5240 is a layered heating element such as one described in the PCT Patent Application Publication No. WO 2012/171072, which is incorporated herewith by reference in its entirety.

In some forms, the heating element 5240 may be provided in the humidifier base 5006 where heat may be provided to the humidifier reservoir 5110 primarily by conduction as shown in FIG. 5B.

5.7 Breathing Waveforms

FIG. 6 shows a model typical breath waveform of a person while sleeping. The horizontal axis is time, and the vertical axis is respiratory flow rate. While the parameter values may vary, a typical breath may have the following approximate values: tidal volume Vt 0.5 L, inhalation time Ti 1.6 s, peak inspiratory flow rate Qpeak 0.4 L/s, exhalation time Te 2.4 s, peak expiratory flow rate Qpeak −0.5 L/s. The total duration of the breath, Ttot, is about 4 s. The person typically breathes at a rate of about 15 breaths per minute (BPM), with Ventilation Vent about 7.5 L/min. A typical duty cycle, the ratio of Ti to Ttot, is about 40%.

5.8 Aspects of the Disclosure

A1. One aspect includes a patient interface for sealed delivery of a flow of air at a continuously positive pressure with respect to ambient air pressure to an entrance to a patient's airways including at least an entrance of a patient's nares, wherein the patient interface is configured to maintain a therapy pressure in a range of about 4 cmH2O to about 30 cmH2O above ambient air pressure in use, throughout a patient's respiratory cycle, while the patient is sleeping, to ameliorate sleep disordered breathing; said patient interface comprising: a cushion comprising, a nasal portion comprising: a nasal plenum chamber at least partially forming a nasal cavity pressurisable to a therapeutic pressure of at least 4 cmH2O above ambient air pressure, the nasal plenum chamber including at least one plenum chamber inlet port configured to convey the flow of air into the nasal plenum chamber; a nasal seal-forming structure constructed and arranged to form a seal with a region of the patient's face surrounding an entrance to the patient's nares, said nasal seal-forming structure having a hole therein such that the flow of air at said therapeutic pressure is delivered to at least an entrance to the patient's nares, the nasal seal-forming structure constructed and arranged to maintain said therapeutic pressure in the nasal plenum chamber throughout the patient's respiratory cycle in use; and a nasal vent structure connected to the nasal plenum chamber and configured to allow gases to flow from an interior of the nasal plenum chamber to ambient, said nasal vent structure being sized and shaped to maintain the therapeutic pressure in the nasal plenum chamber in use; an oral portion comprising: an oral plenum chamber at least partially forming an oral cavity pressurisable above ambient air pressure; and an oral seal-forming structure constructed and arranged to form a seal with a region of the patient's face surrounding an entrance to the patient's mouth, said oral seal-forming structure having a hole therein such that air in the oral cavity is delivered to at least an entrance to the patient's mouth, the oral seal-forming structure constructed and arranged to maintain a pressure above ambient pressure in the oral plenum chamber throughout the patient's respiratory cycle in use; a passage formed between the nasal plenum chamber and the oral plenum chamber, wherein the passage is configured to allow airflow to pass between the nasal plenum chamber and the oral plenum chamber; a valve including valve body and an adjustment structure being positioned between the nasal plenum chamber and the oral plenum chamber and being movable relative to the valve body, the adjustment structure movable between an open position configured to allow airflow between the nasal plenum chamber and the oral plenum chamber, and a closed position configured to limit airflow between the nasal plenum chamber and the oral plenum chamber; and a positioning and stabilising structure to provide a force to hold the nasal seal-forming structure and the oral seal-forming structure in a therapeutically effective position on the patient's head; and wherein the adjustment structure is configured to allow airflow through the nasal vent in the closed position and is configured to limit airflow through the nasal vent in the open position.

A2. The patient interface of aspect A1, wherein the adjustment structure is rotatable between the open position and the closed position.

A3. The patient interface of aspect A2, wherein the adjustment structure is movable between about 1° and about 179° between the open position and the closed position.

A4. The patient interface of aspect A3, wherein the adjustment structure is movable between about 30° and about 70°.

A5. The patient interface of any one of aspects A1 to A4, wherein the valve body is removably positioned within the passage.

A6. The patient interface of aspect A5, wherein the valve body is connected to the cushion is a snap-fit, press fit, or friction fit.

A7. The patient interface of any one of aspects A1 to A4, wherein the valve body is integrally formed with the cushion.

A8. The patient interface of claim 7, wherein the valve body is overmolded to the cushion.

A9. The patient interface of any one of aspects A1 to A8, wherein the valve body is formed form a rigid material.

A10. The patient interface of any one of aspects A1 to A8, wherein the valve body is formed from a flexible material.

A11. The patient interface of any one of aspects A1 to A10, wherein the nasal vent structure is formed on the valve body.

A12. The patient interface of any one of aspects A1 to A11, wherein the valve body includes a first body opening configured to communicate with the passage, and a second body opening configured to communicate with nasal vent structure.

A13. The patient interface of aspect A12, wherein the first body opening is oriented in a first direction and the second body opening is oriented in a second direction substantially perpendicular to the first direction.

A14. The patient interface of any one of aspect A12 to A13, wherein the second body opening is formed within an inner housing.

A15. The patient interface of aspect A14, wherein the inner housing includes a cylindrical shape.

A16. The patient interface of any one of aspects A14 to A15, wherein the adjustment structure is rotatably connected to the inner housing.

A17. The patient interface of any one of aspects A12 to A16, wherein the adjustment structure includes a first adjustment opening and a second adjustment opening, wherein the first adjustment opening is aligned with the first body opening in the open position, and wherein the second adjustment opening is aligned with the second body opening in the closed position.

A18. The patient interface of aspect A17, wherein the first adjustment opening is at least partially aligned with the first body opening in the closed position A19. The patient interface of aspect A17, wherein the adjustment structure completely covers the first adjustment opening in the closed position so that the first adjustment opening is not aligned with the first body opening.

A20. The patient interface of aspect A17, wherein the first adjustment opening is larger than the first body opening.

A21. The patient interface of any one of aspects A17 to A20, wherein the second adjustment opening is larger than the second body opening.

A22. The patient interface of any one of aspects A1 to A21, wherein the adjustment structure includes a generally circular body having an interfacing structure, the patient configured to engage the interfacing structure to move the adjustment structure between the open position and the closed position A23. The patient interface of aspect A22, wherein the interfacing structure is formed as a notch.

A24. The patient interface of aspect A22, wherein the interfacing structure is formed as a cylindrical body projecting from a surface of the adjustment structure.

A25. The patient interface of any one of aspects A1 to A24, wherein the adjustment structure is constructed from hard plastic.

A26. The patient interface of any one of aspects A1 to A25, wherein the valve body includes a stop structure configured to retain the adjustment structure in a desired position.

A27. The patient interface of any one of aspects A1 to A26, wherein an oral vent structure is connected to the oral plenum chamber and configured to allow gases to flow between an interior of the oral plenum chamber and the ambient.

A28. The patient interface of aspect A27, wherein said oral vent structure is sized and shaped to maintain the therapeutic pressure in the oral plenum chamber in use.

A29. The patient interface of any one of aspects A27 to A28, wherein the oral vent structure is formed from a series of holes that are configured to exhaust gas from the oral plenum chamber to the ambient.

A30. The patient interface of aspect A27, wherein the oral vent structure is an anti-asphyxia valve (AAV) and is biased to a normally opened position and is configured to close as a result of the flow of air in the oral plenum chamber, the AAV configured to return to the open position when a pressure within the cushion falls below the therapy pressure.

B1. One aspect includes a method for influencing a patient to use nasal breathing, the method comprising: receiving a human input through a display on a device; receiving a signal associated with the human input;

outputting a control signal to a valve assembly of a patient interface configured to maintain a therapy pressure in a range of about 4 cmH2O to about 30 cmH2O above ambient air pressure in use, throughout a patient's respiratory cycle to ameliorate sleep disordered breathing; actuating a motor actuates as a result of the control signal, the motor connected to an adjustment structure formed as part of the valve assembly, the adjustment structure configured to selectively divide an interior of the patient interface; measuring at least one patient parameter using a sensor positioned in the patient interface after the actuating is complete; communicating at least one measured value of the at least one patient parameter to the device; comparing the at least one measured value to a threshold value; and outputting a recommendation for a positional change for the adjustment structure through the display.

B2. The method of aspect B1, wherein the device is remote from the patient interface.

B3. The method of aspect B2, wherein the device is wirelessly connected to the patient interface.

B4. The method of any one of aspects B1 to B3, wherein the display is a screen configured to receive human input.

B5. The method of any one of aspects B1 to B4, wherein outputting the recommendation occurs during a therapy session.

B6. The method of any one of aspects B1 to B4, wherein outputting the recommendation occurs after a therapy session.

B7. The method of any one of aspects B1 to B6, wherein the at least one parameter includes frequency of nasal inhalation to oral inhalation.

B8. The method of any one of aspects B1 to B7, wherein the patient interface includes an oral plenum chamber and a nasal plenum chamber, and wherein actuating the motor is configured to selectively control airflow between the oral plenum chamber and the nasal plenum chamber.

B9. The method of any one of aspects B1 to B7, wherein actuating the motor is configured to selectively control airflow through a nasal vent simultaneously to controlling airflow between the oral plenum chamber and the nasal plenum chamber.

B10. The method of any one of aspects B1 to B7, wherein the valve assembly includes a first opening and a second opening, and wherein actuating the motor to move the adjustment structure is configured to expose one of the first opening and the second opening, and cover the other of the first opening and the second opening.

C1. One aspect includes an apparatus for monitoring patient breathing during a therapy session intended to ameliorate sleep disorder breathing, said apparatus comprising: a patient interface configured to maintain a therapeutic pressure in a range of about 4 cmH2O to about 30 cmH2O above ambient air pressure in use throughout a patient's respiratory cycle, the patient interface comprising: a nasal cavity; an oral cavity; a passageway formed between the nasal cavity and the oral cavity, wherein the passage is configured to allow airflow to pass between the nasal cavity and the oral cavity; at least one inlet port configured to convey the flow of air into the nasal cavity; a nasal vent structure is configured to allow gases to flow from an interior of the nasal cavity to ambient, said nasal vent structure being sized and shaped to maintain the therapeutic pressure in the nasal cavity in use; an adjustment structure positioned within the passage and movable between an open position configured to allow airflow between the nasal cavity and the oral cavity, and a closed position configured to limit airflow between the nasal cavity and the oral cavity; a sensor system comprising: a sensor positioned in the patient interface and configured to measure at least one patient parameter; a controller configured to output a signal based on the at least one patient parameter, the signal configured to indicate the patient's tolerance of the adjustment structure in the closed position and/or the open position; and wherein the adjustment structure is configured to allow airflow through the nasal vent in the closed position and is configured to limit airflow through the nasal vent in the open position.

C2. The apparatus of aspect C1, wherein the at least one patient parameter includes frequency of nasal inhalation to oral inhalation.

C3. The apparatus of any one of aspects C1 to C2, wherein the adjustment structure is rotatable between the open position and the closed position.

C4. The apparatus of any one of aspects C1 to C3, wherein the adjustment structure includes a first adjustment opening and a second adjustment opening, wherein the first adjustment opening is aligned with the passageway in the open position, and wherein the second adjustment opening is aligned with the nasal vent structure in the closed position.

C5. The apparatus of any one of aspects C1 to C4, wherein an oral vent structure is configured to allow gases to flow between an interior of the oral cavity the ambient.

C6. The apparatus of aspect C5, wherein said oral vent structure is sized and shaped to maintain the therapeutic pressure in the oral plenum chamber in use.

C7. The apparatus of any one of aspects C5 to C6, wherein the oral vent structure is formed from a series of holes that are configured to exhaust gas from the oral cavity to the ambient.

C8. The apparatus of aspect C5, wherein the oral vent structure is an anti-asphyxia valve (AAV) and is biased to a normally sealed position and is configured to open to an unsealed position when the adjustment structure is in the closed position and the patient orally inhales.

C9. The apparatus of any one of aspects C1 to C8, wherein the controller is configured to output the signal to a display.

C10. The apparatus of any one of aspects C1 to C9, wherein the controller is configured to output the signal wirelessly.

C11. The apparatus of any one of aspects C1 to C9, wherein the controller is configured to output the signal via a wired connection.

C12. The apparatus of any one of aspects C1 to C11, wherein the controller is configured to output the signal after a therapy session.

C13. The apparatus of any one of aspects C1 to C12, wherein the controller is configured to output the signal during the therapy session.

C14. The apparatus of any one of aspects C1 to C13, wherein the patient interface further comprises a motor connected to the adjustment structure and configured to drive movement of the adjustment structure between the open position and the closed position.

C15. The apparatus of aspect C14, wherein the controller is configured to output the signal to the motor, the signal configured to drive the movement of the adjustment structure.

C16. The apparatus of aspect C15, wherein the controller is in direct communication with the motor.

C17. The apparatus of aspect C15, wherein the controller is in indirect communication with the motor, and wherein the controller is configured to receive an input prior to communicating with the motor.

5.9 GLOSSARY

For the purposes of the present technology disclosure, in certain forms of the present technology, one or more of the following definitions may apply. In other forms of the present technology, alternative definitions may apply.

5.9.1 General

Air: In certain forms of the present technology, may be taken to mean atmospheric air, and in other forms of the present technology air may be taken to mean some other combination of breathable gases, e.g. oxygen enriched air.

Ambient: In certain forms of the present technology, the term ambient will be taken to mean (i) external of the treatment system or patient, and (ii) immediately surrounding the treatment system or patient.

For example, ambient humidity with respect to a humidifier may be the humidity of air immediately surrounding the humidifier, e.g. the humidity in the room where a patient is sleeping. Such ambient humidity may be different to the humidity outside the room where a patient is sleeping.

In another example, ambient pressure may be the pressure immediately surrounding or external to the body.

In certain forms, ambient (e.g., acoustic) noise may be considered to be the background noise level in the room where a patient is located, other than for example, noise generated by an RPT device or emanating from a mask or patient interface. Ambient noise may be generated by sources outside the room.

Automatic Positive Airway Pressure (APAP) therapy: CPAP therapy in which the treatment pressure is automatically adjustable, e.g. from breath to breath, between minimum and maximum limits, depending on the presence or absence of indications of SDB events.

Continuous Positive Airway Pressure (CPAP) therapy: Respiratory pressure therapy in which the treatment pressure is approximately constant through a respiratory cycle of a patient. In some forms, the pressure at the entrance to the airways will be slightly higher during exhalation, and slightly lower during inhalation. In some forms, the pressure will vary between different respiratory cycles of the patient, for example, being increased in response to detection of indications of partial upper airway obstruction, and decreased in the absence of indications of partial upper airway obstruction.

Flow rate: The volume (or mass) of air delivered per unit time. Flow rate may refer to an instantaneous quantity. In some cases, a reference to flow rate will be a reference to a scalar quantity, namely a quantity having magnitude only. In other cases, a reference to flow rate will be a reference to a vector quantity, namely a quantity having both magnitude and direction. Flow rate may be given the symbol Q. 'Flow rate' is sometimes shortened to simply 'flow' or 'airflow'.

In the example of patient respiration, a flow rate may be nominally positive for the inspiratory portion of a breathing cycle of a patient, and hence negative for the expiratory portion of the breathing cycle of a patient. Device flow rate, Qd, is the flow rate of air leaving the RPT device. Total flow rate, Qt, is the flow rate of air and any supplementary gas reaching the patient interface via the air circuit. Vent flow rate, Qv, is the flow rate of air leaving a vent to allow washout of exhaled gases. Leak flow rate, Ql, is the flow rate of leak from a patient interface system or elsewhere. Respiratory flow rate, Qr, is the flow rate of air that is received into the patient's respiratory system.

Flow therapy: Respiratory therapy comprising the delivery of a flow of air to an entrance to the airways at a controlled flow rate referred to as the treatment flow rate that is typically positive throughout the patient's breathing cycle.

Humidifier: The word humidifier will be taken to mean a humidifying apparatus constructed and arranged, or configured with a physical structure to be capable of providing a therapeutically beneficial amount of water ($H_2O$) vapour to a flow of air to ameliorate a medical respiratory condition of a patient.

Leak: The word leak will be taken to be an unintended flow of air. In one example, leak may occur as the result of an incomplete seal between a mask and a patient's face. In another example leak may occur in a swivel elbow to the ambient.

Noise, conducted (acoustic): Conducted noise in the present document refers to noise which is carried to the patient by the pneumatic path, such as the air circuit and the patient interface as well as the air therein. In one form, conducted noise may be quantified by measuring sound pressure levels at the end of an air circuit.

Noise, radiated (acoustic): Radiated noise in the present document refers to noise which is carried to the patient by the ambient air. In one form, radiated noise may be quantified by measuring sound power/pressure levels of the object in question according to ISO 3744.

Noise, vent (acoustic): Vent noise in the present document refers to noise which is generated by the flow of air through any vents such as vent holes of the patient interface.

Oxygen enriched air: Air with a concentration of oxygen greater than that of atmospheric air (21%), for example at least about 50% oxygen, at least about 60% oxygen, at least about 70% oxygen, at least about 80% oxygen, at least about 90% oxygen, at least about 95% oxygen, at least about 98% oxygen, or at least about 99% oxygen. "Oxygen enriched air" is sometimes shortened to "oxygen".

Medical Oxygen: Medical oxygen is defined as oxygen enriched air with an oxygen concentration of 80% or greater.

Patient: A person, whether or not they are suffering from a respiratory condition.

Pressure: Force per unit area. Pressure may be expressed in a range of units, including $cmH_2O$, $g-f/cm^2$ and hectopascal. 1 $cmH_2O$ is equal to 1 $g-f/cm^2$ and is approximately 0.98 hectopascal (1 hectopascal=100 Pa=100 $N/m^2$=1 millibar ~0.001 atm). In this specification, unless otherwise stated, pressure is given in units of cmH2O.

The pressure in the patient interface is given the symbol Pm, while the treatment pressure, which represents a target value to be achieved by the interface pressure Pm at the current instant of time, is given the symbol Pt.

Respiratory Pressure Therapy: The application of a supply of air to an entrance to the airways at a treatment pressure that is typically positive with respect to atmosphere.

Ventilator: A mechanical device that provides pressure support to a patient to perform some or all of the work of breathing.

5.9.1.1 Materials

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Polycarbonate: a thermoplastic polymer of Bisphenol-A Carbonate.

5.9.1.2 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions. The inverse of stiffness is flexibility.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use. An example of such a use may be setting up and maintaining a patient interface in sealing relationship with an entrance to a patient's airways, e.g. at a load of approximately 20 to 30 cmH2O pressure.

As an example, an I-beam may comprise a different bending stiffness (resistance to a bending load) in a first direction in comparison to a second, orthogonal direction. In another example, a structure or component may be floppy in a first direction and rigid in a second direction.

5.9.2 Respiratory Cycle

Apnea: According to some definitions, an apnea is said to have occurred when flow falls below a predetermined threshold for a duration, e.g. 10 seconds. An obstructive apnea will be said to have occurred when, despite patient effort, some obstruction of the airway does not allow air to flow. A central apnea will be said to have occurred when an apnea is detected that is due to a reduction in breathing effort, or the absence of breathing effort, despite the airway being patent. A mixed apnea occurs when a reduction or absence of breathing effort coincides with an obstructed airway.

Breathing rate: The rate of spontaneous respiration of a patient, usually measured in breaths per minute.

Duty cycle: The ratio of inhalation time, Ti to total breath time, Ttot.

Effort (breathing): The work done by a spontaneously breathing person attempting to breathe.

Expiratory portion of a breathing cycle: The period from the start of expiratory flow to the start of inspiratory flow.

Flow limitation: Flow limitation will be taken to be the state of affairs in a patient's respiration where an increase in effort by the patient does not give rise to a corresponding increase in flow. Where flow limitation occurs during an inspiratory portion of the breathing cycle it may be described as inspiratory flow limitation. Where flow limitation occurs during an expiratory portion of the breathing cycle it may be described as expiratory flow limitation.

Types of flow limited inspiratory waveforms:
  (i) Flattened: Having a rise followed by a relatively flat portion, followed by a fall.
  (ii) M-shaped: Having two local peaks, one at the leading edge, and one at the trailing edge, and a relatively flat portion between the two peaks.
  (iii) Chair-shaped: Having a single local peak, the peak being at the leading edge, followed by a relatively flat portion.
  (iv) Reverse-chair shaped: Having a relatively flat portion followed by single local peak, the peak being at the trailing edge.

Hypopnea: According to some definitions, a hypopnea is taken to be a reduction in flow, but not a cessation of flow. In one form, a hypopnea may be said to have occurred when there is a reduction in flow below a threshold rate for a duration. A central hypopnea will be said to have occurred when a hypopnea is detected that is due to a reduction in breathing effort. In one form in adults, either of the following may be regarded as being hypopneas:
  (i) a 30% reduction in patient breathing for at least 10 seconds plus an associated 4% desaturation; or
  (ii) a reduction in patient breathing (but less than 50%) for at least 10 seconds, with an associated desaturation of at least 3% or an arousal.

Hyperpnea: An increase in flow to a level higher than normal.

Inspiratory portion of a breathing cycle: The period from the start of inspiratory flow to the start of expiratory flow will be taken to be the inspiratory portion of a breathing cycle.

Patency (airway): The degree of the airway being open, or the extent to which the airway is open. A patent airway is open. Airway patency may be quantified, for example with a value of one (1) being patent, and a value of zero (0), being closed (obstructed).

Positive End-Expiratory Pressure (PEEP): The pressure above atmosphere in the lungs that exists at the end of expiration.

Peak flow rate (Qpeak): The maximum value of flow rate during the inspiratory portion of the respiratory flow waveform.

Respiratory flow rate, patient airflow rate, respiratory airflow rate (Qr): These terms may be understood to refer to the RPT device's estimate of respiratory flow rate, as opposed to "true respiratory flow rate" or "true respiratory flow rate", which is the actual respiratory flow rate experienced by the patient, usually expressed in litres per minute.

Tidal volume (Vt): The volume of air inhaled or exhaled during normal breathing, when extra effort is not applied. In principle the inspiratory volume Vi (the volume of air inhaled) is equal to the expiratory volume Ve (the volume of air exhaled), and therefore a single tidal volume Vt may be defined as equal to either quantity. In practice the tidal volume Vt is estimated as some combination, e.g. the mean, of the inspiratory volume Vi and the expiratory volume Ve.

Inhalation Time (Ti): The duration of the inspiratory portion of the respiratory flow rate waveform.

Exhalation Time (Te): The duration of the expiratory portion of the respiratory flow rate waveform.

Total Time (Ttot): The total duration between the start of one inspiratory portion of a respiratory flow rate waveform and the start of the following inspiratory portion of the respiratory flow rate waveform.

Typical recent ventilation: The value of ventilation around which recent values of ventilation Vent over some predetermined timescale tend to cluster, that is, a measure of the central tendency of the recent values of ventilation.

Upper airway obstruction (UAO): includes both partial and total upper airway obstruction. This may be associated with a state of flow limitation, in which the flow rate increases only slightly or may even decrease as the pressure difference across the upper airway increases (Starling resistor behaviour).

Ventilation (Vent): A measure of a rate of gas being exchanged by the patient's respiratory system. Measures of ventilation may include one or both of inspiratory and expiratory flow, per unit time. When expressed as a volume per minute, this quantity is often referred to as "minute ventilation". Minute ventilation is sometimes given simply as a volume, understood to be the volume per minute.

5.9.3 Ventilation

Adaptive Servo-Ventilator (ASV): A servo-ventilator that has a changeable, rather than fixed target ventilation. The changeable target ventilation may be learned from some characteristic of the patient, for example, a respiratory characteristic of the patient.

Backup rate: A parameter of a ventilator that establishes the minimum breathing rate (typically in number of breaths per minute) that the ventilator will deliver to the patient, if not triggered by spontaneous respiratory effort.

Cycled: The termination of a ventilator's inspiratory phase. When a ventilator delivers a breath to a spontaneously breathing patient, at the end of the inspiratory portion of the breathing cycle, the ventilator is said to be cycled to stop delivering the breath.

Expiratory positive airway pressure (EPAP): a base pressure, to which a pressure varying within the breath is added to produce the desired interface pressure which the ventilator will attempt to achieve at a given time.

End expiratory pressure (EEP): Desired interface pressure which the ventilator will attempt to achieve at the end of the expiratory portion of the breath. If the pressure waveform template $\Pi(\Phi)$ is zero-valued at the end of expiration, i.e. $\Pi(\Phi)=0$ when $\Phi=1$, the EEP is equal to the EPAP.

Inspiratory positive airway pressure (IPAP): Maximum desired interface pressure which the ventilator will attempt to achieve during the inspiratory portion of the breath.

Pressure support: A number that is indicative of the increase in pressure during ventilator inspiration over that during ventilator expiration, and generally means the difference in pressure between the maximum value during inspiration and the base pressure (e.g., PS=IPAP−EPAP). In some contexts, pressure support means the difference which the ventilator aims to achieve, rather than what it actually achieves.

Servo-ventilator: A ventilator that measures patient ventilation, has a target ventilation, and which adjusts the level of pressure support to bring the patient ventilation towards the target ventilation.

Spontaneous/Timed (S/T): A mode of a ventilator or other device that attempts to detect the initiation of a breath of a spontaneously breathing patient. If however, the device is unable to detect a breath within a predetermined period of time, the device will automatically initiate delivery of the breath.

Swing: Equivalent term to pressure support.

Triggered: When a ventilator, or other respiratory therapy device such as an RPT device or portable oxygen concentrator, delivers a volume of breathable gas to a spontaneously breathing patient, it is said to be triggered to do so. Triggering usually takes place at or near the initiation of the respiratory portion of the breathing cycle by the patient's efforts.

5.9.4 Anatomy

5.9.4.1 Anatomy of the Face

Ala: the external outer wall or "wing" of each nostril (plural: alar)

Alar angle: An angle formed between the ala of each nostril.

Alare: The most lateral point on the nasal ala.

Alar curvature (or alar crest) point: The most posterior point in the curved base line of each ala, found in the crease formed by the union of the ala with the cheek.

Auricle: The whole external visible part of the ear.

(nose) Bony framework: The bony framework of the nose comprises the nasal bones, the frontal process of the maxillae and the nasal part of the frontal bone.

(nose) Cartilaginous framework: The cartilaginous framework of the nose comprises the septal, lateral, major and minor cartilages.

Columella: the strip of skin that separates the nares and which runs from the pronasale to the upper lip.

Columella angle: The angle between the line drawn through the midpoint of the nostril aperture and a line drawn perpendicular to the Frankfort horizontal while intersecting subnasale.

Frankfort horizontal plane: A line extending from the most inferior point of the orbital margin to the left tragion. The tragion is the deepest point in the notch superior to the tragus of the auricle.

*Glabella*: Located on the soft tissue, the most prominent point in the midsagittal plane of the forehead.

Lateral nasal cartilage: A generally triangular plate of cartilage. Its superior margin is attached to the nasal bone and frontal process of the maxilla, and its inferior margin is connected to the greater alar cartilage.

Lip, lower (labrale inferius): The lip extending between the subnasale and the mouth.

Lip, upper (labrale superius): The lip extending between the mouth and the supramenton.

Greater alar cartilage: A plate of cartilage lying below the lateral nasal cartilage. It is curved around the anterior part of the naris. Its posterior end is connected to the frontal process of the maxilla by a tough fibrous membrane containing three or four minor cartilages of the ala.

Nares (Nostrils): Approximately ellipsoidal apertures forming the entrance to the nasal cavity. The singular form of nares is naris (nostril). The nares are separated by the nasal septum.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Philtrum: the midline groove that runs from lower border of the nasal septum to the top of the lip in the upper lip region.

Pogonion: Located on the soft tissue, the most anterior midpoint of the chin.

Ridge (nasal): The nasal ridge is the midline prominence of the nose, extending from the Sellion to the Pronasale.

Sagittal plane: A vertical plane that passes from anterior (front) to posterior (rear). The midsagittal plane is a sagittal plane that divides the body into right and left halves.

Sellion: Located on the soft tissue, the most concave point overlying the area of the frontonasal suture.

Septal cartilage (nasal): The nasal septal cartilage forms part of the septum and divides the front part of the nasal cavity.

Subalare: The point at the lower margin of the alar base, where the alar base joins with the skin of the superior (upper) lip.

Subnasal point: Located on the soft tissue, the point at which the columella merges with the upper lip in the midsagittal plane.

Supramenton: The point of greatest concavity in the midline of the lower lip between labrale inferius and soft tissue pogonion Anatomy of the Skull Frontal bone: The frontal bone includes a large vertical portion, the squama frontalis, corresponding to the region known as the forehead.

Mandible: The mandible forms the lower jaw. The mental protuberance is the bony protuberance of the jaw that forms the chin.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Temporal bones: The temporal bones are situated on the bases and sides of the skull, and support that part of the face known as the temple.

Zygomatic bones: The face includes two zygomatic bones, located in the upper and lateral parts of the face and forming the prominence of the cheek.

5.9.4.2 Anatomy of the Respiratory System

Diaphragm: A sheet of muscle that extends across the bottom of the rib cage. The diaphragm separates the thoracic cavity, containing the heart, lungs and ribs, from the abdominal cavity. As the diaphragm contracts the volume of the thoracic cavity increases and air is drawn into the lungs.

Larynx: The larynx, or voice box houses the vocal folds and connects the inferior part of the pharynx (hypopharynx) with the trachea.

Lungs: The organs of respiration in humans. The conducting zone of the lungs contains the trachea, the bronchi, the bronchioles, and the terminal bronchioles. The respiratory zone contains the respiratory bronchioles, the alveolar ducts, and the alveoli.

Nasal cavity: The nasal cavity (or nasal fossa) is a large air filled space above and behind the nose in the middle of the face. The nasal cavity is divided in two by a vertical fin called the nasal septum. On the sides of the nasal cavity are three horizontal outgrowths called nasal conchae (singular "concha") or turbinates. To the front of the nasal cavity is the nose, while the back blends, via the choanae, into the nasopharynx.

Pharynx: The part of the throat situated immediately inferior to (below) the nasal cavity, and superior to the oesophagus and larynx. The pharynx is conventionally divided into three sections: the nasopharynx (epipharynx) (the nasal part of the pharynx), the oropharynx (mesopharynx) (the oral part of the pharynx), and the laryngopharynx (hypopharynx).

5.9.5 Patient Interface

Anti-asphyxia valve (AAV): The component or sub-assembly of a mask system that, by opening to atmosphere in a failsafe manner, reduces the risk of excessive $CO_2$ rebreathing by a patient.

Elbow: An elbow is an example of a structure that directs an axis of flow of air travelling therethrough to change direction through an angle. In one form, the angle may be approximately 90 degrees. In another form, the angle may be more, or less than 90 degrees. The elbow may have an approximately circular cross-section. In another form the elbow may have an oval or a rectangular cross-section. In certain forms an elbow may be rotatable with respect to a mating component, e.g. about 360 degrees. In certain forms an elbow may be removable from a mating component, e.g. via a snap connection. In certain forms, an elbow may be assembled to a mating component via a one-time snap during manufacture, but not removable by a patient.

Frame: Frame will be taken to mean a mask structure that bears the load of tension between two or more points of connection with a headgear. A mask frame may be a non-airtight load bearing structure in the mask. However, some forms of mask frame may also be air-tight.

Functional dead space: (description to be inserted here)

Headgear: Headgear will be taken to mean a form of positioning and stabilizing structure designed for use on a head. For example the headgear may comprise a collection of one or more struts, ties and stiffeners configured to locate and retain a patient interface in position on a patient's face for delivery of respiratory therapy. Some ties are formed of a soft, flexible, elastic material such as a laminated composite of foam and fabric.

Membrane: Membrane will be taken to mean a typically thin element that has, preferably, substantially no resistance to bending, but has resistance to being stretched.

Plenum chamber: a mask plenum chamber will be taken to mean a portion of a patient interface having walls at least partially enclosing a volume of space, the volume having air therein pressurised above atmospheric pressure in use. A shell may form part of the walls of a mask plenum chamber.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a mask may be a shell. In some forms, a shell may be faceted. In some forms a shell may be airtight. In some forms a shell may not be airtight.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees. When used in the context of an air delivery conduit, the sub-assembly of components preferably comprises a matched pair of cylindrical conduits. There may be little or no leak flow of air from the swivel in use.

Tie (noun): A structure designed to resist tension.

Vent: (noun): A structure that allows a flow of air from an interior of the mask, or conduit, to ambient air for clinically effective washout of exhaled gases. For example, a clinically effective washout may involve a flow rate of about 10 litres per minute to about 100 litres per minute, depending on the mask design and treatment pressure.

5.9.6 Shape of Structures

Products in accordance with the present technology may comprise one or more three-dimensional mechanical structures, for example a mask cushion or an impeller. The three-dimensional structures may be bounded by two-dimensional surfaces. These surfaces may be distinguished using a label to describe an associated surface orientation, location, function, or some other characteristic. For example a structure may comprise one or more of an anterior surface, a posterior surface, an interior surface and an exterior surface. In another example, a seal-forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 3B to FIG. 3F, which illustrate examples of cross-sections at point p on a surface, and the resulting plane curves. FIGS. 3B to 3F also illustrate an outward normal vector at p. The outward normal vector at p points away from the surface. In some examples we describe the surface from the point of view of an imaginary small person standing upright on the surface.

5.9.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 3B (relatively large positive curvature compared to FIG. 3C) and FIG. 3C (relatively small positive curvature compared to FIG. 3B). Such curves are often referred to as concave.

Zero curvature: If the curve at p is a straight line, the curvature will be taken to be zero (if the imaginary small person leaves the point p, they can walk on a level, neither up nor down). See FIG. 3D.

Negative curvature: If the curve at p turns away from the outward normal, the curvature in that direction at that point will be taken to be negative (if the imaginary small person leaves the point p they must walk downhill). See FIG. 3E (relatively small negative curvature compared to FIG. 3F) and FIG. 3F (relatively large negative curvature compared to FIG. 3E). Such curves are often referred to as convex.

5.9.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 3B to 3F could be examples of such multiple cross-sections at a particular point.

Principal curvatures and directions: The directions of the normal planes where the curvature of the curve takes its maximum and minimum values are called the principal directions. In the examples of FIG. 3B to FIG. 3F, the maximum curvature occurs in FIG. 3B, and the minimum occurs in FIG. 3F, hence FIG. 3B and FIG. 3F are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill).

Dome region: A region where at each point the principal curvatures have the same sign, e.g. both positive (a "concave dome") or both negative (a "convex dome").

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path).

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.)

5.9.6.3 Space Curves

Space curves: Unlike a plane curve, a space curve does not necessarily lie in any particular plane. A space curve may be closed, that is, having no endpoints. A space curve may be considered to be a one-dimensional piece of three-dimensional space. An imaginary person walking on a strand of the DNA helix walks along a space curve. A typical human left ear comprises a helix, which is a left-hand helix, see FIG. 3Q. A typical human right ear comprises a helix, which is a right-hand helix, see FIG. 3R. FIG. 3S shows a right-hand helix. The edge of a structure, e.g. the edge of a membrane or impeller, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 3P), or alternatively by a left-hand rule (FIG. 3O).

Osculating plane: The plane containing the unit tangent vector and the unit principal normal vector. See FIGS. 3O and 3P.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 3S, since T2>T1, the magnitude of the torsion near the top coils of the helix of FIG. 3S is greater than the magnitude of the torsion of the bottom coils of the helix of FIG. 3S With reference to the right-hand rule of FIG. 3P, a space curve turning towards the direction of the right-hand binormal may be considered as having a right-hand positive torsion (e.g. a right-hand helix as shown in FIG. 3S). A space curve turning away from the direction of the right-hand binormal may be considered as having a right-hand negative torsion (e.g. a left-hand helix).

Equivalently, and with reference to a left-hand rule (see FIG. 3O), a space curve turning towards the direction of the left-hand binormal may be considered as having a left-hand positive torsion (e.g. a left-hand helix). Hence left-hand positive is equivalent to right-hand negative. See FIG. 3T.

5.9.6.4 Holes

A surface may have a one-dimensional hole, e.g. a hole bounded by a plane curve or by a space curve. Thin structures (e.g. a membrane) with a hole, may be described as having a one-dimensional hole. See for example the one dimensional hole in the surface of structure shown in FIG. 3I, bounded by a plane curve.

A structure may have a two-dimensional hole, e.g. a hole bounded by a surface. For example, an inflatable tyre has a two dimensional hole bounded by the interior surface of the tyre. In another example, a bladder with a cavity for air or gel could have a two-dimensional hole. See for example the cushion of FIG. 3L and the example cross-sections therethrough in FIG. 3M and FIG. 3N, with the interior surface bounding a two dimensional hole indicated. In a yet another example, a conduit may comprise a one-dimension hole (e.g. at its entrance or at its exit), and a two-dimension hole bounded by the inside surface of the conduit. See also the two dimensional hole through the structure shown in FIG. 3K, bounded by a surface as shown.

5.10 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Furthermore, "approximately", "substantially", "about", or any similar term as used herein means +/−5-10% of the recited value.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

| 5.11 REFERENCE SIGNS LIST | |
|---|---|
| patient | 1000 |
| bed partner | 1100 |
| patient interface | 3000 |
| seal-forming structure | 3100 |
| plenum chamber | 3200 |
| chord | 3210 |
| superior point | 3220 |
| inferior point | 3230 |
| positioning and stabilizing structure | 3300 |
| vent | 3400 |
| connection port | 3600 |
| forehead support | 3700 |
| RPT device | 4000 |
| external housing | 4010 |
| upper portion | 4012 |
| portion | 4014 |
| panel | 4015 |
| chassis | 4016 |
| handle | 4018 |
| pneumatic block | 4020 |
| air filter | 4110 |
| inlet air filter | 4112 |
| outlet air filter | 4114 |
| muffler | 4120 |
| inlet muffler | 4122 |
| outlet muffler | 4124 |
| pressure generator | 4140 |
| blower | 4142 |
| motor | 4144 |
| anti-spill back valve | 4160 |
| air circuit | 4170 |
| air circuit | 4171 |
| electrical components | 4200 |
| single Printed Circuit Board Assembly | 4202 |
| power supply | 4210 |
| input device | 4220 |
| transducer | 4270 |
| humidifier | 5000 |
| humidifier inlet | 5002 |
| humidifier outlet | 5004 |
| humidifier base | 5006 |
| humidifier reservoir | 5110 |
| conductive portion | 5120 |
| humidifier reservoir dock | 5130 |
| locking lever | 5135 |
| water level indicator | 5150 |
| natural breathing mask | 7000 |
| seal-forming structure | 7100 |
| nasal seal-forming structure | 7102 |
| oral seal-forming structure | 7104 |
| nasal opening | 7106 |
| bridge | 7108 |
| oral opening | 7110 |
| plenum chamber | 7200 |
| nasal plenum chamber | 7202 |
| oral plenum chamber | 7204 |
| shell | 7208 |
| openings | 7212 |
| connector | 7216 |
| conduit connector | 7220 |
| nasal vent | 7224 |

5.11 REFERENCE SIGNS LIST

| | |
|---|---|
| oral vent | 7228 |
| AAV | 7232 |
| membrane | 7236 |
| space | 7240 |
| positioning and stabilizing structure | 7300 |
| conduits | 7302 |
| headgear straps | 7304 |
| valve assembly | 7400 |
| front face | 7402 |
| indicator | 7404 |
| adjustment structure | 7408 |
| interface structure | 7412 |
| partition | 7416 |
| first body opening | 7418 |
| inner housing | 7420 |
| second body opening | 7424 |
| superior opening | 7428 |
| central portion | 7432 |
| inlet opening | 7434 |
| outlet opening | 7436 |
| first wall | 7438 |
| second wall | 7440 |
| adjustment opening | 7444 |
| total airflow | 7450 |
| inhaled air | 7452 |
| nasal exhaust flow | 7454 |
| oral exhaust flow | 7456 |
| first pressure | 7460 |
| second pressure | 7462 |
| device | 7464 |
| receive human input | 7466 |
| controller receives input | 7468 |
| controller outputs signal | 7470 |
| motor actuates | 7472 |
| therapy begins | 7474 |
| sensor measures | 7476 |
| sensor communicates | 7478 |
| therapy ends | 7480 |
| display outputs | 7482 |
| compare measured valve | 7484 |
| store new signal | 7486 |
| nasal vent | 8224 |
| valve assembly | 8400 |
| front face | 8402 |
| adjustment structure | 8408 |
| interface structure | 8412 |
| first body opening | 8416 |
| inner housing | 8420 |
| second body opening | 8424 |
| central portion | 8432 |
| inlet opening | 8434 |
| first wall | 8438 |
| adjustment opening | 8444 |
| valve assembly | 9400 |
| front face | 9402 |
| adjustment structure | 9408 |
| interface structure | 9412 |
| partition | 9416 |
| first body opening | 9418 |
| inner housing | 9420 |
| second body opening | 9424 |
| central portion | 9432 |
| hole | 9490 |

The invention claimed is:

1. A patient interface for sealed delivery of a flow of air at a continuously positive pressure with respect to ambient air pressure to an entrance to a patient's airways including at least an entrance of a patient's nares, wherein the patient interface is configured to maintain a therapy pressure in a range of about 4 cmH2O to about 30 cmH2O above ambient air pressure in use, throughout a patient's respiratory cycle, while the patient is sleeping, to ameliorate sleep disordered breathing; said patient interface comprising:

a cushion comprising,
a nasal portion comprising:
a nasal plenum chamber at least partially forming a nasal cavity pressurisable to a therapeutic pressure of at least 4 cmH2O above ambient air pressure, the nasal plenum chamber including at least one plenum chamber inlet port configured to convey the flow of air into the nasal plenum chamber;
a nasal seal-forming structure constructed and arranged to form a seal with a region of the patient's face surrounding an entrance to the patient's nares, said nasal seal-forming structure having a hole therein such that the flow of air at said therapeutic pressure is delivered to at least the entrance to the patient's nares, the nasal seal-forming structure constructed and arranged to maintain said therapeutic pressure in the nasal plenum chamber throughout the patient's respiratory cycle in use; and
a nasal vent structure connected to the nasal plenum chamber and configured to allow gases to flow from an interior of the nasal plenum chamber to ambient, said nasal vent structure being sized and shaped to maintain the therapeutic pressure in the nasal plenum chamber in use;
an oral portion comprising:
an oral plenum chamber at least partially forming an oral cavity pressurisable above ambient air pressure; and
an oral seal-forming structure constructed and arranged to form a seal with a region of the patient's face surrounding an entrance to the patient's mouth, said oral seal-forming structure having a hole therein such that air in the oral cavity is delivered to at least the entrance to the patient's mouth, the oral seal-forming structure constructed and arranged to maintain a pressure above ambient pressure in the oral plenum chamber throughout the patient's respiratory cycle in use;
a passage formed between the nasal plenum chamber and the oral plenum chamber, wherein the passage is configured to allow airflow to pass between the nasal plenum chamber and the oral plenum chamber;
a valve including valve body and an adjustment structure being positioned between the nasal plenum chamber and the oral plenum chamber and being movable relative to the valve body, the adjustment structure movable between an open position configured to allow airflow between the nasal plenum chamber and the oral plenum chamber, and a closed position configured to limit airflow between the nasal plenum chamber and the oral plenum chamber; and
a positioning and stabilising structure to provide a force to hold the nasal seal-forming structure and the oral seal-forming structure in a therapeutically effective position on the patient's head; and
wherein the adjustment structure is configured to allow airflow through the nasal vent in the closed position and is configured to limit airflow through the nasal vent in the open position.

2. The patient interface of claim 1, wherein the adjustment structure is rotatable between the open position and the closed position.

3. The patient interface of claim 2, wherein the adjustment structure is movable between about 1° and about 179° between the open position and the closed position.

4. The patient interface of claim 3, wherein the adjustment structure is movable between about 30° and about 70°.

5. The patient interface of claim 1, wherein the valve body is removably positioned within the passage.

6. The patient interface of claim 5, wherein the valve body is connected to the cushion with a snap-fit, press fit, or friction fit.

7. The patient interface of claim 1, wherein the valve body is integrally formed with the cushion.

8. The patient interface of claim 7, wherein the valve body is overmolded to the cushion.

9. The patient interface of claim 1, wherein the valve body is formed form a rigid material.

10. The patient interface of claim 1, wherein the valve body is formed from a flexible material.

11. The patient interface of claim 1, wherein the nasal vent structure is formed on the valve body.

12. The patient interface of claim 1, wherein the valve body includes a first body opening configured to communicate with the passage, and a second body opening configured to communicate with nasal vent structure.

13. The patient interface of claim 12, wherein the first body opening is oriented in a first direction and the second body opening is oriented in a second direction substantially perpendicular to the first direction.

14. The patient interface of claim 12, wherein the second body opening is formed within an inner housing.

15. The patient interface of claim 14, wherein the inner housing includes a cylindrical shape.

16. The patient interface of claim 14, wherein the adjustment structure is rotatably connected to the inner housing.

17. The patient interface of claim 12, wherein the adjustment structure includes a first adjustment opening and a second adjustment opening, wherein the first adjustment opening is aligned with the first body opening in the open position, and wherein the second adjustment opening is aligned with the second body opening in the closed position.

18. The patient interface of claim 17, wherein the first adjustment opening is at least partially aligned with the first body opening in the closed position.

19. The patient interface of claim 17, wherein the adjustment structure completely covers the first adjustment opening in the closed position so that the first adjustment opening is not aligned with the first body opening.

20. The patient interface of claim 17, wherein the first adjustment opening is larger than the first body opening.

21. The patient interface of claim 17, wherein the second adjustment opening is larger than the second body opening.

22. The patient interface of claim 1, wherein the adjustment structure includes a generally circular body having an interfacing structure, the patient configured to engage the interfacing structure to move the adjustment structure between the open position and the closed position.

23. The patient interface of claim 22, wherein the interfacing structure is formed as a notch.

24. The patient interface of claim 22, wherein the interfacing structure is formed as a cylindrical body projecting from a surface of the adjustment structure.

25. The patient interface of claim 1, wherein the adjustment structure is constructed from hard plastic.

26. The patient interface of claim 1, wherein the valve body includes a stop structure configured to retain the adjustment structure in a desired position.

27. The patient interface of claim 1, wherein an oral vent structure is connected to the oral plenum chamber and configured to allow gases to flow between an interior of the oral plenum chamber and the ambient.

28. The patient interface of claim 27, wherein said oral vent structure is sized and shaped to maintain the therapeutic pressure in the oral plenum chamber in use.

29. The patient interface of claim 27, wherein the oral vent structure is formed from a series of holes that are configured to exhaust gas from the oral plenum chamber to the ambient.

30. The patient interface of claim 27, wherein the oral vent structure is an anti-asphyxia valve (AAV) and is biased to a normally opened position and is configured to close as a result of the flow of air in the oral plenum chamber, the AAV configured to return to the open position when a pressure within the cushion falls below the therapy pressure.

\* \* \* \* \*